United States Patent
Adams

(10) Patent No.: US 11,450,442 B2
(45) Date of Patent: *Sep. 20, 2022

(54) INTERNAL-EXTERNAL HYBRID MICROREACTOR IN A COMPACT CONFIGURATION

(71) Applicant: Global Energy Research Associates, LLC, Saratoga Springs, NY (US)

(72) Inventor: Mark Lloyd Adams, San Diego, CA (US)

(73) Assignee: GLOBAL ENERGY RESEARCH ASSOCIATES, LLC, Saratoga Springs, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/858,552

(22) Filed: Apr. 24, 2020

(65) Prior Publication Data

US 2020/0265964 A1   Aug. 20, 2020

Related U.S. Application Data

(63) Continuation-in-part of application No. 15/883,066, filed on Jan. 29, 2018, which is a continuation-in-part
(Continued)

(51) Int. Cl.
*G21D 5/02* (2006.01)
*G21D 1/02* (2006.01)
(Continued)

(52) U.S. Cl.
CPC .............. *G21D 5/02* (2013.01); *F02C 1/10* (2013.01); *G21C 1/082* (2013.01); *G21C 3/42* (2013.01);
(Continued)

(58) Field of Classification Search
CPC .................................................. F02G 2254/90
See application file for complete search history.

(56) References Cited

U.S. PATENT DOCUMENTS 2,807,581 A * 9/1957 Fermi .................... G21C 21/10
376/347
2,846,021 A    8/1958 Encinas
(Continued)

FOREIGN PATENT DOCUMENTS

CA        2491352 C      7/2012
CN      103603692 A      2/2014
(Continued)

OTHER PUBLICATIONS

Dugan, E. T., "The nuclear piston engine and pulsed gaseous core reactor power systems", PhDT, Florida Univ., Gainesville, 1976 (Year: 1976).*

(Continued)

*Primary Examiner* — Laert Dounis
(74) *Attorney, Agent, or Firm* — David, Brody & Dondershine, LLP

(57) ABSTRACT

An exemplary embodiment can include an apparatus including: an internal-external hybrid nuclear reactor, which can include: at least one reciprocating internal engine; and at least one external reactor integrated with said at least one reciprocating internal engine. The reciprocating engine can receive nanofuel (including moderator, nanoscale molecular dimensions & molecular mixture) internally in an internal combustion engine that releases nuclear energy. A method of operating the hybrid nuclear reactor can include operating the reciprocating internal engine loaded with nanofuel in spark or compression ignition mode. A method of cycling the reciprocating internal engine, can include compressing nanofuel; igniting nanofuel; capturing energy released in
(Continued)

nanofuel, which is also the working fluid; and using the working fluid to perform mechanical work or generate heat.

23 Claims, 17 Drawing Sheets

Related U.S. Application Data of application No. 13/974,045, filed on Aug. 23, 2013, now Pat. No. 9,881,706, application No. 16/858,552, which is a continuation-in-part of application No. PCT/US2019/015712, filed on Jan. 29, 2019, and a continuation-in-part of application No. 15/167,900, filed on May 27, 2016, now Pat. No. 9,947,423, and a continuation-in-part of application No. PCT/US2014/051769, filed on Aug. 20, 2014.

(51) Int. Cl.
  *F02C 1/10*   (2006.01)
  *G21C 1/08*   (2006.01)
  *G21D 1/00*   (2006.01)
  *G21C 21/02*  (2006.01)
  *G21C 3/42*   (2006.01)

(52) U.S. Cl.
  CPC ............ *G21C 21/02* (2013.01); *G21D 1/00* (2013.01); *G21D 1/02* (2013.01); *F02G 2254/90* (2013.01); *Y02E 30/00* (2013.01); *Y02E 30/30* (2013.01)

(56) References Cited

U.S. PATENT DOCUMENTS

| | | | |
|---|---|---|---|
| 2,894,891 A | 7/1959 | Grebe | |
| 3,117,414 A * | 1/1964 | Finkelstein | F02G 1/043 60/526 |
| 3,160,568 A | 12/1964 | Macfarlane | |
| 3,379,191 A | 4/1968 | Harvey | |
| 3,549,490 A | 12/1970 | Moore | |
| 3,793,832 A | 2/1974 | Moon | |
| 3,848,574 A | 11/1974 | Fujikawa et al. | |
| 3,907,468 A | 9/1975 | Green | F01C 21/06 123/41.1 |
| 4,024,217 A | 5/1977 | Wexler et al. | |
| 4,075,057 A | 2/1978 | Fletcher et al. | |
| 4,251,321 A | 2/1981 | Crowther | |
| 4,304,627 A | 12/1981 | Lewis | |
| 4,710,222 A | 12/1987 | Fitzpatrick et al. | |
| 5,513,226 A | 4/1996 | Baxter et al. | |
| 5,660,038 A | 8/1997 | Stone | |
| 6,935,304 B1 | 8/2005 | Liu | |
| 7,055,327 B1 | 6/2006 | Pekrul | |
| 7,350,493 B2 | 4/2008 | Scarisbrick et al. | |
| 7,685,817 B2 | 3/2010 | Carrott | |
| 8,100,097 B2 | 1/2012 | Takahashi et al. | |
| 8,192,704 B1 | 6/2012 | Kim | |
| 8,360,759 B2 | 1/2013 | Pekrul | |
| 8,360,760 B2 | 1/2013 | Pekrul | |
| 8,517,705 B2 | 8/2013 | Pekrul | |
| 8,523,547 B2 | 9/2013 | Pekrul | |
| 8,647,088 B2 | 2/2014 | Pekrul | |
| 8,689,765 B2 | 4/2014 | Pekrul | |
| 8,749,079 B1 | 6/2014 | Dunn | |
| 8,794,943 B2 | 8/2014 | Pekrul | |
| 8,800,286 B2 | 8/2014 | Pekrul | |
| 8,833,338 B2 | 9/2014 | Pekrul | |
| 2002/0080907 A1 | 6/2002 | Rubbia | |
| 2003/0156675 A1* | 8/2003 | Venneri | G21G 1/10 376/189 |
| 2007/0227138 A1* | 10/2007 | Carrott | F02G 1/055 60/520 |
| 2008/0247897 A1 | 10/2008 | Guthrie | |
| 2009/0277157 A1 | 11/2009 | Martin | B03C 1/0332 60/275 |
| 2009/0323885 A1 | 12/2009 | Bowman | |
| 2010/0061501 A1 | 3/2010 | Vandergheynst | |
| 2011/0044416 A1 | 2/2011 | Cabello et al. | |
| 2011/0165007 A1 | 7/2011 | Pekrul | |
| 2011/0171051 A1 | 7/2011 | Pekrul | |
| 2011/0206173 A1 | 8/2011 | Walters | |
| 2011/0250108 A1 | 10/2011 | Collins | |
| 2011/0281679 A1 | 11/2011 | Larrabee et al. | |
| 2012/0121477 A1 | 5/2012 | Ali et al. | |
| 2013/0005200 A1 | 1/2013 | Mayburd | |
| 2013/0028364 A1 | 1/2013 | Rubbia | |
| 2013/0028772 A1 | 1/2013 | Julien | |
| 2013/0300121 A1 | 11/2013 | Ali et al. | |
| 2015/0052886 A1 | 2/2015 | Adams | |

FOREIGN PATENT DOCUMENTS

| | | |
|---|---|---|
| DE | 102009029950 A1 | 8/2011 |
| EP | 1016785 A1 | 7/2000 |
| WO | WO 1999045545 A8 | 3/2000 |
| WO | WO 2007104831 A1 | 9/2007 |
| WO | WO2011133296 A1 | 10/2011 |
| WO | WO2013007989 A1 | 1/2013 |
| WO | WO 2013063860 A1 | 5/2013 |
| WO | WO 2013050852 A3 | 11/2013 |
| WO | WO 2015/026878 | 2/2015 |

OTHER PUBLICATIONS

Neutron flux. (Dec. 25, 2016). In Wikipedia, The Free Encyclopedia. Retrieved 00:52, Dec. 25, 2016, from https://en.wikipedia.org/w/index.php?title=Neutron_flux&oldid=756541240.

Plutonium—239. (Jan. 9, 2017). In Wikipedia, The Free Encyclopedia. Retrieved 16:19, Jan. 9, 2017, from https://en.wikipedia.org/w/index.php?title=Plutonium-239&oldid=759165262.

Measurements of the 14 MeV Fission Cross-Sections for 235U and 239pu. M. Mandavi and G. F. Knoll. The University of Michigan and the University of New Mexico. pp. 58-61. 1983.

Walden, Robert P., "A study Of Nuclear Power Plant Construction in The United States," University Of Florida, Summer 1991.

Thom, K. et al., "Gaseous-Fuel Nuclear Reactor Research For Multimegawatt Power In Space," Sep. 1, 1977.

S. Inwood. "Program on technology innovation: Integrated generation technology options," Technical Report 1022782, EPRI, Jun. 2011.

Thom, K and Schneider, R .T., "Fissioning Uranium Plasmas," *Nuclear Data In Science and Technology*, vol. 1, 1973, International Atomic Energy Agency, Vienna Proceedings of a symposium, Paris, Mar. 12-16, 1973, pp. 15-20, 29-34, FIG 5.

Miller, B. E., et al, "*Ballistic piston fissioning plasma experiment,*" Jan. 1, 1971.

Schnitzler, B. G. et al, "*Application Of Gaseous Core Reactors For Transmutation Of Nuclear Waste,*" Sep. 1, 1976.

Thom, K. et al., "*Physics and potentials of fissioning plasmas for space power and propulsion,*" Aug. 1, 1976. Published by Elsevier Ltd.

U.S. Department of Energy, "*International Energy Outlook 2008,*" Sep. 2008.

S. Solomon et al., "*Climate Change 2007: The Physical Science Basis. Contribution of Working Group I to the Fourth Assessment Report of the Intergovernmental Panel on Climate Change,*" Cambridge University Press, New York, 2007.

Gal Luft and Anne Korin, "*Energy Security Challenges for the 21st Century: A Reference Handbook,*" Praeger Publisher, Santa Barbara, 2009.

James J. Duderstadt and Louis J. Hamilton. *Nuclear Reactor Analysis*. John Wiley & Sons,New York, 1976.

Charles Fayette Taylor, "*The Internal-Combustion Engine in Theory and Practice; Volume I:Thermodynamics, Fluid Flow, Performance,*" The M.I.T. Press, Cambridge, second revised edition, 1985.

J.M. Deutch et al, "*Update of the MIT 2003 future of nuclear power,*" Technical report, MIT, 2009.

(56) References Cited

OTHER PUBLICATIONS

A.M. Weinberg, "The second nuclear era," *Bull. N.Y. Acad. Med.*, 59(10):1048{1059, 1983.

Alvin M. Weinberg et al., "*The Second Nuclear Era: A New Start for Nuclear Power*," Greenwood Publishing Group, Westport, CT, 1985.

Jonathan Koomey and Nathan E. Hultman. *A reactor-level analysis of busbar costs for US nuclear plants*, 1970-2005. *Energ. Policy*, 35:5630{5642, 2007.

Robert Rosner et al, *Analysis of GW-scale overnight capital costs*. Technical report, University of Chicago, EPIC, Nov. 2011.

J. Hempstead et al, D., "*New nuclear generation: Ratings pressure increasing*," Technical report, Moody's Investors Service, Jun. 2009.

William D. Magwood, "Report to congress on small modular nuclear reactors," Technical report, DOE, May 2001.

D.T. Ingersol, "Deliberately small reactors and the second nuclear era," *Prog. Nucl. Energy*, 51:589-603, 2009.

Joseph A. Pettibone, "*A novel scheme for making cheap electricity with nuclear energy*." Technical Report UCID-18153, LLNL, Aug. 1979.

Joseph S. Pettibone, "*A novel scheme for making cheap electricity with nuclear energy*," Technical Report UCRL-JC-107068, LLNL, Apr. 1991.

Peter Alesso et al, "*Inherently safe nuclear-driven internal combustion engines*," Technical Report UCRLJC-107417, LLNL, Jun. 1991.

John Heidrich et al., "*Gaseous core nuclear-driven engines featuring a self-shuto_ mechanism to provide nuclear safety*," Technical Report UCRL-JC-108959, LLNL, Nov. 1991.

John Heidrich, "Nuclear-driven technologies that could reduce the cost of electricity by several fold." Technical Report UCRL-JC-108960, LLNL, Nov. 1991.

Bussard, RW, "Concepts for Future Nuclear Rocket Propulsion," Los Alamos Scientific Laboratory, Jet Propulsion, Published Apr. 1958.

"Energy policy act of 2005," Aug. 2005. United States Public Law 109-58.

U.S. Department of Energy, Loan Programs Office: http://lpo.energy.gov/, http://energy.gov/lpo/loan-programs-office.

T.P. Wright, "*Factors Affecting the Cost of Airplanes*," Journal of Aeronautical Science, 4(4):122{128, 1936. http://arc.aiaa.org/doi/abs/10.2514/8.155.

"An examination of the safety and economics of light water small modular reactors," United States Senate Hearing on Jul. 14, 2011.

U.S. Energy Information Administration. "*Average Retail Price of Electricity to Ultimate Customers by End-Use Sector*," by State, Mar. 2011.

Samuel Glasstone and Milton C. Edlund. "The elements of nuclear reactor theory," Part I. Technical Report 1099, ORNL, 1952.

Robert V. Meghreblian and David K. Holmes. "*Reactor Analysis*," McGraw-Hill Book Company, New York, 1960.

Weston M. Stacey. "*Nuclear Reactor Physics*," Wiley-VHC Verlag GmbH & Co., Germany, second edition, 2007.

E.R. Jette, J.F. Lemons, and A.E. Florin. "Plutonium hexafluoride: second report on the preparation and properties," Technical Report LA-1168, LANL, Nov. 1950.

Bernard Weinstock and John G. Malm. "The properties of plutonium hexafluoride," Journal of Inorganic and Nuclear Chemistry, 2:380-394, 1956.

R.J. Howerton, D.E. Cullen, R.C. Haight, M.H. MacGregor, S.T. Perkins, and E.F. Plechaty, "The LLL evaluated nuclear data library (ENDL): Evaluation techniques, reaction index, and descriptions of individual evaluations," Technical Report UCRL-50400, vol. 15, Part A, LLNL, Sep. 1975, report in series, 21 volumes, vol. 15 has 5 parts, vol. 4, general ENDL reference, includes listing of all reports.

P.F. Rose. ENDF-201, ENDF/B-VI Summary Documentation. "Technical Report BNL-NCS-17541," BNL Brookhaven National Laboratory, National Nuclear Data Center: http://www.nndc.bnl.gov/. , Oct. 1991.

L.J.,TEMPLIN. "Reactor physics constants." Technical Report 5800, ANL, Jul. 1963, excerpt.

S. Bays, H. Zhang, and M. Pope. "Deep burn fuel cycle integration: Evaluation of two-tier scenarios," Technical Report INL/EXT-09-15915, INL, May 2009.

Vladimir Kuznetsov and Alexey Lokhov. "Current status, technical feasibility and economics of small nuclear reactors," Technical report, NEA, Jun. 2011.

"*A technology roadmap for Generation IV nuclear energy systems*," Dec. 2002. U.S. DOE Nuclear Energy Research Advisory Committee and the Generation IV International Forum, DOE.

Charles G. Bathke, et al, "The attractiveness of materials in advanced nuclear fuel cycles for various proliferation and theft scenarios," Technical Report LA-UR-09-02466, LANL, 2009.

George I. Bell, "Calculations of the critical mass of UF6 as a gaseous core, with reflectors of D2O, Be and C," Technical Report LA-1874, LANL, Feb. 1955.

L.D. Landau and E.M. Lifshitz, "Theory of Elasticity (Course of Theoretical Physics; vol. 7)," Pergamon Press, Boston, third edition, 1986.

ING-103, Neutron Generator is available from the All-Russia Research Institute of Automatics: http://www.vniia.ru/.

N550 Neutron Generator is available from the Activation Technology Corporation:http://www.atcng.com/n550.htm Apr. 26, 2005 accessed on Archive.org.

J.W. Mather, "Investigation of the high-energy acceleration mode in the coaxial gun," Phys. Fluids, 7(11):S28{S34, 1964.

J.W. Mather, "Formation of a high-density deuterium plasma focus," *Phys. Fluids*, 8(2):366-377, 1965.

J.W. Mather, "Dense plasma focus," *In Methods of Experimental Physics*, vol. 9, pp. 187-249. 1971.

L. Michel, K.H. Schonbach, and Heinz Fischer, "Neutron emission from a small 1-kJ plasma focus," *Appl. Phys. Lett.*, 24(2):57{59, 1974.

G. Decker, W. Kies, and G. Pross. The first and the final nanoseconds of a fast focus discharge. *Phys. Fluids*, 26(2):571{578, 1983.

G. Decker, W. Kies, M. Malzig, C. van Calker, and G. Ziether, "High performance 300 kV driver speed 2 for MA pinch discharges," *Nucl. Instrum. Meth. A*, 249:477-483, 1986.

Raghhb, M, "*One group reactor theory. Nuclear Power Engineering*," May 27, 2013 Dec. 4, 2014.

K. Thom, "*Review of Fission Engine Concepts*," vol. 9, No. 9 Sep. 1972.

U.S. Dept. of Energy, "*International Energy Outlook 2011*," Sep. 2011.

PCT/US14/51769, IFD Aug. 20, 2014, Pending.

\* cited by examiner

INTERNAL-EXTERNAL HYBRID MICROREACTOR IN A COMPACT CONFIGURATION

CROSS-REFERENCE TO RELATED APPLICATIONS

This application is a US Non-Provisional Utility Patent Application and relates in subject matter generally, and claims benefit under 35 U.S.C. § 1.19(e) of U.S. Provisional Patent Application Ser. No. 62/838,919, c/n 1051, entitled, "Internal-External Hybrid Microreactor in a Compact Configuration," filed Apr. 25, 2019, and this application is a continuation-in-part of and claims benefit under 35 U.S.C. § 1.20 of PCT International Application Serial No. PCT/US19/15712, filed Jan. 29, 2019, and is a continuation-in-part of, and claims priority under 35 U.S.C. § 1.20 to U.S. patent application Ser. No. 15/883,066, filed Jan. 29, 2018, which is a continuation-in-part of, and claims priority under 35 U.S.C. § 120 to, U.S. patent application Ser. No. 13/974,045, filed on Aug. 23, 2013, entitled "Nanofuel Engine Apparatus and Nanofuel," to Mark L. Adams, to issue on Jan. 30, 2018 as U.S. Pat. No. 9,881,706; and is also a continuation-in-part of U.S. NonProvisional patent application Ser. No. 15/167,900, filed on May 27, 2016, entitled "Nanofuel Engine Apparatus and Nanofuel," to Mark L. Adams, which is a continuation-in-part of Ser. No. 13/974,045, and also claims the benefit under 35 U.S.C. § 120, a NonProvisional Patent Application of, and claims the benefit under 35 U.S.C. § 119(e) of, U.S. Provisional Patent Application Ser. No. 62/167,278, filed May 28, 2015, entitled "Nanofuel Internal Engine," also to Mark L. Adams; and is also related to International Patent Cooperation Treaty (PCT) Patent Application Serial No. PCT/US2014/51769 filed Aug. 20, 2014 with Applicant Global Energy Research Associates, LLC; all of which are of common Applicant and Assignee, namely Global Energy Research Associates, LLC of Saratoga Springs, N.Y. USA, to the present invention, the contents of all of which patent applications, are incorporated herein by reference in their entireties, as if they were included inserted herein.

BACKGROUND OF THE INVENTION

Field of the Invention

Embodiments of the present invention relate generally to nanotechnology, and more particularly to energy applications of nanotechnology.

Discussion of the Related Art

After several centuries of development, conventional internal-combustion (IC) engines are now the most reliable and widely used power source in the world, as of 2013. Notable historical milestones of the IC engine include, the first gunpowder IC engine in 1678 by Christiaan Huygens and the first commercial IC engine in 1858 by Jean Lenoir.

Modern IC engines may rely on an explosive mixture of fossil fuel and air to generate heat and produce useful mechanical work. While numerous IC engine designs exist, the designs all tend to perform the following processes: intake, where a working fluid enters the engine; compression, where the working fluid experiences a decrease in volume; combustion, where the working fluid experiences a rapid increase in pressure; expansion, where the working fluid performs useful mechanical work; and exhaust, where the working fluid exits the engine.

Conventional IC engines use fossil fuels, which are a limited resource. Unfortunately, the present rate of fossil fuel use is rapidly decreasing supply. Also, the combustion of fossil fuels produces carbon dioxide ($CO_2$), which is a greenhouse gas known to have a negative impact on the environment.

It would therefore be advantageous to provide an alternative fuel to fossil fuels for use in an IC engine that is sustainable and does not produce greenhouse gas emissions.

What is needed is an improved system and method that overcomes shortcomings of conventional engines and fuels.

Summary of Various Exemplary Embodiments of Invention

Various exemplary embodiments of an apparatus, system, method and/or computer program product for providing a nanofuel-based exemplary nanofuel engine apparatus and exemplary power generation systems, according to various exemplary apparatuses, and methods are set forth in detail herein, below.

According to an exemplary embodiment, an exemplary nanofuel engine apparatus may include an internal combustion engine adapted to receive a nanofuel that releases nuclear energy; and receive the nanofuel internal to the internal combustion engine.

According to an exemplary embodiment, the nanofuel engine apparatus may include where the nanofuel may include a moderator, a molecule with dimensions on a nanometer scale, and a molecular mixture.

According to an exemplary embodiment, the nanofuel engine apparatus may include where the internal combustion engine may further include a reflector.

According to an exemplary embodiment, the nanofuel engine apparatus may include where the internal combustion engine includes the reflector, where the reflector thickness is less than or equal to 60 cm beryllium (Be).

According to an exemplary embodiment, the nanofuel engine apparatus may further include at least one of: an alternator; a flywheel; a generator; a propeller; a shaft; and/or a wheel.

According to an exemplary embodiment, the nanofuel engine apparatus may include where the internal combustion engine is adapted to generate heat, and may further include a system adapted to use the heat.

According to an exemplary embodiment, the nanofuel engine apparatus may include where the system adapted to use heat may include at least one of: a radiation effects simulator; and/or a medical therapeutic apparatus.

According to an exemplary embodiment, the nanofuel engine apparatus may include where the internal combustion engine may further include at least one of: an external ignition source; and/or an internal ignition source.

According to an exemplary embodiment, the nanofuel engine apparatus may include where the internal combustion engine may include the external ignition source, and where the external ignition source may include at least one of: a fusion neutron source; and/or a radioactive material that emits neutrons.

According to an exemplary embodiment, the nanofuel engine apparatus may include where the internal combustion engine may include the external ignition source, and where the external ignition source may include the fusion neutron source, and where the fusion neutron source may include at least one of: an accelerator-based neutron generator; and/or a Z-pinch-based neutron generator.

According to an exemplary embodiment, the nanofuel engine apparatus may include where the internal combustion engine may include the external ignition source, and where the external ignition source may include the radioactive material that emits neutrons, and where the radioactive material that emits neutrons may include californium isotope 252 ($^{252}$Cf).

According to an exemplary embodiment, the nanofuel engine apparatus may include where the internal combustion engine may include the internal ignition source, and where the internal ignition source may include a radioactive material that emits neutrons.

According to an exemplary embodiment, the nanofuel engine apparatus may include where the internal combustion engine may include the internal ignition source, and where the internal ignition source may include the radioactive material that emits neutrons, and where the radioactive material that emits neutrons may include at least one of: a transuranic element; and/or a fission product.

According to an exemplary embodiment, the nanofuel engine apparatus may include where the internal combustion engine may include at least one of: a reciprocating engine; a reciprocating piston engine; a rotary engine; and/or a wankel rotary engine.

According to an exemplary embodiment, the nanofuel engine apparatus may include where the nanofuel may include: a fissile fuel, where the fissile fuel may include: a nuclide that may undergo neutron induced fission; a passive agent, where the passive agent may include: a nuclide which may include a strong resonance neutron absorption cross-section in a low epithermal energy range; and a moderator, where the moderator may include: a low atomic number element.

According to an exemplary embodiment, the nanofuel engine apparatus may include where the nanofuel may include the fissile fuel, where the fissile fuel may include the nuclide that undergoes neutron induced fission, and where the nuclide that undergoes neutron induced fission may include at least one of: plutonium isotope 239 ($^{239}$Pu); uranium isotope 235 ($^{235}$U); and/or uranium isotope 233 ($^{233}$U).

According to an exemplary embodiment, the nanofuel engine apparatus may include where the nanofuel may include the passive agent, where the passive agent may include the nuclide, which may include the strong resonance neutron absorption cross-section in the low epithermal energy range, and where the nuclide may include the strong resonance neutron absorption cross-section in the low epithermal energy range may include: plutonium isotope 240 ($^{240}$Pu) having the strong resonance neutron absorption cross-section near 1 eV.

According to an exemplary embodiment, the nanofuel engine apparatus may include where the nanofuel may include the moderator, where the moderator may include: the low atomic number element, where the low atomic number element may include at least one of: any of all elements having an atomic number (Z) less than 11 (Z<11); hydrogen (H); and/or helium (He).

According to an exemplary embodiment, the nanofuel engine apparatus may include where the fissile fuel may include at least one of: plutonium isotope 239 hexafluoride ($^{239}$PuF$_6$); and/or uranium isotope 235 dioxide ($^{235}$UO$_2$).

According to an exemplary embodiment, the nanofuel engine apparatus may include where the passive agent may include plutonium isotope 240 hexafluoride ($^{240}$PuF$_6$).

According to an exemplary embodiment, the nanofuel engine apparatus may include where the moderator may include at least one of: molecular hydrogen (H$_2$); molecular deuterium (D$_2$); and/or hydrogen fluoride (HF).

According to an exemplary embodiment, the nanofuel engine apparatus may include where the nanofuel may include: where the fissile fuel may include: plutonium isotope 239 hexafluoride ($^{239}$PuF$_6$); where the passive agent may include: plutonium isotope 240 hexafluoride ($^{240}$PuF$_6$); and where the moderator may include: molecular hydrogen (H$_2$).

According to an exemplary embodiment, the nanofuel engine apparatus may include where the nanofuel further may include at least one of: a fertile fuel, where the fertile fuel may include: a nuclide that undergoes neutron induced transmutation into a fissile nuclide; a transuranic element, where the transuranic element may include: any of all elements with an atomic number Z greater than 92 (Z>92); and/or a fission product, where the fission product may include: any of all fission reaction products.

According to an exemplary embodiment, the nanofuel engine apparatus may include where the nanofuel may include the fertile fuel, where the fertile fuel may include the nuclide that may undergo the neutron induced transmutation into the fissile nuclide; and where the nuclide may include at least one of: uranium isotope 238 ($^{238}$U); and/or thorium isotope 232 ($^{232}$Th).

According to an exemplary embodiment, the nanofuel engine apparatus may include where the nanofuel may include the transuranic element, where the transuranic element may include any of all elements with atomic number Z greater than 92 (Z>92); and where the transuranic element may include: material considered by U.S. Atomic Energy Act of 1954 to be at least one of: high-level waste (HLW); and/or transuranic (TRU) waste.

According to an exemplary embodiment, the nanofuel engine apparatus may include where the nanofuel further may include: a fertile fuel, where the fertile fuel may include at least one of: uranium isotope 238 ($^{238}$U); uranium isotope 238 hexafluoride ($^{238}$UF$_6$); uranium isotope 238 dioxide ($^{238}$UO$_2$); uranium isotope 238 ($^{238}$U) as part of a molecule; thorium isotope 232 ($^{232}$Th); thorium isotope 232 dioxide ($^{232}$ThO$_2$); and/or thorium isotope 232 tetrafluoride ($^{232}$ThF$_4$).

According to an exemplary embodiment, the nanofuel engine apparatus may further include where at least one of: a fuel cycle coupled to the internal combustion engine; a compressor coupled to said internal combustion engine; and/or a heat exchanger coupled to the internal combustion engine.

According to an exemplary embodiment, the nanofuel engine apparatus may further include at least one filter to extract at least one material, where the at least one filter may be coupled to the internal combustion engine.

According to an exemplary embodiment, the nanofuel engine apparatus may include where the internal combustion engine further may include: a housing which may include a reflector; an intake in the housing of the internal combustion engine; and/or an exhaust in said housing distanced apart from the intake of the housing of the internal combustion engine.

According to an exemplary embodiment, the nanofuel engine apparatus may include where the internal combustion engine further may include: at least one rotor; and a housing, which may include an epitrochoid shape.

According to an exemplary embodiment, the nanofuel engine apparatus may include where the nanofuel engine apparatus further may include at least one of: at least one ceramic filter; at least one compressor; at least one filter; at least one heat exchanger; at least one neutron source; at least one pump; at least one reprocessing plant; at least one separator; and/or at least one valve.

According to an exemplary embodiment, the nanofuel engine apparatus may include where the nanofuel may include at least one property, which may include at least one of: where the nanofuel may include approximately a million times an energy density of fossil fuels; where the nanofuel used in the internal combustion engine of the nanofuel engine apparatus, releases approximately one part in a million of a nanofuel energy content in the internal combustion engine; and/or where the nanofuel used in the internal combustion engine of the nanofuel engine apparatus, releases a substantially equivalent amount of energy per fuel mass as compared to a conventional fossil fuel-based internal combustion engine.

According to an exemplary embodiment, the nanofuel engine apparatus may include where the reflector may be on at least a portion of a housing near a top dead center (TDC) position.

According to an exemplary embodiment, the nanofuel engine apparatus may include where the reflector may include at least one of: beryllium (Be); beryllium oxide (BeO); graphite (C); heavy water ($D_2O$); and/or water ($H_2O$).

According to an exemplary embodiment, the nanofuel engine apparatus may include where the internal combustion engine may include a rotary engine.

According to an exemplary embodiment, the nanofuel engine apparatus may include where the rotary engine may include: a rotor; a rotor housing; a side housing; a rotor gear; and a stationary gear.

According to an exemplary embodiment, the nanofuel engine apparatus may include where at least a portion of the rotor housing may include a reflector.

According to an exemplary embodiment, the nanofuel engine apparatus may include where at least a portion of the rotor may include a reflector.

According to an exemplary embodiment, the nanofuel engine apparatus may include where the rotary engine is adapted to allow partial and/or full separation of an intake and an exhaust port.

According to an exemplary embodiment, the nanofuel engine apparatus may include where the nanofuel may include: a fissile fuel, where the fissile fuel may include: a nuclide that undergoes neutron induced fission; a passive agent, where the passive agent may include: a nuclide which may include a strong resonance neutron absorption cross-section in a low epithermal energy range; a moderator, where the moderator may include: a low atomic number element; and a fission product, where the fission product may include: any of all fission reaction products.

According to an exemplary embodiment, the nanofuel engine apparatus may include where the nanofuel further may include at least one of: a fertile fuel, where the fertile fuel may include: a nuclide that may undergo neutron induced transmutation into a fissile nuclide; and/or a transuranic element, where the transuranic element may include: any of all elements with an atomic number Z greater than 92 (Z>92).

According to an exemplary embodiment, the nanofuel engine apparatus may include where the internal combustion engine may be adapted to: a) operate in a spark ignition mode that may use a neutron source external to the nanofuel to inject neutrons into the nanofuel; and/or b) operate in a compression ignition mode that may create neutrons in the nanofuel.

According to an exemplary embodiment, the nanofuel engine apparatus may include where the internal combustion engine of (a) may be adapted to operate in the spark ignition mode that may use the neutron source external to the nanofuel to inject neutrons into the nanofuel, and the internal combustion engine may be further adapted to at least one of: i) use a fusion neutron source; and/or ii) use a radioactive material that may emit neutrons.

According to an exemplary embodiment, the nanofuel engine apparatus may include where the internal combustion engine of the (a) (i) may be adapted to use the fusion neutron source to operate the internal combustion engine in the spark ignition mode that may use the neutron source external to the nanofuel to inject neutrons into the nanofuel, which may include the internal combustion engine adapted to at least one of: use an accelerator-based neutron generator; and/or use a Z-pinch-based neutron generator.

According to an exemplary embodiment, the nanofuel engine apparatus may include where the internal combustion engine of the (a) (ii) may be adapted to use the radioactive material that may emit neutrons to operate the internal combustion engine in the spark ignition mode that may use the neutron source external to the nanofuel to inject neutrons into the nanofuel, which may include the internal combustion engine adapted to use californium isotope 252 ($^{252}Cf$).

According to an exemplary embodiment, the nanofuel engine apparatus may include where the internal combustion engine of the (b) may be adapted to operate in the compression ignition mode that may create neutrons in the nanofuel, which may be further adapted to use the radioactive material that may emit neutrons, where the internal combustion engine may be adapted to at least one of: use neutrons emitted from a fission product; and/or use neutrons emitted from a transuranic element.

According to an exemplary embodiment, the nanofuel engine apparatus may include where the internal combustion engine may include at least one of: a reciprocating engine geometry; and/or a rotary engine geometry; where the internal combustion engine may be adapted to compress the nanofuel; where the internal combustion engine may contain a mass of the nanofuel internal to the internal combustion engine that may be confined in an engine core that may change with compression; and where the internal combustion engine may include a criticality that may change with the engine core.

According to an exemplary embodiment, the nanofuel engine apparatus may further include a nanofuel.

According to an exemplary embodiment, the nanofuel engine apparatus may further include where the criticality may include: $B_m^2 = B_g^2$, where $B_m$ may include a material buckling of the engine core, and where $B_g$ may include a geometric buckling of the engine core.

According to an exemplary embodiment, the nanofuel engine apparatus may include where the internal combustion engine may include the rotary engine geometry, and further may include: a housing, which may include a shape, which may include at least one of: a substantially oval shape; and/or an epitrochoid.

According to an exemplary embodiment, the nanofuel engine apparatus may include where the internal combustion engine may include the rotary engine geometry, and further may include: a housing; and a rotor, where at least a portion of the rotor may contain a cavity.

According to an exemplary embodiment, the nanofuel engine apparatus may include where the cavity may include at least one of: an arbitrary shape; a cylindrical shape; an ellipsoidal shape; a rectangular shape; and/or a spherical shape.

According to an exemplary embodiment, the nanofuel engine apparatus may include where at least one of the: housing, and/or the rotor, may include a reflector.

According to an exemplary embodiment, the nanofuel engine apparatus may include where at least a portion of at least one of: the housing, and/or the rotor, may not include a reflector.

According to an exemplary embodiment, the nanofuel engine apparatus may further include a reflector.

According to an exemplary embodiment, the nanofuel engine apparatus may include where the reflector is chosen from at least one of a material, or a dimension to provide a structural integrity.

According to an exemplary embodiment, the nanofuel engine apparatus may further include a safety feature, which may include at least one of: a nanofuel negative temperature coefficient of reactivity; and/or the criticality that changes with the engine core.

According to an exemplary embodiment, the nanofuel engine apparatus may include where the internal combustion engine may include the reciprocating engine geometry, wherein the engine core may include a cylindrical shape, which may include a cylinder radius R and a cylinder height H, and where the criticality may include:

$$\frac{k_\infty - 1}{L^2} = \left(\frac{v_0}{\widetilde{R}_c}\right)^2 + \left(\frac{\pi}{\widetilde{H}_c}\right)^2,$$

where L may include a neutron diffusion length, where $k_\infty$ may include an infinite medium multiplication factor, where $v_0$ and $\pi$ may include known constants, where $\widetilde{R}_c$ may include an extrapolated critical radius of the engine core, and where $\widetilde{H}_c$ may include an extrapolated critical height of the engine core.

According to an exemplary embodiment, the nanofuel engine apparatus may include where the internal combustion engine is further adapted to: release energy until the engine core gets too large, where the engine core gets too large means the reciprocating engine geometry may include the cylinder radius R less than a critical radius $R_c$ ($R<R_c$), where the critical radius $R_c$ of the engine core for the reciprocating engine geometry may include:

$$R_c = \frac{v_0}{r}\left\{\frac{k_\infty - 1}{L_1^2} - \frac{\pi^2}{(H_1 + 2dr)^2}\right\}^{-1/2} - d,$$

where r is a compression ratio, where d is an extrapolation distance, and where a subscript one (1) may represent an inlet property.

According to an exemplary embodiment, the nanofuel engine apparatus may include where performance of the internal combustion engine may be improved by decreasing an engine core surface to volume ratio, where the engine core surface to volume ratio is proportional to the neutron leakage.

According to an exemplary embodiment, the nanofuel engine apparatus may include where the internal combustion engine may include a reciprocating engine geometry, where the reciprocating engine geometry has an engine core, where the engine core has a cylindrical shape, which may include a cylinder radius R and a cylinder height H, where when the internal combustion engine is in a top dead center (TDC) position the engine core may include at least one of about, or approximately H=2R and/or may reduce neutron leakage, and where a critical radius $R_c$ of the engine core may be between 30 cm and 70 cm, where the critical radius $R_c$ is inversely proportional to a compression ratio r ($R_c \sim 1/r$), and where the nanofuel engine apparatus is supercritical when the cylinder radius is greater than the critical radius ($R>R_c$).

According to an exemplary embodiment, the nanofuel engine apparatus may include where to regulate performance, a combustion duration may be controlled by at least one of: variation of the nanofuel; variation of an inlet nanofuel state; and/or variation of a compression ratio r.

According to an exemplary embodiment, the nanofuel engine apparatus may further include a closed thermodynamic fuel cycle that may continuously recycle the nanofuel. Recycling may maximize fuel utilization, in an exemplary embodiment.

According to an exemplary embodiment, the nanofuel engine apparatus may include where at least one of an engine speed and/or a r may be adjusted to ensure a peak nanofuel pressure may occur when the internal combustion engine is near a top dead center (TDC) position.

According to an exemplary embodiment, the nanofuel engine apparatus may include where for a nanofuel density of $\rho=0.02$ g/cm$^3$, the nanofuel may include: an infinite medium neutron multiplication factor ($k_\infty$) of about 1.4; a neutron population exponential growth factor ($\alpha$) of about 3,000 gen/s; a negative temperature coefficient of reactivity ($\alpha_T<0$ 1/K); and a criticality transition near a nanofuel temperature (T) of about 4,000 K.

According to an exemplary embodiment, the nanofuel engine apparatus may include where the nanofuel may include a tetrafluoride mixture, which may include at least one of: neptunium tetrafluoride ($NpF_4$); plutonium tetrafluoride ($PuF_4$); and/or americium tetrafluoride ($AmF_4$).

According to an exemplary embodiment, the nanofuel engine apparatus may include where the tetrafluoride mixture may be loaded into a fluorination reactor, where the fluorination reactor may be adapted to convert at least one of the neptunium tetrafluoride ($NpF_4$) and/or the plutonium tetrafluoride ($PuF_4$) into hexafluoride molecules.

According to an exemplary embodiment, the nanofuel engine apparatus may include where particulates of the americium tetrafluoride ($AmF_4$) may be dispersed within a gaseous hexafluoride medium of the hexafluoride molecules forming an aerosol.

According to an exemplary embodiment, the nanofuel engine apparatus may include where the aerosol is mixed with a moderator. According to an exemplary embodiment, a desirable concentration may depend on application.

According to an exemplary embodiment, the nanofuel engine apparatus may include where the nanofuel may include light water reactor (LWR) spent nuclear fuel (SNF).

According to an exemplary embodiment, the nanofuel engine apparatus may include where the at least one of: may act as a radioactive nuclear waste burner; may release less energy per mass of the nanofuel with the LWR SNF as compared to the nanofuel without the LWR SNF, for the nanofuel with a substantially equivalent composition; and/or may require a larger volume to release a substantially equivalent amount of energy using the nanofuel with the LWR SNF as compared to the nanofuel without the LWR SNF, for the nanofuel with a substantially equivalent composition. In an exemplary embodiment, the radioactive waste burner may produce clean energy, and/or reduce geological storage requirements for the LWR SNF.

According to an exemplary embodiment, a nanofuel engine apparatus may include a property, which may include a plurality of passive safety modes, which may include: a) where when nanofuel gets too hot, the nanofuel stops producing energy due to a negative temperature coefficient of reactivity; and/or b) where when an engine core gets too large, the nanofuel may stop producing energy due to a criticality that may change with the engine core.

According to an exemplary embodiment, an exemplary chemical composition may include: a nanofuel, which may include: a fissile fuel, which may include: a nuclide that may undergo neutron induced fission; a passive agent, which may include: a nuclide with a strong resonance neutron absorption cross-section in a low epithermal energy range; and a moderator, which may include: a low atomic number element.

According to an exemplary embodiment, the chemical composition may include where the fissile fuel may include at least one of: plutonium isotope 239 ($^{239}$Pu); uranium isotope 235 ($^{235}$U); uranium isotope 233 ($^{233}$U); plutonium isotope 239 hexafluoride ($^{239}$PuF$_6$); and/or uranium isotope 235 dioxide ($^{235}$UO$_2$).

According to an exemplary embodiment, the chemical composition may include where the passive agent may include at least one of: plutonium isotope 240 ($^{240}$Pu); and/or plutonium isotope 240 hexafluoride ($^{240}$PuF$_6$).

According to an exemplary embodiment, the chemical composition may include where the moderator may include at least one of: any of all elements having an atomic number (Z) less than 11 (Z<11); hydrogen (H); molecular hydrogen (H$_2$); molecular deuterium (D$_2$); hydrogen fluoride (HF); and/or helium (He).

According to an exemplary embodiment, the chemical composition may include where the nanofuel may include: where the fissile fuel may include: plutonium isotope 239 hexafluoride ($^{239}$PuF$_6$); where the passive agent may include: plutonium isotope 240 hexafluoride ($^{240}$PuF$_6$); and where the moderator may include: molecular hydrogen (H$_2$).

According to an exemplary embodiment, the chemical composition may include where the nanofuel further may include at least one of: a fertile fuel, which may include: a nuclide that may undergo neutron induced transmutation into a fissile nuclide; a transuranic element that may include: any of all elements with an atomic number Z greater than 92 (Z>92); and/or a fission product that may include: any of all fission reaction products.

According to an exemplary embodiment, the chemical composition may further include the fertile fuel, where the fertile fuel may include at least one of: uranium isotope 238 ($^{238}$U); uranium isotope 238 hexafluoride ($^{238}$UF$_6$); uranium isotope 238 dioxide ($^{238}$UO$_2$); uranium isotope 238 ($^{238}$U) as part of a molecule; thorium isotope 232 ($^{232}$Th); thorium isotope 232 dioxide ($^{232}$ThO$_2$); and/or thorium isotope 232 tetrafluoride ($^{232}$ThF$_4$).

According to an exemplary embodiment, the chemical composition may further include the transuranic element, where the transuranic element comprises: material considered by U.S. Atomic Energy Act of 1954 to be at least one of: high-level waste (HLW); and/or transuranic (TRU) waste.

According to an exemplary embodiment, the chemical composition may include where the nanofuel may include an infinite medium neutron multiplication factor (k$_\infty$), which may be greater than one (k$_\infty$>1).

According to an exemplary embodiment, the chemical composition may include where the nanofuel may include a neutron population exponential growth factor ($\alpha$), which may be greater than zero generations per second (gen/s) ($\alpha$>0 gen/s).

According to an exemplary embodiment, the chemical composition may include where the nanofuel may be in a supercritical state, where the supercritical state may include: an infinite medium neutron multiplication factor (k$_\infty$), which may be greater than one (k$_\infty$>1); and a neutron population exponential growth factor ($\alpha$), which may be greater than zero generations per second ($\alpha$>0 gen/s).

According to an exemplary embodiment, the chemical composition may include where the nanofuel may be supercritical, where the k$_\infty$ may be greater than or equal to 1.2, and the k$_\infty$ may be less than or equal to 1.7, and the alpha ($\alpha$) may be greater than or equal to 1,000 gen/s, and the alpha ($\alpha$) may be less than or equal to 9,000 gen/s.

According to an exemplary embodiment, the chemical composition may include where a neutron population may increase by approximately 10 orders of magnitude in approximately 10 ms, when the $\alpha$ may be around 2,000 gen/s.

According to an exemplary embodiment, the chemical composition may include where the nanofuel may include a temperature coefficient of reactivity ($\alpha_T$) that may be less than zero in units of inverse Kelvin ($\alpha_T$<0 1/K), where $$\alpha_T = \frac{\partial}{\partial T}\left(\frac{k-1}{k}\right) = \frac{1}{k^2}\frac{\partial k}{\partial T},$$

where k may include a neutron multiplication factor, and where T may include a nanofuel temperature.

According to an exemplary embodiment, the chemical composition may include where the nanofuel may include where the moderator may absorb fission fragment kinetic energy, where the nanofuel temperature may increase due to the absorption of fission fragment kinetic energy in the moderator, where a negative temperature coefficient of reactivity ($\alpha_T$<0 1/K) may cause a neutron population exponential growth factor ($\alpha$) to decrease and eventually transition the nanofuel into a subcritical state where $\alpha$<0 gen/s, and where the subcritical state may exponentially decrease a neutron population and may complete a combustion process.

According to an exemplary embodiment, a method of obtaining transuranic elements for nanofuel may include: a) receiving spent nuclear fuel; b) separating the transuranic elements from the spent nuclear fuel, where the separating may include: separating the spent nuclear fuel into at least one stream, where the at least one stream may include the transuranic elements, which may include at least one of: any of all elements with an atomic number Z greater than 92 (Z>92); a fissile fuel; a passive agent; a fertile fuel; and/or a fission product; and c) providing the transuranic elements.

According to an exemplary embodiment, the method may include where the (a) of the receiving the spent nuclear fuel, may include receiving commercial light water reactor (LWR) spent nuclear fuel.

According to an exemplary embodiment, the method may include where the (b) of may separating the spent nuclear fuel into at least one stream may include at least one of: i) separating into a stream of substantially uranium isotope 238 ($^{238}$U) separating into a stream of substantially fission products; and/or iii) separating into a stream of the transuranic elements.

According to an exemplary embodiment, the method may include where the (b) (i) of the separating into the stream of substantially uranium isotope 238 ($^{238}$U), may further include: productizing the stream of substantially uranium isotope 238 ($^{238}$U) as a commodity.

According to an exemplary embodiment, the method may include where the (c) of providing the transuranic elements may include: providing the transuranic elements in a solid form; providing the transuranic elements in a liquid form; and/or providing the transuranic elements in a gaseous form. According to an exemplary embodiment, the method may include where the (c) of providing the transuranic elements may include providing the transuranic elements in a plasma form.

According to an exemplary embodiment, the method may include where the providing the transuranic elements in the solid form may include at least one of: providing the transuranic elements in a substantially tetrafluoride ($F_4$) form; and/or providing the transuranic elements in a substantially dioxide ($O_2$) form.

According to an exemplary embodiment, the method may include where the (b) of the separating the spent nuclear fuel into at least one stream may include at least one of: i) separating by at least one process of pyrochemical processing or pyroprocessing; ii) separating by at least one process of electrometallurgical treatment; iii) separating without isotope separation; and/or iv) separating by a proliferation resistant, environmentally friendly process.

According to an exemplary embodiment, the method may include where the (c) of providing the transuranic elements may include: providing the transuranic elements for use in a nanofuel engine.

According to an exemplary embodiment, a method of using transuranic elements to create nanofuel, the method may include: a) receiving the transuranic elements; where the transuranic elements may include at least one of: any of all elements with atomic number Z greater than 92 (Z>92); a fissile fuel; and/or a passive agent; and where the transuranic elements have had substantially most fission products removed therefrom; and b) mixing the transuranic elements with a moderator to obtain nanofuel.

According to an exemplary embodiment, the method may further include: c) loading the transuranic elements and the moderator in a nanofuel engine.

According to an exemplary embodiment, the method may include where the (a) may include loading the transuranic elements in a nanofuel engine.

According to an exemplary embodiment, the method may include where the transuranic elements may include: at least one stream, which may include at least one of: a stream of substantially uranium isotope 238 ($^{238}$U); a stream of substantially fission products; or a stream of the transuranic elements.

According to an exemplary embodiment, the method may include where the fissile fuel may include: plutonium isotope 239 hexafluoride ($^{239}$PuF$_6$).

According to an exemplary embodiment, the method may include where the passive agent may include: plutonium isotope 240 hexafluoride ($^{240}$PuF$_6$).

According to an exemplary embodiment, the method may include where the moderator may include: molecular hydrogen ($H_2$).

According to an exemplary embodiment, the method may include where the (b) may include i) converting the transuranic elements into a gas form; and ii) mixing the transuranic elements in the gas form with the moderator to obtain the nanofuel.

According to an exemplary embodiment, the method may include where the (b) (i) of converting the transuranic elements into a gaseous form may include: loading the transuranic elements in a tetrafluoride form into a fluorination reactor; and converting the transuranic elements in the tetrafluoride form to the transuranic elements in a substantially hexafluoride form.

According to an exemplary embodiment, the method may include where the (b) (ii) of mixing the transuranic elements with the moderator to obtain the nanofuel, may include: any of all elements having an atomic number (Z) less than 11 (Z<11).

According to an exemplary embodiment, the method may include where the (b) of mixing the transuranic elements with the moderator to obtain the nanofuel may include: leaving the nanofuel ready for operation in a nanofuel engine.

According to an exemplary embodiment, a method of operating a nanofuel engine loaded with nanofuel, may include at least one of: a) operating the nanofuel engine in a spark ignition mode by injecting neutrons into the nanofuel using a source external to the nanofuel; and/or b) operating the nanofuel engine in a compression ignition mode by creating neutrons in the nanofuel, which may include: i) using radioactive material that may emit neutrons.

According to an exemplary embodiment, the method may include where the (a) of the operating the nanofuel engine in the spark ignition mode by injecting neutrons into the nanofuel using the source external to the nanofuel, may include at least one of: i) using a fusion neutron source; and/or ii) using a radioactive material that may emit neutrons.

According to an exemplary embodiment, the method may include where the (a) (i) of the using the fusion neutron source in the operating the nanofuel engine in the spark ignition mode by injecting neutrons into the nanofuel using the source external to the nanofuel may include at least one of: using an accelerator-based neutron generator; and/or using a Z-pinch-based neutron generator.

According to an exemplary embodiment, the method may include where the (a) (ii) of the using the radioactive material that may emit neutrons in the operating of the nanofuel engine in the spark ignition mode by injecting neutrons into the nanofuel using the source external to the nanofuel may include using isotope 252 californium ($^{252}$Cf)

According to an exemplary embodiment, the method may include where the (b) (i) of the operating the nanofuel engine in the compression ignition mode by creating the neutrons in the nanofuel may include the using the radioactive material that may emit neutrons may include at least one of: using neutrons emitted from a fission product; or using neutrons emitted from a transuranic element.

According to an exemplary embodiment, a method of using nanofuel in a nanofuel engine may include: a) compressing the nanofuel in the nanofuel engine; and b) igniting the nanofuel using a neutron source, where the igniting may include: triggering a release of nuclear energy from the nanofuel.

According to an exemplary embodiment, the method may include where the nanofuel may include a moderator, a molecule with dimensions on a nanometer scale, and a molecular mixture.

According to an exemplary embodiment, the method may include where the nanofuel may include: a fissile fuel, where the fissile fuel may include: a nuclide that may undergo neutron induced fission; a passive agent, where the passive agent may include: a nuclide which may include a strong resonance neutron absorption cross-section in a low epithermal energy range; and a moderator, where the moderator may include: a low atomic number element.

According to an exemplary embodiment, the method may include where the triggering the release of nuclear energy from the nanofuel may further include using the energy released from the nanofuel to generate heat.

According to an exemplary embodiment, the method may further include: c) capturing the release of nuclear energy from the nanofuel in the nanofuel, where the nanofuel is also a working fluid in the nanofuel engine; and d) using the energy in the working fluid to perform work.

According to an exemplary embodiment, the method may further include: c) receiving the nanofuel in the nanofuel engine.

According to an exemplary embodiment, the method may further include: c) exhausting the nanofuel from the nanofuel engine.

According to an exemplary embodiment, the method may include where the method may include: an Otto cycle, where the Otto cycle may be characterized by a set of dimensionless parameters, which may include a compression ratio (r); and a ratio of an energy deposited in the nanofuel to an initial heat content of the nanofuel ($\xi$), where $\xi=Q/(M\,c_v T)$, where Q is the energy deposited in the nanofuel, where M is a mass of the nanofuel in the nanofuel engine, where $c_v$ is a constant-volume heat capacity of the nanofuel, and where T is a temperature of the nanofuel.

According to an exemplary embodiment, the method may include where the compression ratio r may include: a ratio of an engine core volume of the nanofuel engine in a bottom dead center (BDC) position to an engine core volume of the nanofuel engine in a top dead center (TDC) position.

According to an exemplary embodiment, the method may further include: c) controlling the release of nuclear energy from the nanofuel by at least one of: changing the nanofuel; adjusting an inlet nanofuel state; or varying a compression ratio r.

According to an exemplary embodiment, the method may include where the compressing of the nanofuel of the (a), may include: placing a mass of the nanofuel into an engine core, where the engine core may change with the compressing of the nanofuel.

According to an exemplary embodiment, the method may include where the compressing of the nanofuel may be accomplished by at least one of: at least one piston, in a reciprocating engine, where the reciprocating engine may include at least one housing; and/or at least one rotor, in a rotary engine, where the rotary engine may include at least one housing.

According to an exemplary embodiment, the method may include where the igniting of the (b), may include at least one of: igniting via an external neutron source; and/or igniting via an internal neutron source.

According to an exemplary embodiment, the method may include where the release of nuclear energy, may include at least one of: i) releasing energy until a nanofuel temperature gets too high and the nanofuel engine transitions into a subcritical state due to a nanofuel negative temperature coefficient of reactivity; and/or ii) releasing energy until an engine core gets too large and the nanofuel engine transitions into a subcritical state due to a criticality of the engine core.

According to an exemplary embodiment, the method may include where the release of nuclear energy may include the (i), and where the (i) may include: where the nanofuel may include: a fissile fuel, a passive agent, and a moderator; and where the nanofuel may include a temperature coefficient of reactivity ($\alpha_T$) that is less than zero in units of inverse Kelvin ($\alpha_T$<0 1/K), where $$\alpha_T = \frac{\partial}{\partial T}\left(\frac{k-1}{k}\right) = \frac{1}{k^2}\frac{\partial k}{\partial T},$$

where k may include a neutron multiplication factor, and where T may include a nanofuel temperature.

According to an exemplary embodiment, the method may include where the release of nuclear energy may include the (ii), and where the (ii) may include: where the criticality of the engine core may include: $B_m^2 = B_g^2$; where $B_m$ may include a material buckling of the engine core, and where $B_g$ may include a geometric buckling of the engine core.

According to an exemplary embodiment, the method may include where the criticality of the engine core may include: where the nanofuel engine further may include a cylindrical shape reciprocating engine geometry, where the engine core may include a cylinder radius R and a cylinder height H, and where the criticality may include:

$$\frac{k_\infty - 1}{L^2} = \left(\frac{v_0}{\tilde{R}_c}\right)^2 + \left(\frac{\pi}{\tilde{H}_c}\right)^2,$$

where L may include a neutron diffusion length, where $k_\infty$ may include an infinite medium multiplication factor, where $v_0$ and $\pi$ may include known constants, where $\tilde{R}_c$ may include an extrapolated critical radius of the engine core, and where $\tilde{H}_c$ may include an extrapolated critical height of the engine core.

According to an exemplary embodiment, the method may include where the releasing energy until the engine core gets too large may include: where the nanofuel engine apparatus may be supercritical when the cylinder radius R is greater than a critical radius $R_c$ (R>$R_c$); and where the critical radius $R_c$ of the engine core of the criticality for the cylindrical shape reciprocating engine geometry may include:

$$R_c = \frac{v_0}{r}\left\{\frac{k_\infty - 1}{L_1^2} - \frac{\pi^2}{(H_1 + 2dr)^2}\right\}^{-1/2} - d,$$

where r is a compression ratio, where d is an extrapolation distance, and where a subscript one may represent an inlet property.

According to an exemplary embodiment, the method may include where the (ii) may include: where the releasing energy until the engine core gets too large with respect to the criticality, where the criticality may relate to a reflector of the nanofuel engine, where the reflector may reduce neutron leakage, and where the reflector may include at least one of: making the nanofuel engine smaller than without the reflector; or slowing down and returning fast neutrons back into the nanofuel by a finite thickness of the reflector.

According to an exemplary embodiment, the method may include where the using the energy in the working fluid to perform work of the (d), may include at least one of: driving an alternator; driving a generator; driving a propeller; generating heat; turning a shaft; and/or turning at least one wheel.

According to an exemplary embodiment, the method may further include c) cooling the nanofuel with a heat exchanger; and d) returning the nanofuel to the nanofuel engine.

According to an exemplary embodiment, the method may include where the nanofuel engine may further include a rotary engine, and may further include at least one of: allowing a full separation, and/or allowing a partial separation, of an intake and an exhaust port.

According to an exemplary embodiment, the method may include where the partial separation of the intake and the exhaust port may include: regulating an amount of the nanofuel left in the nanofuel engine, and permitting at least one of: using neutrons emitted from a fission product, and/or affecting energy released.

According to an exemplary embodiment, the method may include where the nanofuel engine may include a rotary engine, where the rotary engine may include a rotor, where the rotor may include a rotor cavity shape, which may include at least one of: an arbitrary shape, a cylindrical shape, an ellipsoidal shape, a rectangular shape, and/or a spherical shape; and where performance of the rotary engine may be improved by decreasing the rotor cavity shape surface to volume ratio.

According to an exemplary embodiment, the method may include where the nanofuel engine may include a rotor cavity shape, which may include the ellipsoidal shape, where the rotary engine dimensions are dependent on the ellipsoidal shape when the rotor is in a top dead center (TDC) position, where a geometric condition arises where a rotor center-to-tip distance ($R_r$) may depend on a minor radius (b) of the ellipsoidal shape and a reflector thickness ($\Delta$) fitting between a rotor housing minor radius and an output shaft rotor journal when the rotor is in the TDC position, $$R_r = \frac{2\,b + \Delta}{1 - 5(e/R_r)},$$

where $e/R_r$ is an eccentricity ratio.

According to an exemplary embodiment, the method may include where the nanofuel rotary engine may include a trochoid constant (K), where K may be equal to the inverse of the eccentricity ratio ($K = R_r/e$), and where as the K increases the $R_r$ decreases and the rotary engine dimensions decrease overall.

According to an exemplary embodiment, the method may include where the trochoid constant K is greater than 5 and less than 11 (5<K<11).

According to an exemplary embodiment, the method may further include at least one of a variable cycle speed, and/or a variable nanofuel engine power.

Further features and advantages of the invention, as well as the structure and operation of various exemplary embodiments of the invention, are described in detail below with reference to the accompanying drawings.

According to one example but nonlimiting embodiment, a nanofuel engine apparatus can include: an internal combustion engine configured to receive a nanofuel that releases nuclear energy; receive the nanofuel internal to internal combustion engine; compress the nanofuel in the nanofuel engine; and ignite the nanofuel using a neutron source, wherein the ignite comprises where the internal combustion engine is configured to: trigger a release of nuclear energy from the nanofuel.

The nanofuel engine apparatus, in an example embodiment, can include, e.g., but not limited to, where the nanofuel engine can include a rotary engine, where the rotary engine can include a rotor, wherein said rotor comprises a rotor cavity shape that comprises any of: an arbitrary shape; a cylindrical shape; an ellipsoidal shape; a rectangular shape; and/or a spherical shape, etc.; and where performance of the rotary engine is improved by decreasing said rotor cavity shape surface to volume ratio.

The nanofuel engine apparatus, in an example embodiment, can include, e.g., but not limited to, where the rotor cavity shape can include the ellipsoidal shape, where the rotary engine dimensions are dependent on the ellipsoidal shape when the rotor is in a top dead center (TDC) position, where a geometric condition arises where a rotor center-to-tip distance ($R_r$) depends on a minor radius (b) of the ellipsoidal shape and a reflector thickness ($\Delta$) fitting between a rotor housing minor radius and an output shaft rotor journal when the rotor is in the TDC position, $$R_r = \frac{2\,b + \Delta}{1 - 5(e/R_r)},$$

where $e/R_r$ is an eccentricity ratio.

The nanofuel engine apparatus, in an example embodiment, can include, e.g., but not limited to, where the rotary engine can include a trochoid constant (K), where the K is equal to the inverse of the eccentricity ratio ($K = R_r/e$), and where as the K increases the $R_r$ decreases and the rotary engine dimensions decrease overall.

The nanofuel engine apparatus, in an example embodiment, can include, e.g., but not limited to, where the trochoid constant K is greater than 5 and less than 11 (5<K<11).

The nanofuel engine apparatus, in an example embodiment, can include, e.g., but not limited to, where, where $K = 7.725 + 0.2105\Delta + 0.00013\Delta^2$, where $\Delta$ is in centimeters.

Another example embodiment can include, e.g., but not limited to, a method of using nanofuel in a nanofuel engine comprising: a) compressing the nanofuel in the nanofuel engine; and b) igniting the nanofuel using a neutron source, wherein said igniting can include: triggering a release of nuclear energy from the nanofuel.

The method of using the nanofuel in the nanofuel engine, in an example embodiment, can include, e.g., but not limited to, where the nanofuel engine comprises a rotary engine, wherein said rotary engine can include a rotor, where the rotor can include a rotor cavity shape that can include any of: an arbitrary shape; a cylindrical shape; an ellipsoidal shape; a rectangular shape; and/or a spherical shape, etc.; and where performance of the rotary engine is improved by decreasing the rotor cavity shape surface to volume ratio.

The method of using the nanofuel in the nanofuel engine, in an example embodiment, can include, e.g., but not limited to, where the rotor cavity shape can include the ellipsoidal shape, where the rotary engine dimensions are dependent on the ellipsoidal shape when the rotor is in a top dead center (TDC) position, where a geometric condition arises where a rotor center-to-tip distance ($R_r$) depends on a minor radius (b) of the ellipsoidal shape and a reflector thickness ($\Delta$) fitting between a rotor housing minor radius and an output shaft rotor journal when the rotor is in the TDC position, $$R_r = \frac{2\,b + \Delta}{1 - 5(e/R_r)},$$

where $e/R_r$ is an eccentricity ratio.

The method of using the nanofuel in the nanofuel engine, in an example embodiment, can include, e.g., but not limited to, where the rotary engine can include a trochoid constant (K), where the K is equal to the inverse of the eccentricity ratio ($K=R_r/e$), and where as the K increases the $R_r$ decreases and the rotary engine dimensions decrease overall.

The method of using the nanofuel in the nanofuel engine, in an example embodiment, can include, e.g., but not limited to, where the trochoid constant K is greater than 5 and less than 11 (5<K<11).

The method of using the nanofuel in the nanofuel engine, in an example embodiment, can include, e.g., but not limited to, where the $K=7.725+0.2105\Delta+0.00013\Delta^2$, where $\Delta$ is in centimeters.

According to another example embodiment, a nanofuel may include: a fissile fuel, where the fissile fuel may include: a nuclide that may undergo neutron induced fission; a passive agent, where the passive agent may include: a nuclide which may include a strong resonance neutron absorption cross-section in a low epithermal energy range; and a moderator, where the moderator may include: a low atomic number element.

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

FIG. 6A depicts $k_\infty(T)$, namely $k_\infty$, and FIG. 6B depicts $\alpha(T)$, namely $\alpha$, both as a function of the nanofuel temperature, according to an exemplary embodiment;

FIG. 9B illustrates an average nanofuel pressure p [bar] in the engine core as a function of time, according to an exemplary embodiment;

FIG. 10A illustrates an exemplary time-integrated one-sided neutron flux $\Gamma$[n/keV] leaving an exemplary engine core and entering an exemplary engine core as a function of neutron energy E [keV], according to an exemplary embodiment, and FIG. 10B illustrates the energy production rate $\dot{Q}$ [GEs] in the nanofuel in the engine core as a function of time, according to an exemplary embodiment;

FIG. 11B illustrates an average nanofuel pressure p [bar] in the engine core as a function of time, according to an exemplary embodiment;

FIG. 12A plots $k_\infty$ as a function of the nanofuel ingredient mass fractions m($H_2$,$PuF_6$) and temperature (the nanofuel density is $\rho$=0.02 g/cm$^3$), according to an exemplary embodiment, the solid black contour in FIG. 12A corresponds to $k_\infty$=1, according to an exemplary embodiment; and FIG. 12B plots $\alpha$ [gen/s] as a function of the nanofuel ingredient mass fractions m($H_2$,$PuF_6$) and temperature (the nanofuel density is $\rho$=0.02 g/cm$^3$), according to an exemplary embodiment, the solid black contour in FIG. 12B corresponds to $\alpha$=0 gen/s, according to an exemplary embodiment;

FIG. 13A plots the energy released during combustion Q [MJ] as a function of the nanofuel ingredient mass fractions m($H_2$,$PuF_6$) and the engine core radius R, according to an exemplary embodiment, the solid black contour in FIG. 13A corresponds to Q=300 MJ, according to an exemplary embodiment; and FIG. 13B plots the peak nanofuel pressure $p_3$ [bar] as a function of the nanofuel ingredient mass fractions m($H_2$,$PuF_6$) and the engine core radius R, according to an exemplary embodiment;

FIG. 17 illustrates an ellipsoidal flank cavity with minor axis length 2b and major axis length 2a=2×b, when the rotary engine is in the TDC position, according to an exemplary embodiment;

FIG. 18 plots the exemplary energy released during combustion Q [MJ], as a function of the ellipsoidal flank cavity minor radius b and the major radius multiplier x (where the major radius is given by a=bx), for several compression ratios r; in FIG. 18A, r=6; in FIG. 18B, r=8; in FIG. 18C, r=10; and in FIG. 18D, r=12;

FIG. 20 depicts an exemplary nuclear fuel cycle flow diagram, according to an exemplary embodiment, which may include, e.g., but is not limited to, various elements, which may begin with the major steps of the exemplary present once-through open fuel cycle used in the U.S., namely: an exemplary mining and/or milling process; an exemplary enrichment process; an exemplary fuel fabrication process; and/or an exemplary LWR power plant process, according to an exemplary embodiment; in addition, the exemplary nuclear fuel cycle flow diagram, may include one or more processes for creating nanofuel, which may include, e.g., but is not limited to, the following processes: an exemplary interim storage process; an exemplary separation process; an exemplary nanofuel engine process; and/or an exemplary geological disposal process, according to an exemplary embodiment;

DETAILED DESCRIPTION OF EXEMPLARY EMBODIMENTS OF THE INVENTION

Figure 1:
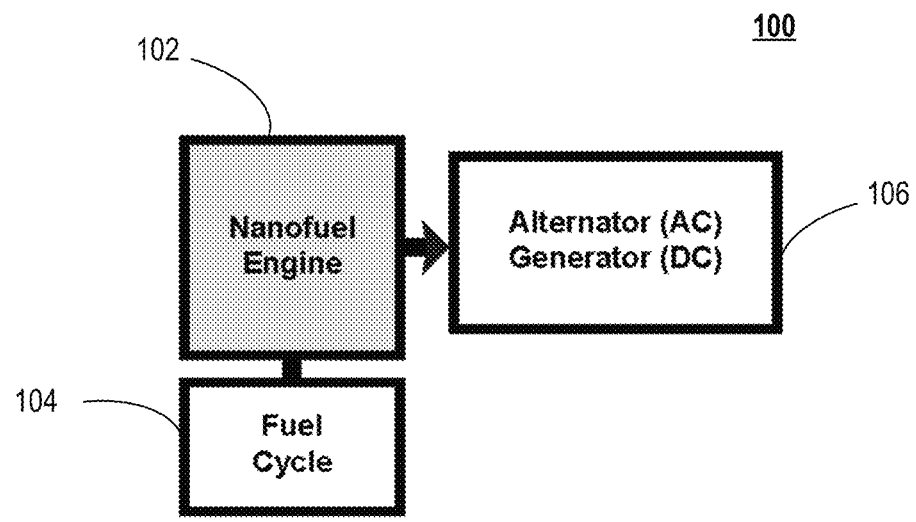
FIG. 1 depicts an exemplary view of an exemplary embodiment of an exemplary small modular nanofuel-electric engine system; which according to an exemplary embodiment may include exemplary power generation technology, which may include, e.g., but not limited to, an exemplary nanofuel engine and an exemplary fuel cycle coupled to something such as, e.g., but not limited to, an exemplary alternator and/or generator, in order to produce alternating current (AC) and/or direct current (DC) electricity from movement of the exemplary nanofuel engine, according to an exemplary embodiment.

Various exemplary embodiments of the invention are discussed in detail below. While specific exemplary embodiments are discussed, it should be understood that this is done for illustration purposes only. Exemplary means an "example" for purposes of this application, and various embodiments need not include all features as described herein. A person skilled in the relevant art will recognize that other components and configurations can be used without parting from the spirit and scope of the invention.

Overview of Various Exemplary Embodiments

Various exemplary embodiments of an exemplary small modular nanofuel engine are set forth herein (including an exemplary internal-combustion (IC) engine that may run on an exemplary nanofuel, also set forth herein, that may release nuclear energy). Various advantages of embodiments of the present invention may include, e.g., but are not limited to: economics, safety, and waste management. Exemplary economic advantages may include: (1) an exemplary low nanofuel cost; (2) an exemplary low overnight capital cost, which may result from an exemplary small engine size and/or modular manufacturing (including learning); (3) an exemplary low financing cost, which may be due in part to an exemplary short construction time; and/or (4) exemplary low operations and maintenance costs, which are comparable to existing IC engines, according to an exemplary embodiment. Exemplary safety advantages may include: (1) an exemplary nanofuel negative temperature coefficient of reactivity ($\alpha_T$<0 1/K), which may decrease the energy released during combustion as the nanofuel temperature increases; (2) an exemplary engine core dynamic criticality, where the engine core is supercritical when the engine core radius is less than a critical radius (R<$R_c$) that is inversely proportional to the compression ratio ($R_c$~1/r); (3) an exemplary low nanofuel inventory, which is several hundred times less than comparable capacity commercial light water reactors (LWRs); (4) an exemplary robust fortification from, e.g., natural disasters and/or sabotage, etc.; and/or (5) an exemplary ability to shutdown in an emergency without auxiliary power, external water supplies, and/or operator intervention, according to an exemplary embodiment. Exemplary waste management advantages may include: (1) an exemplary closed thermodynamic cycle that may permit 100% fissile fuel utilization; (2) an exemplary reduction of highly radioactive material and/or minimization of waste requiring long-term geological storage; and/or (3) the use of existing commercial LWR spent nuclear fuel, which may offer a significant technological advance in the present nuclear fuel cycle, according to an exemplary embodiment.

I. Introduction of an Exemplary Embodiment of an Exemplary Nanofuel Engine

Economics, safety, and waste management determine the adoption of any power generation technology. Herein, we will theoretically explore and computationally verify the design basis of a novel small modular nanofuel engine that offers revolutionary advances in all three facets of power generation technology. As an introduction, we will briefly review the present state of commercial nuclear power plant deployment, motivate the research and development of a nanofuel engine, and outline the sections that follow.

Weinberg, in A. M. WEINBERG, "The second nuclear era," *Bull. N.Y. Acad. Med.*, 59, 10, 1048 (1983) and A. M. WEINBERG et al., *The Second Nuclear Era: A New Start for Nuclear Power*, Praeger Publishers, Westport, Conn. (1985), defined the first nuclear era as the time period covering the initial growth of nuclear technology. This era lasted over 50 years, witnessed the construction of approximately 500 commercial nuclear reactors worldwide, and ended in 1978 (prior to the 1979 accident at Three Mile Island) with the last nuclear reactor orders in the United States.

Several elements contributed to the end of this era. Foremost, the economies of scale approach to reactor design and the escalating safety requirements imposed by the U.S. Nuclear Regulatory Commission (NRC) steadily increased the overnight capital cost and the construction time of a commercial nuclear power plant. (The overnight capital cost refers to the cost of a nuclear power plant if it were constructed overnight. It includes the engineering, procurement, and construction (EPC) costs associated with the nuclear steam supply system (NSSS), the turbine generator, and the balance of plant (BOP). It also includes the owner's costs associated with site-specific activities, such as: project management, legal services, licensing (state and federal), facilities, taxes, and transmission (local grid improvements). Contingency costs are included; time-dependent costs, such as financing and escalation costs, are excluded.) To illustrate this point, in 1957 the 60 megawatt-electric ($MW_e$) Generation I Shippingport Atomic Power Station had an all-in capital cost (which includes the overnight capital cost and time-dependent costs, such as financing and escalation costs) of 1,200 2012$/$kW_e$ and a construction time of 32 months (published by the U.S. Nuclear Regulatory Commission at http://www.nrc.gov/about-nrc/emerg-preparedness/history.html), while large or gigawatt-electric-scale ($GW_e$-scale) Generation II nuclear power plants had an all-in capital cost of 2,000-13,000 2004$/$kW_e$ and an average construction time of 9 years (J. KOOMEY and N. E. HULTMAN, "A reactor-level analysis of busbar costs for US nuclear plants, 1970-2005," *Energ. Policy*, 35, 5630 (2007)). In addition, the 10 CFR 50 (Title 10, Code of Federal Regulations, Part 50) two-step process for obtaining a construction permit and an operating license from the NRC exposes electric utility companies to the risk of having a fully functional power generating station without a license to sell electricity. Together, these elements created an unacceptably high economic risk for the deployment of a nuclear power plant.

Today, the world faces an energy crisis that stems from the confluence of unfavorable developments in the areas of energy supply and demand (on one hand, fossil fuels are a limited resource and their present rate of use is rapidly decreasing supply; while on the other hand, the growing global realization that one's quality of life is proportional to energy consumption is steadily increasing demand) (U.S. Energy Information Administration, *International Energy Outlook 2011*, 2011), climate change (the fact that the burning of fossil fuels has a negative impact on the environment) (S. SOLOMON et al., *Climate Change 2007: The Physical Science Basis. Contribution of Working Group I to the Fourth Assessment Report of the Intergovernmental Panel on Climate Change*, Cambridge University Press, New York (2007)), and energy security (the relationship between an individual nations energy requirements and their ability to mitigate energy supply disruptions) (G. LUFT and A. KORIN, *Energy Security Challenges for the $21^{st}$ Century: A Reference Handbook*, Praeger Publisher, Westport, Conn. (2009)). Consequently, there is an immediate need for sustainable alternative energy sources and, as predicted by Weinberg, a renewed interest in nuclear power.

Nuclear energy is a clean (with respect to greenhouse gas emissions), safe, and sustainable alternative energy source. Commercial nuclear power plants are the only proven large-scale means of generating carbon-free electricity. Nuclear fuel has approximately $10^6$ times the energy density of fossil fuels; e.g., the energy released per unit mass of $^{239}Pu$ is 80.12 GJ/g (J. J. DUDERSTADT and L. J. HAMILTON, *Nuclear Reactor Analysis*, John Wiley & Sons, New York (1976)), while for gasoline ($C_8H_{17}$) it is 45.92 kJ/g (C. F. TAYLOR, *The Internal-Combustion Engine in Theory and Practice; Volume I: Thermodynamics, Fluid Flow, Performance*, The MIT Press, Cambridge, second revised edition, (1985)). The price of nuclear fuel is an order of magnitude less than the price of natural gas; e.g., in 2007 the price of nuclear fuel was 0.665 2007$/$GJ, while the price of natural gas was 7.34 2007$/$GJ. (J. M. DEUTCH et al., "Update of the MIT 2003 Future of Nuclear Power," MIT (2009)) Despite these amazing advantages over fossil fuels, the start of the second nuclear era (or the nuclear renaissance) is struggling for the same reason the first nuclear era ended—economics.

In 1989, the NRC released 10 CFR 52, which introduces several new commercial nuclear power plant licensing options. Most importantly, the Construction and Operation License (COL) authorizes both the construction of a nuclear power plant and the subsequent operation after the licensee has completed the required inspections, tests, analysis, and acceptance criteria (ITAAC). In addition, directed toward achieving early public acceptance, the NRC introduced the Early Site Permit (ESP), which addresses site safety issues, environmental protection issues, and emergency planning independent of the review of a specific nuclear power plant design. For an electric utility company, these new licensing options reduce the economic risk of deploying a new nuclear power plant. While this is an improvement for the deployment of present nuclear technology, the capital cost of such an endeavor is still too large.

The overnight capital cost of a new $GW_e$-scale Generation III+ nuclear power plant has doubled within the last few years. To quantify this statement, according to a recent Energy Policy Institute at Chicago (EPIC) report (R. ROSNER and S. GOLDBERG, "Analysis of GW-scale overnight capital costs," University of Chicago, EPIC (2011)), the estimated overnight capital cost of a $GW_e$-scale nuclear power plant increased from 1,554-2,331 2010$/$kW_e$ in 2004 to their latest values of 3,617-5,339 2010$/$kW_e$. This implies that the overnight capital cost of building a new Westinghouse Electric AP1000 is approximately 3.979-5.873 billion 2010$. As a result, the economic risk of such an endeavor is unacceptably high. For example, Moody's Investors Service classified the risk at the bet-the-farm level (J. HEMPSTEAD et al., "New nuclear generation: Ratings pressure increasing," Moody's Investors Service (2009)).

This alarming increase in the overnight capital cost of a new $GW_e$-scale Generation III+ nuclear power plant is now attributed to an increase in commodity prices, an incorrect technical maturity assessment, and the structure of the U.S. Department of Energy (DOE) Loan Guarantee Program (LGP). More specifically:

Commodity Prices In the events leading up to and following the global recession of 2008, commodity prices effectively transitioned to a new level that is sometimes several hundred percent above their value a decade ago. As a lesson learned, anticipating and adapting to price fluctuations is important (especially during turbulent economic times) for the successful deployment of any new technology.

Technical Maturity Assessment Technology typically has a life cycle that includes: ideation, research and development (R&D), commercialization (learning, which is defined below), adoption (growth, maturation, decline), and obsolescence. As stated in a recent Electric Power Research Institute (EPRI) report on power generation technology, the unit cost prior to commercialization is typically a factor of 2-3 larger than predicted during the ideation stage. See S. INWOOD, "Program on technology innovation: Integrated generation technology options," 1022782, EPRI (2011). Since an uncertainty in technical maturity translates into an uncertainty in unit cost, one can kindly point out that the $GW_e$-scale Generation III+ nuclear power plant technology maturity level assessments performed a few years ago were incorrect.

DOE LGP The U.S. Energy Policy Act of 2005 ("Energy Policy Act of 2005," 2005, United States Public Law 109-58) is a law that seeks to accelerate the deployment of clean alternative energy technology through the development of programs such as the DOE LGP. Published by the U.S. Department of Energy Loan Programs Office at http://lpo.energy.gov/. A loan guarantee is a contract between the government, private creditors, and a borrower that the government will cover a portion of the borrower's debt obligation in the event that the borrower defaults. Thus, the purpose of a loan guarantee is to reduce the all-in capital cost by reducing the financing cost. However, since the LGP placed a fixed upper limit on the project cost (which is equivalent to fixing the uncertainty of a true cost estimate) vendors moved to a fixed cost structure that permeated through their supply chain (which is initially far from optimized). This introduced a margin on margin cost that had the opposite effect as intended, since it simply moved financing costs to overnight capital costs and increased the total capital required to build a new $GW_e$-scale nuclear power plant.

This raises the billion-dollar question, "Is there a more economical path forward for nuclear power?" Let us perform a simple commercial nuclear power plant gedanken economic analysis where the dominant terms are the assets long-term value and all-in capital cost. The long-term value is derived from the low cost of nuclear fuel; the all-in capital cost is directly proportional to the plant size and construction time. Given only these terms, it is economically favorable to maintain the low cost of nuclear fuel and reduce either the plant size or construction time. Hence, moving toward smaller capacities (lower overnight capital cost) and shorter construction times (lower financing cost) reduces the economic risk of deploying a nuclear power plant. This is part of the motivation for deploying small modular reactor (SMR) nuclear power plants, and has driven several nuclear reactor vendors around the world to aggressively shift their reactor design philosophy from economies of scale to economies of mass manufacturing. See W. D. MAGWOOD, "Report to congress on small modular nuclear reactors," U.S. Department of Energy (2001) and D. INGERSOLL, "Deliberately small reactors and the second nuclear era," Prog. Nucl. Energy, 51, 589 (2009).

The SMR approach to building a nuclear power plant starts with the fabrication (and inspection) of SMR components in a controlled factory environment (by highly skilled workers) and is followed by an express site-specific plant assembly. SMRs are characterized by capacities less that 300 $MW_e$ and construction times less than 2 years, or roughly 18 months for site assembly followed by 6 months for ITAAC. The economic benefits of factory fabrication for complex engineering jobs have been demonstrated in the shipbuilding and aerospace industries, e.g., manufacturing Space Shuttles. Chiefly, learning theory dictates that the unit cost decreases by a constant percentage (the improvement) each time the number of production units is doubled. See T. P. WRIGHT, "Factors affecting the cost of airplanes," Journal of Aeronautical Science, 4, 4, 122 (1936). Major U.S. SMR vendor's claim 81% learning (19% improvement) or a 50% reduction in the overnight capital cost after 10 units. See "An examination of the safety and economics of light water small modular reactors," United States Senate Hearing on 14 Jul. 2011. Another economic advantage of deploying a large capacity electricity generation station comprised of several SMR nuclear power plants is that operating plants provide capital through the sale of electricity and act as a valuable asset in financing additional plants.

On the safety front, SMRs build on the general safety standards of $GW_e$-scale Generation III+ nuclear power plants and have additional safety benefits due to straightforward changes in their design and operation. SMR designs have enhanced passive safety features (eliminating external water and auxiliary power requirements in the event of an accident) and reduced nuclear fuel inventories. Their operation revolves around standardized components (such as common instrumentation and controls) that improve the operations and maintenance personnel training quality and depth of talent. Together, these factors decrease the potential safety risk to the environment and the public in an emergency, increase site location possibilities, and create new markets for nuclear power.

While the economies of mass manufacturing philosophy sounds appealing, the realization of this approach remains to be seen. Since the highly correlated topics of economics, safety, and waste management will ultimately determine the adoption of commercial SMR nuclear power plants, let us assess these facets in turn:

Economics According to a recent EPIC report on the economics of SMRs, the anticipated all-in capital cost for the first electricity generation station comprised of six 100 $MW_e$ SMRs is 6,700-11,000 2011$/$kW_e$. See R. ROSNER, S. GOLDBERG, and J. S. HEZIR, "Small Modular Reactors—Key to Future Nuclear Power Generation in the U.S.," University of Chicago, EPIC (2011). Although this is economically favorable when compared to other clean alternative energy technology (e.g., wind, solar, and biomass), it is unprofitable in the present market. Accounting for learning, the commercialization of SMRs will require decades of government subsidies that will most likely further increase the all-in capital cost akin to the effect of the DOE LGP on the commercialization of $GW_e$-scale nuclear power plants.

Safety Existing nuclear power plants have an unprecedented safety record. For example, from 1969-2000 there were $10^3$ fewer fatalities in the nuclear power industry compared to the hydroelectric power industry alone. See S. GORDELIER, "Comparing nuclear accident risks with those from other energy sectors," 6861, Nuclear Energy Agency (2010). SMRs merely improve on the safety of $GW_e$-scale Generation III+ commercial nuclear reactors, making something that is already really safe a little safer.

Waste Management In the United States, the SMR nuclear power plants that can be deployed within the next decade use the same nuclear fuel cycle as operating commercial light water reactor (LWR) nuclear power plants. Thus, SMRs will generate more spent nuclear fuel (SNF) and further burden the taxpayer until changes are made to managing the back end of the nuclear fuel cycle. See *Blue Ribbon Commission on America's Nuclear Future Report to the Secretary of Energy*, 2012.

This rough assessment suggests that the economics and waste management facets of SMR nuclear power plants are not sufficient for adoption and that rapid deployment is unlikely. Although the SMR approach to building a nuclear power plant reduces the economic risk of the endeavor by requiring less capital outlay, the larger all-in capital cost per $kW_e$ makes the project less profitable and will require a much longer payback period. Adoption will require heavy government subsidies and depend on nuclear fuel cycle politics.

Successful adoption of new nuclear power generation technology will require addressing the present economic challenges hindering the deployment of established nuclear power plant technology, maintaining the level safety that exists in the nuclear power industry, and offering a waste management strategy that minimizes the long-term risk to the environment and the public. In general, the economic viability of any future clean alternative energy technology requires a commercialization strategy that is: robust to commodity price fluctuations (either through supply chain modifications or component replacement options); economically feasible even if the all-in capital cost increases by a factor of 3 (which requires the ability to simply absorb cost increases through superior profit margins); and independent of long-term government subsidies (in the form of loan guarantees or tax credits) for profitability. For future nuclear power generation technology, it is a good idea to leverage the economic and safety advantages of small nuclear technology (minimizing component number and fuel inventory) and modular manufacturing techniques (learning and improving product quality).

Pushing the limits on the economic and safety advantages of small modular nuclear technology, we adapt the internal-combustion (IC) engine, according to an exemplary embodiment (which is the most reliable and widely used power source in the world) to run on a nanofuel, according to an exemplary embodiment, that releases nuclear energy. From a simple economic perspective, this approach retains the long-term value associated with nuclear fuel and significantly reduces the all-in capital cost by moving to an ultra small plant size and a very short construction time. FIG. 1, which is described below, illustrates the main logical components of a small modular nanofuel-electric engine that may include, according to an exemplary embodiment, a nanofuel engine and a fuel cycle coupled to an alternator or generator in order to produce exemplary alternating current (AC) or direct current (DC), respectively, according to an exemplary embodiment. Herein, according to an exemplary embodiment, we will develop and discuss salient design principles of a nanofuel engine, according to an exemplary embodiment.

FIG. 1 depicts an exemplary view of an exemplary embodiment of an exemplary small modular nanofuel-electric engine system 100; which according to an exemplary embodiment may include exemplary power generation technology, which may include, e.g., but not limited to, an exemplary nanofuel engine 102 and an exemplary fuel cycle 104 coupled to something such as, e.g., but not limited to, an exemplary alternator and/or generator 106, in order to produce alternating current (AC) and/or direct current (DC) electricity from movement of the exemplary nanofuel engine 102, according to an exemplary embodiment. The exemplary nanofuel engine 102 may be coupled to other systems including, e.g., a component of an exemplary nuclear fuel cycle as described below with reference to FIG. 20, according to an exemplary embodiment. The exemplary nanofuel engine 102 may alternatively be coupled, according to an exemplary embodiment, to a system for providing transportation such as, e.g., but not limited to, a locomotive, a vehicle, a ship, a submarine, etc. Alternatively, the exemplary nanofuel engine 102 may be used to generate heat, according to an exemplary embodiment, and the heat may be used for various conventional purposes.

FIG. 1 illustrates in exemplary system diagram 100 various exemplary main logical components of an exemplary small modular nanofuel-electric engine, according to an exemplary embodiment, that may include an exemplary nanofuel engine 102 and an exemplary fuel cycle 104 coupled to an exemplary alternator and/or generator 106 in order to produce alternating current (AC) and/or direct current (DC). Various exemplary embodiments of exemplary nanofuel engine 102 will be set forth herein including, e.g., but not limited to, a reciprocating engine, as well as a rotary engine, etc., according to an exemplary embodiment.

Nuclear engines have been considered for potential extraterrestrial propulsion systems since World War II. See, e.g., R. W. BUSSARD and R. D. DELAUER, *Nuclear Rocket Propulsion*, McGraw-Hill, New York (1958), and K. THOM, "Review of Fission Engine Concepts," *J. Spacecraft*, 9, 9, 633 (1972). These nuclear engines operate in an open thermodynamic cycle external-combustion fashion, where the working fluid is heated by a separate (or external) nuclear reactor (which uses a solid or liquid fuel) and is passed to an exhaust nozzle that generates thrust. Rocket efficiency is proportional to the working fluid ejected speed, i.e., $v \sim \sqrt{T/m_f}$, where T is the working fluid temperature and $m_f$ is the working fluid molecular weight. Thus, nuclear engines for propulsion systems typically seek to maximize efficiency by using hydrogen as a working fluid to minimize the molecular weight and considering various nuclear reactor core designs to achieve high temperatures. In sharp contrast, a nanofuel engine 102, according to an exemplary embodiment, may operate in a closed internal-combustion (IC) fashion, where nuclear energy is released in the working fluid, which is also the nanofuel, according to an exemplary embodiment.

Previous unrelated research performed at the Lawrence Livermore National Laboratory (LLNL) highlighted economic and safety advantages of releasing nuclear energy in the working fluid of an engine. First, Pettibone, in J. A. PETTIBONE, "A novel scheme for making cheap electricity with nuclear energy," UCID-18153, LLNL (1979) and J. S. PETTIBONE, "A novel scheme for making cheap electricity with nuclear energy," UCRL-JC-107068, LLNL (1991), emphasized the economic advantages of a nuclear driven water-piston engine (such as eliminating a conventional steam turbine system). Second, and completely separate, Heidrich et al. (in P. ALESSO et al., "Inherently safe nuclear-driven internal combustion engines," UCRL-JC-107417, LLNL (1991), J. HEIDRICH et al., "Gaseous core nuclear-driven engines featuring a self-shutoff mechanism to provide nuclear safety," UCRL-JC-108959, LLNL (1991), and J. HEIDRICH et al., "Nuclear-driven technologies that could reduce the cost of electricity by several fold," UCRL-JC-108960, LLNL (1991)) discussed a few economic advantages of releasing nuclear energy in the working fluid (citing a potential ten (10)-fold reduction in the cost of electricity generation) and demonstrated a self-shutoff safety mechanism that is characteristic of certain nuclear fuel mixtures.

These earlier conventional conceptions were never enabled and died on the vine in favor of other alternative technologies. According to an exemplary embodiment of the present invention, Applicant seeks to combine, and build upon these and other various preliminary observations to fully enable a working, simulated apparatus and system, according to an exemplary embodiment.

The next sections are organized as follows:

Section II sets forth an internal-combustion (IC) engine review that examines an ideal Otto cycle, which includes an exemplary, simplified thermodynamic description of an exemplary actual IC engine, and presents a set of exemplary dimensionless parameters that may enable analytic quantitative comparisons of engine design alternatives, according to an exemplary embodiment.

Sections III and IV take an exemplary approach to identifying important exemplary nanofuel engine design principles that closely parallel an exemplary orthodox nuclear engineering technique for calculating an effective multiplication factor by division into an exemplary infinite medium multiplication factor, which depends on the nuclear fuel properties, and an exemplary nonleakage probability, which depends on reactor core geometry, according to an exemplary embodiment.

Section III sets forth exemplary nanofuel properties, which may include, e.g., but not limited to, defining exemplary main nanofuel ingredients, surveying several exemplary nanofuel properties, and highlighting exemplary safety advantages of a negative temperature coefficient of reactivity of the nanofuel, according to an exemplary embodiment.

Section IV sets forth an exemplary engine core geometry, which may include, e.g., but not limited to, considering an exemplary nanofuel reciprocating engine geometry, developing an exemplary general analytic criticality condition that may describe the engine core critical radius and/or mass, and highlighting exemplary safety features of an exemplary dynamic engine geometry, according to an exemplary embodiment.

Section V sets forth an exemplary operation including, e.g., but not limited to, discussing an ideal Otto cycle for a nanofuel engine, establishing an exemplary spark-ignition mode and an exemplary compression-ignition mode of operation, numerically quantifying several characteristics of the combustion process (including, e.g., the energy released), and revealing several exemplary design knobs, which may be used for regulating engine performance, according to an exemplary embodiment. Section V is supplemented by an exemplary neutron reflector discussion (see App. A), which may analytically determine (and numerically verify) an optimal reflector thickness using Fermi age theory and diffusion theory, according to an exemplary embodiment.

Section VI sets forth exemplary performance including, e.g., but not limited to, illustrating several exemplary design principles through a numerical simulation of an exemplary generic nanofuel 4-stroke reciprocating engine operating in both an exemplary spark-ignition mode and exemplary compression-ignition mode. In particular, this section may demonstrate near ideal nanofuel engine efficiencies, highlighting an exemplary relation between exemplary engine operating speed and exemplary engine power, discussing qualitative features of the energy dependent neutron flux, and proposing exemplary efficient fuel utilization strategies, according to an exemplary embodiment. Section VI is supplemented by an exemplary piston case strength discussion (see App. B), which may use the theory of elasticity to calculate an exemplary effect of exemplary nanofuel pressure on exemplary piston case integrity, according to an exemplary embodiment.

Section VII sets forth a light water reactor (LWR) spent nuclear fuel (SNF) section, which may include, e.g., but not limited to, demonstrating an exemplary feasibility of efficiently using exemplary commercial LWR SNF in an exemplary small modular nanofuel engine, according to an exemplary embodiment. Repeating the exemplary analysis of Secs. III through V, Sec. VII, according to an exemplary embodiment, may explore exemplary nanofuel mixtures that may include, e.g., but not limited to, a typical commercial LWR SNF isotopic composition, examining criticality, and numerically quantifying an exemplary wide-range of exemplary operating conditions, according to an exemplary embodiment. According to an exemplary embodiment of the invention, an exemplary embodiment of the nanofuel engine 102 may use SNF to generate power and to further process the SNF converting the SNF into various commoditized by products.

Section VIII sets forth an exemplary discussion of various exemplary advantages that may include, e.g., but not limited to, concluding with an exemplary discussion of various exemplary, but nonlimiting advantages of an exemplary small modular nanofuel engine, according to various exemplary embodiments. First, according to an exemplary embodiment, Sec. VIII may consider exemplary economics, exemplary safety, and exemplary waste management facets of an exemplary small modular nanofuel engine, according to an exemplary embodiment. Second, Sec. VIII may include highlights on how an exemplary nanofuel engine may exceed all Generation IV goals for future nuclear energy systems, according to an exemplary embodiment. Third, Sec. VIII may propose an exemplary construction of an exemplary robust research engine that may serve as an exemplary platform for developing exemplary, theoretical, computational, and/or experimental tools, etc., to support exemplary physics design optimization, detailed engineering feasibility studies, and rapid commercialization, etc., according to an exemplary embodiment.

Section IX set forth an exemplary nanofuel rotary engine and explores the feasibility of developing an exemplary nanofuel rotary engine, according to an exemplary embodiment. More specifically, Sec. IX, presents an exemplary rotary engine review, develops an exemplary rotary engine flank cavity that is suitable for nanofuel combustion, and describes an exemplary compact nanofuel rotary engine configuration, according to an exemplary embodiment.

Section X set forth an exemplary nuclear fuel cycle for creating and using nanofuel that is an extension of the once-through open fuel cycle used in the U.S. to fuel commercial light water reactors (LWRs), according to an exemplary embodiment.

II. Exemplary Internal-Combustion Engine Review

A reciprocating internal-combustion (IC) engine is the most reliable and widely used power source in the world, according to an exemplary embodiment. In this section, we will review the ideal Otto cycle, which provides a simplified thermodynamic description of the pertinent processes in an actual IC engine and enables analytic quantitative comparisons of engine design alternatives.

Figure 2:
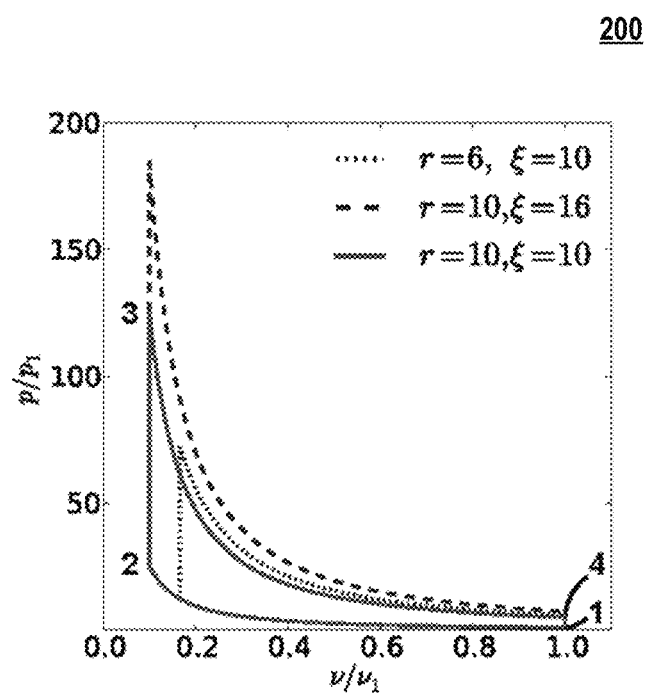
FIG. 2 depicts an exemplary embodiment of an exemplary so-called ideal Otto cycle illustrating exemplary variations in the exemplary dimensionless parameters r and $\xi$: solid curve, r=10 and $\xi$=10; dashed curve, r=10 and $\xi$=16; and dotted curve, r=6 and $\xi$=10, according to an exemplary embodiment.

FIG. 2 depicts an exemplary embodiment of an exemplary so-called ideal Otto cycle process diagram 200 illustrating exemplary variations in the exemplary dimensionless parameters r and $\xi$ (which are defined below): solid curve, r=10 and $\xi$=10; dashed curve, r=10 and $\xi$=16; and dotted curve, r=6 and $\xi$=10, according to an exemplary embodiment.

Figure 3:
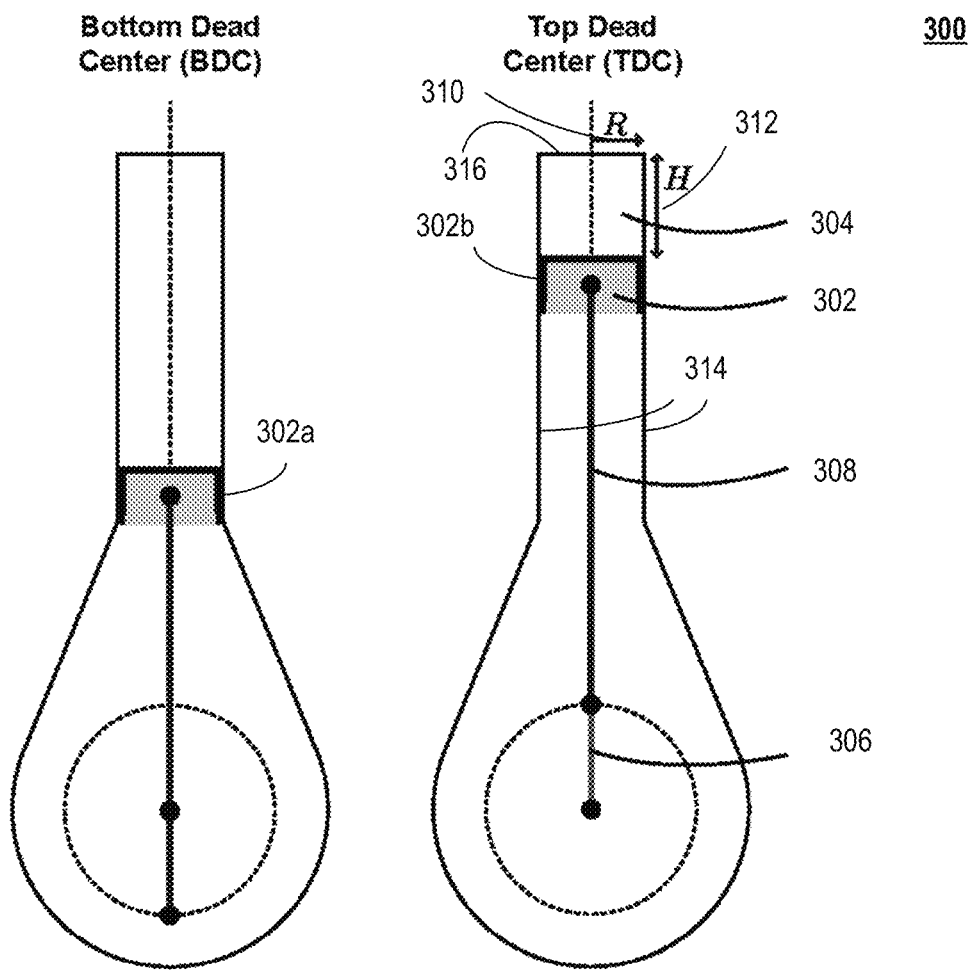
FIG. 3 depicts an exemplary embodiment illustrating exemplary main reciprocating internal-combustion (IC) engine piston positions, namely the bottom dead center (BDC) position and the top dead center (TDC) position, according to an exemplary embodiment.

FIG. 3 depicts an exemplary embodiment of an exemplary diagram 300 illustrating exemplary main reciprocating IC engine piston positions 302a and 302b, namely the bottom dead center (BDC) position 302a (left) and the top dead center (TDC) position 302b (right), according to an exemplary embodiment. As illustrated, an exemplary piston 302 may be coupled by an exemplary connecting rod 308, and/or to an exemplary crank 306, according to an exemplary embodiment. According to an exemplary embodiment, an exemplary engine core 304 may comprise a volume internal to an exemplary cylindrical piston case 314, and bounded between a circular endcap 316 and the exemplary piston 302, where the engine core 304 may be cylindrical in shape, and may thus have an exemplary radius R 310, and exemplary height H 312, which may be variable depending on the position of piston 302, as it moves reciprocatingly between positions 302a and 302b, according to an exemplary embodiment.

The ideal Otto cycle assumes that all processes are internally reversible and the working fluid is an ideal gas with constant specific heats. FIG. 2 illustrates an exemplary process diagram 200 for an exemplary ideal Otto cycle, which will now be discussed with reference to the exemplary piston 302 of diagram 300 of FIG. 3, according to an exemplary embodiment. In state 1 of process diagram 200 (see FIG. 2), the piston 302 is located in the bottom dead center (BDC) position 302a (see FIG. 3) and a mass of fuel (M) is confined within a cylindrical engine core 314 (bounded between the piston case 314, piston 302, and endcap 316) of volume $V_1 = \pi R^2 H_1$, where R is the cylinder radius 310, H is the cylinder height 312, and subscripts refer to the state of process diagram 200, according to an exemplary embodiment. During exemplary process 1-2 of process diagram 200, the fuel is isentropically compressed, according to an exemplary embodiment. In state 2 of process diagram 200, according to an exemplary embodiment, the piston 302 is located in the top dead center (TDC) position 302b (see FIG. 3) and the compression ratio (r) is given by $$r = \frac{v_1}{v_2} = \frac{\rho_2}{\rho_1} = \frac{H_1}{H_2}, \quad (1)$$

where v=V/M is the specific volume of the fuel and ρ=M/V is the mass density of the fuel in the exemplary engine core 304, and the subscripts refer to the state of process diagram 200, according to an exemplary embodiment. During exemplary process 2-3 of process diagram 200, combustion occurs at constant volume and the system releases energy (Q) in the working fluid, according to an exemplary embodiment. In exemplary process 3-4 of process diagram 200, the fuel isentropically expands and the piston 302 returns to the BDC position 302a, according to an exemplary embodiment. Finally, during exemplary process 4-1 of process diagram 200, the fuel is cooled at constant volume and the cycle is complete, according to an exemplary embodiment.

For an exemplary fuel, with an exemplary fixed specific heat ratio ($\gamma$), the exemplary thermal efficiency ($\eta$) of the exemplary ideal Otto cycle is only a function of the compression ratio r, according to an exemplary embodiment:

$$\eta = 1 - r^{1-\gamma}. \quad (2)$$

Thus, the ideal efficiency increases with the compression ratio, according to an exemplary embodiment. The remaining thermodynamic properties can be expressed relative to their initial state with the introduction of one more dimensionless parameter, according to an exemplary embodiment, namely $$\xi = \frac{Q}{Mc_v T_1}, \quad (3)$$

where $c_v$ is the constant-volume specific heat and T is the fuel temperature, according to an exemplary embodiment. This quantity $\xi$ is the ratio of energy deposited into the working fluid during process 2-3 of process diagram 200, divided by the heat content of the gas in state 1 of process diagram 200, according to an exemplary embodiment.

Similar to the dimensionless representation of the air cycle given by Taylor in C. F. TAYLOR, *The Internal-Combustion Engine in Theory and Practice; Volume I: Thermodynamics, Fluid Flow, Performance*, The MIT Press, Cambridge, second revised edition, (1985), we can formulate the following fuel pressure (p) and temperature ratios:

$$\frac{p_2}{p_1} = r^\gamma, \frac{p_3}{p_1} = r^\gamma + r\xi, \quad (4)$$

$$\frac{T_2}{T_1} = r^{\gamma-1}, \frac{T_3}{T_1} = r^{\gamma-1} + \xi. \quad (5)$$

It is also useful to define the mean effective pressure (mep), according to an exemplary embodiment, as the ratio of the net work done by the cycle, of process diagram 200, to the cylinder displacement volume, according to an exemplary embodiment. In terms of dimensionless parameters the mep, according to an exemplary embodiment, is given by $$\frac{mep}{p_1} = \xi \frac{1 - \left(\frac{1}{r}\right)^{\gamma-1}}{(\gamma - 1)\left(1 - \frac{1}{r}\right)}. \quad (6)$$

The work done in applying the mep to the piston 302 during the entire expansion process 3-4 of process diagram in 200 is equivalent to the work of the actual cycle, according to an exemplary embodiment.

Figure 4:
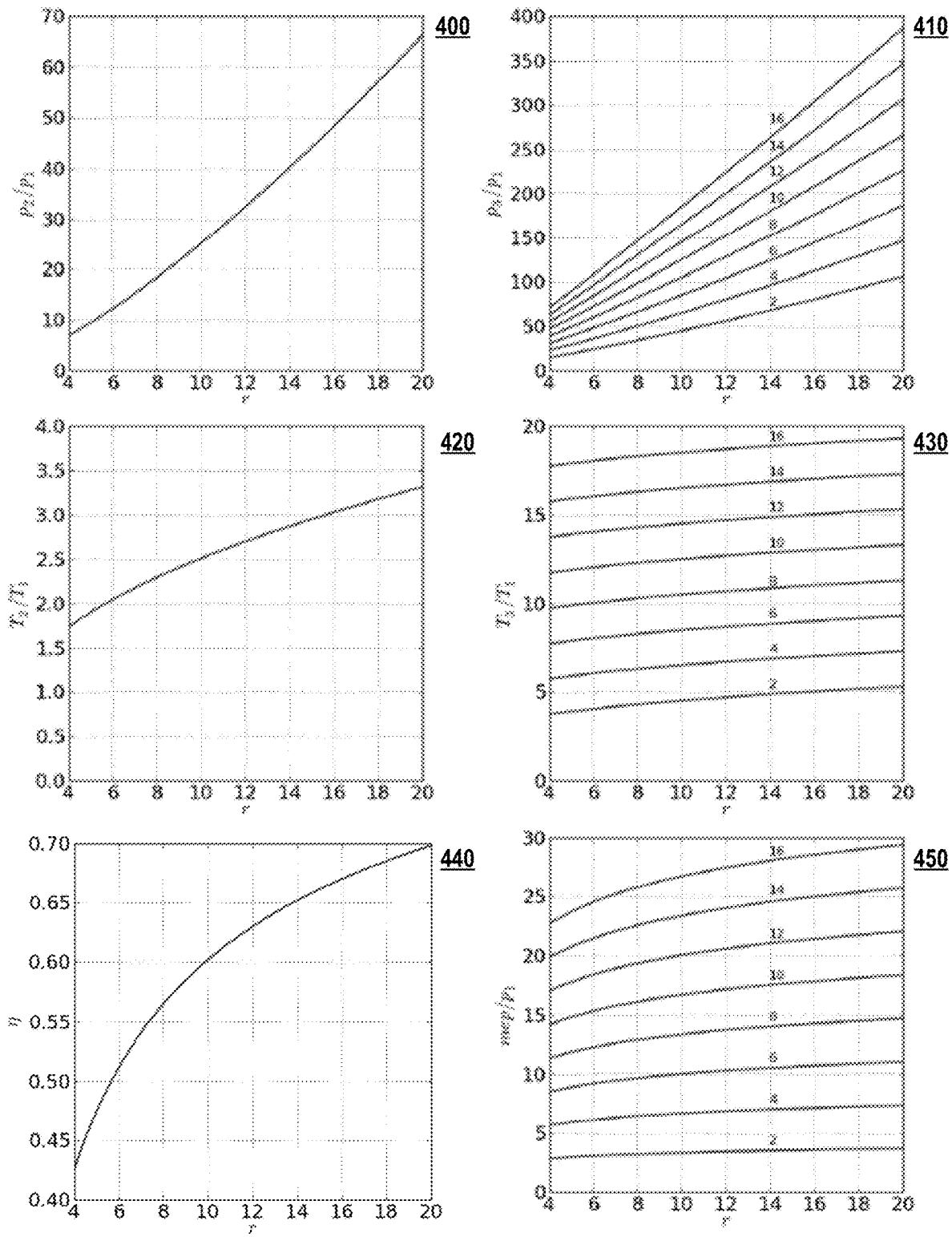
FIG. 4 depicts an exemplary embodiment of exemplary characteristics of the ideal Otto cycle, namely pressure ratios, temperature ratios, thermal efficiency, and mean effective pressure as a function of the dimensionless parameters r and $\xi$, according to an exemplary embodiment.

FIG. 4 depicts an exemplary embodiment of exemplary characteristics 400-450, namely pressure ratios 400 (Eq. 4, left) and 410 (Eq. 4, right), temperature ratios 420 (Eq. 5, left) and 430 (Eq. 5, right), thermal efficiency 440 (Eq. 2), and mean effective pressure 450 (Eq. 6) of the ideal Otto cycle (see FIG. 2) as a function of the dimensionless parameters r (Eq. 1) and ξ (Eq. 3); where curve labels correspond to ξ, according to an exemplary embodiment.

III. Exemplary Nanofuel Properties

The approach we will take to identify important nanofuel engine design principles, according to an exemplary embodiment, closely parallels the orthodox nuclear engineering technique for calculating the effective multiplication factor ($k_{eff}$) by division into an infinite medium multiplication factor ($k_\infty$), which depends on the nuclear fuel properties, and a nonleakage probability ($P_{NL}$), which depends on the reactor core geometry, according to an exemplary embodiment of the present invention. See J. J. DUDERSTADT and L. J. HAMILTON, *Nuclear Reactor Analysis*, John Wiley & Sons, New York (1976), S. GLASSTONE and M. C. EDLUND, "The elements of nuclear reactor theory. Part I," 1099, ORNL (1952), R. V. MEGHREBLIAN and D. K. HOLMES, *Reactor Analysis*, McGraw-Hill Book Company, New York (1960), and W. M. STACEY, *Nuclear Reactor Physics*, Wiley-VHC Verlag GmbH & Co., Germany, second edition, (2007). Here we will explore several exemplary nanofuel properties and highlight the safety advantages of a negative temperature coefficient of reactivity ($\alpha_T$), according to an exemplary embodiment of the present invention. In the next section we will consider an exemplary engine core geometry, according to an exemplary embodiment of the present invention.

An exemplary nanofuel, which is the working fluid in the exemplary nanofuel engine 102, is composed of an exemplary, but nonlimiting, six (6) ingredients, according to an exemplary embodiment of the present invention:

Fissile Fuel may include a nuclide, according to an exemplary embodiment, that may undergo thermal neutron induced fission, according to an exemplary embodiment. The most common examples are $^{239}$Pu, $^{235}$U, and $^{233}$U, according to an exemplary embodiment.

Passive Agent may include a nuclide with a strong resonance neutron absorption cross-section in the low epithermal energy range, according to an exemplary embodiment. For example, $^{239}$Pu has a large resonance neutron absorption cross-section near 1 eV, according to an exemplary embodiment.

Moderator may include a low atomic number element such as, e.g., but not limited to, H and He, etc., according to an exemplary embodiment. The role of the moderator, according to an exemplary embodiment, is to thermalize the neutron population and absorb fission fragment kinetic energy, according to an exemplary embodiment.

Fertile Fuel may include a nuclide, according to an exemplary embodiment, that may undergo neutron induced transmutation into a fissile nuclide, according to an exemplary embodiment. Also known as breeding material, according to an exemplary embodiment. Two practical examples are $^{238}$U (for $^{239}$Pu), and $^{232}$Th (for $^{233}$U), according to an exemplary embodiment.

Transuranic Elements may include, according to an exemplary embodiment, all elements with atomic number Z greater than 92 (Z>92), according to an exemplary embodiment. This definition, according to an exemplary embodiment, may intentionally include material that is considered by the U.S. Atomic Energy Act of 1954 to be high-level waste (HLW) and transuranic (TRU) waste, according to an exemplary embodiment. See "Atomic Energy Act of 1954, as Amended," 1954, United States Public Law 83-703.

Fission Products may include all fission reaction products, according to an exemplary embodiment. The fission products may also be interpreted, according to an exemplary embodiment, as all matter not covered by the other ingredients, according to an exemplary embodiment.

Nano, with reference to exemplary nanofuel, according to an exemplary embodiment, may be used to emphasize the general presence of molecules and complex clusters in the fuel that may have dimensions on the nanometer scale and introduce quantum phenomena that may affect engine performance, according to an exemplary embodiment. In general, the theoretical and computational modeling of nanofuel properties may be very intensive, according to an exemplary embodiment. For instance, the mixture of uranium dioxide ($UO_2$) and molecular hydrogen ($H_2$) is an aerosol that may behave as a colloidal system with solid particle clusters dispersed in a gaseous medium, according to an exemplary embodiment. In order to minimize the modeling complexity, and thereby reduce the uncertainty in predicting engine performance, we will, according to an exemplary embodiment, initially focus on ingredients that are believed to form a homogeneous gaseous molecular mixture, according to an exemplary embodiment.

As a starting point, let us take a subset of the nanofuel ingredients, according to an exemplary embodiment, and study their interplay. In particular, we may select the following nanofuel ingredients, according to an exemplary embodiment: $^{239}$PuF$_6$ for the fissile fuel, $^{240}$PuF$_6$ for the passive agent, and $H_2$ for the moderator, according to an exemplary embodiment. The potential use of fertile fuel is briefly mentioned herein; the addition of transuranic elements, according to an exemplary embodiment, is covered in Sec. VII; and the presence of fission products (and their delayed neutrons), according to an exemplary embodiment, is utilized in Sec. VI. Compared to uranium (U) alternatives, plutonium (Pu), according to an exemplary embodiment, lends to smaller critical assemblies and is readily available through the exemplary pyrochemical processing of existing commercial LWR SNF (see FIG. 20, 2016)—both points have significant economic advantages, according to an exemplary embodiment. Plutonium hexafluoride (PuF$_6$) is a gas at temperatures above T=323.9 K, which may permit low engine inlet temperatures, according to an exemplary embodiment. See E. R. JETTE, J. F. LEMONS, and A. E. FLORIN, "Plutonium hexafluoride: second report on the preparation and properties," LA-1168, LANL (1950), and B. WEINSTOCK and J. G. MALM, "The properties of plutonium hexafluoride," *J. Inorg. Nucl. Chem.*, 2, 380 (1956).

According to an exemplary embodiment, creating a homogeneous gaseous molecular mixture of these nanofuel ingredients, according to an exemplary embodiment, involves a few exemplary chemistry stages. First, according to an exemplary embodiment, (with or without isotope separation), a solid plutonium tetrafluoride (PuF$_4$) mixture of the fissile fuel and passive agent is formed, according to an exemplary embodiment. Solid PuF$_4$, according to an exemplary embodiment, allows for safe (due to containment) and efficient (due to the large density) transport, according to an exemplary embodiment. Next, the PuF$_4$ is loaded into a fluorination reactor, according to an exemplary embodiment, and converted into plutonium hexafluoride (PuF$_6$) via the exemplary chemical reaction of Eq. 7:

$$PuF_4 + F_2 \rightarrow PuF_6 \quad (7)$$

Finally, according to an exemplary embodiment, PuF$_6$ and H$_2$ (the moderator) are mixed until the desired concentration is achieved. Since PuF$_6$ reacts slowly with Hz, this last stage is an active part of a nanofuel engine 102 fuel cycle 104 (see FIG. 1), according to an exemplary embodiment. See M. J. STEINDLER, "Laboratory Investigations in Support of Fluid Bed Fluoride Volatility Processes Part II. The Properties of Plutonium Hexafluoride," ANL-6753, ANL (1963).

Given the feasibility of creating a nanofuel, according to an exemplary embodiment, let us turn to the numerical calculation of $k_\infty$ and $\alpha$ (the neutron population exponential growth factor), according to an exemplary embodiment. The ensuing numerical simulations, according to an exemplary embodiment, may: (1) use a Monte Carlo method to solve the infinite medium neutron transport problem for a homogeneous fuel mixture; (2) rely on nuclear data from the LLNL evaluated nuclear data library (ENDL) (see R. J. HOWERTON et al., "The LLL evaluated nuclear data library (ENDL): Evaluation techniques, reaction index, and descriptions of individual evaluations," UCRL-50400, Volume 15, Part A, LLNL (1975)) and the National Nuclear Data Center at the Brookhaven National Laboratory (BNL) evaluated nuclear data file (ENDF) (see P. F. ROSE, "ENDF-201, ENDF/B-VI Summary Documentation," BNL-NCS-17541, BNL (1991) and Brookhaven National Laboratory, National Nuclear Data Center: accessible at: http://www.nndc.bnl.gov/); (3) assume a fixed nanofuel T=800 K and ρ=0.02 g/cm³; and (4) ignore the effects of delayed neutrons, etc., according to an exemplary embodiment.

Figure 5A:
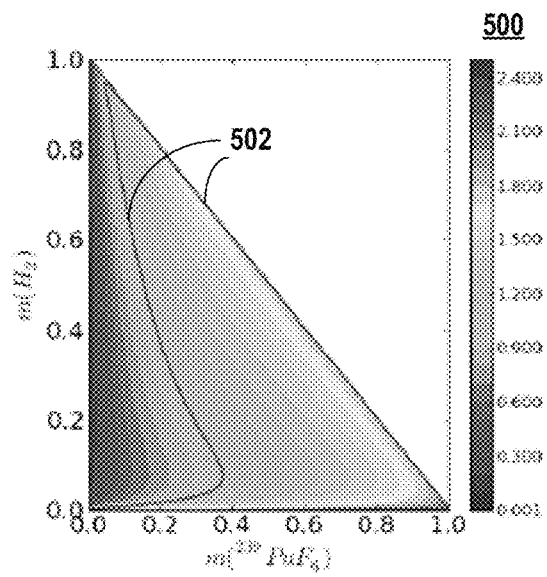
FIGS. 5A and 5B depict an exemplary embodiment of exemplary 5,151 Monte Carlo neutron transport simulations, depicting in FIG. 5A a plot of the quantity $k_\infty$ and in FIG. 5B a plot of the quantity $\alpha$, as a function of the nanofuel ingredient mass fractions m($H_2$, $^{239}PuF_6$, $^{240}PuF_6$), according to an exemplary embodiment; more specifically, FIG. 5A plots $k_\infty$ as a function of the nanofuel ingredient mass fractions m($H_2$, $^{239}PuF_6$, $^{240}PuF_6$), according to an exemplary embodiment, and FIG. 5B plots $\alpha$ as a function of the nanofuel ingredient mass fractions m($H_2$,$^{239}PuF_6$,$^{249}PuF_6$), according to an exemplary embodiment.
Figure 5B:
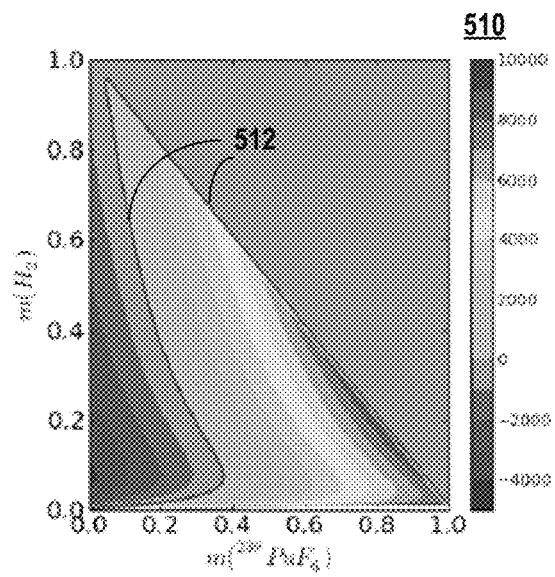

FIGS. 5A and 5B depict an exemplary embodiment of exemplary 5,151 Monte Carlo neutron transport simulations, depicting in FIG. 5A in graph 500 a plot of the quantity $k_\infty$ and in FIG. 5B in graph 510 a plot of the quantity $\alpha$, as a function of the nanofuel ingredient mass fractions m(H$_2$), $^{239}$PuF$_6$, $^{240}$PuF$_6$), according to an exemplary embodiment. More specifically, FIG. 5A in exemplary graph 500 plots $k_\infty$ as a function of the nanofuel ingredient mass fractions m(H$_2$, $^{239}$PuF$_6$, $^{240}$PuF$_6$), according to an exemplary embodiment. In FIG. 5A, the solid black contour 502 corresponds to $k_\infty$=1, according to an exemplary embodiment. FIG. 5B in exemplary graph 510 plots $\alpha$ as a function of the nanofuel ingredient mass fractions m(H$_2$,$^{239}$PuF$_6$,$^{240}$PuF$_6$), according to an exemplary embodiment. In FIG. 5B, the solid black contour 512 corresponds to α=0 gen/s, according to an exemplary embodiment.

In both FIGS. 5A and 5B, the abscissa (i.e., x$_1$-coordinate) reflects the $^{239}$PuF$_6$ mass fraction, the ordinate, (i.e., x$_2$-coordinate) reflects the H$_2$ mass fraction, and there are n=101 data points in each dimension, according to an exemplary embodiment. The $^{240}$PuF$_6$ mass fraction, according to an exemplary embodiment, is given by $$m(^{240}\text{PuF}_6)=1-m(^{239}\text{PuF}_6)-m(\text{H}_2), \quad (8)$$

and both FIGS. 5A and 5B contain an exemplary n(n+1)/2=5,151 simulation results, according to an exemplary embodiment.

FIGS. 5A and 5B (collectively FIG. 5) clearly illustrate a large supercritical ($k_\infty$>1, α>0 gen/s) domain, according to an exemplary embodiment. Numerous supercritical nanofuels have substantial moderator mass fractions; a few interesting results are reported in Table I below, according to an exemplary embodiment.

Also, FIG. 5A in exemplary graph 500 shows that $k_\infty$>2 for small values of m(H$_2$) and m($^{240}$PuF$_6$) (or large values of m($^{239}$PuF$_6$)) which is not obvious given the abundance of F atoms present in the nanofuel, according to an exemplary embodiment. In an ideal steady-state breeding system, according to an exemplary embodiment, this limit may allow one neutron to continue the chain reaction and the other neutron to create new fissile fuel, according to an exemplary embodiment. In a nanofuel engine 102, according to an exemplary embodiment, this suggests that a modest breeding ratio may be obtained with the introduction of a fertile fuel such as $^{238}$UF$_6$, according to an exemplary embodiment.

TABLE I sets forth a table listing various exemplary nanofuels and their properties at T=879 K and ρ=0.02 g/cm³.

TABLE I

| label | m(H$_2$) | m($^{239}$PuF$_6$) | m($^{240}$PuF$_6$) | $k_\infty$ | α [gen/s] |
|---|---|---|---|---|---|
| a | 0.50 | 0.34 | 0.16 | 1.402 | 3,115 |
| b | 0.50 | 0.40 | 0.10 | 1.506 | 4,242 |
| c | 0.50 | 0.45 | 0.05 | 1.607 | 5,324 |
| d | 0.60 | 0.27 | 0.13 | 1.404 | 2,516 |
| e | 0.60 | 0.32 | 0.08 | 1.510 | 3,470 |
| f | 0.60 | 0.36 | 0.04 | 1.604 | 4,324 |
| g | 0.70 | 0.21 | 0.09 | 1.414 | 2,005 |
| h | 0.70 | 0.24 | 0.06 | 1.493 | 2,573 |
| i | 0.70 | 0.28 | 0.02 | 1.612 | 3,445 |

The role of $\alpha$ is to exponentially alter the neutron population (N), i.e., $$N(t)=N_0 e^{\alpha t}, \quad (9)$$

where N$_0$ is the initial neutron population at some reference time (t=0 s), according to an exemplary embodiment. When the engine is in state 2 of process diagram 200 of the ideal Otto cycle (see FIG. 2), $\alpha$ controls the neutron population growth rate and affects the amount of energy released, according to an exemplary embodiment. For example, after solving Eq. 9 for t, we find $$t = \frac{1}{\alpha}\ln\left(\frac{N(t)}{N_0}\right), \quad (10)$$

where one can see that it takes 10 ms for the neutron population to increase by 10 orders of magnitude when α=2,303 gen/s, according to an exemplary embodiment. FIG. 5B and Table I show that numerous nanofuels have α values on the order of a few times 10³ gen/s, i.e., several thousands of gen/s, according to an exemplary embodiment.

Another important nanofuel property, according to an exemplary embodiment, is the temperature coefficient of reactivity ($\alpha_T$):

$$\alpha_T = \frac{\partial}{\partial T}\left(\frac{k-1}{k}\right) = \frac{1}{k^2}\frac{\partial k}{\partial T}. \quad (11)$$

A negative $\alpha_T$ means that the neutron multiplication factor (k) decreases as the nanofuel temperature increases, according to an exemplary embodiment. A positive $\alpha_T$ means that the neutron multiplication factor increases as the nanofuel temperature increases, according to an exemplary embodiment. Since k is a positive number, the sign of $\alpha_T$ is proportional to the derivative of k(T).

Figure 6A:
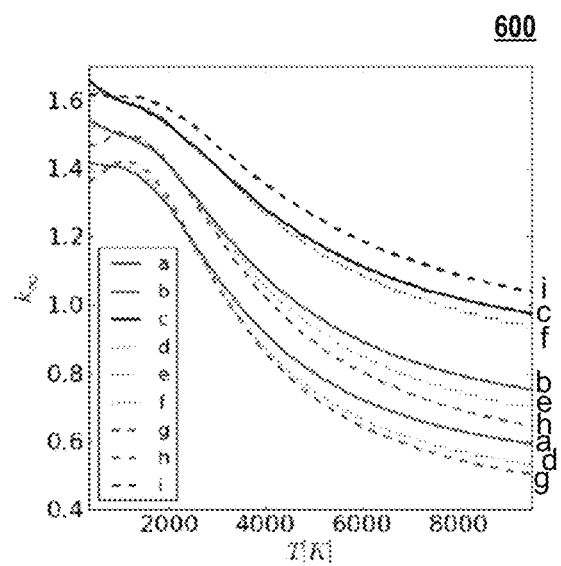
FIGS. 6A and 6B depict an exemplary embodiment of exemplary 639 Monte Carlo neutron transport simulations, as a function of the nanofuel temperature, according to an exemplary embodiment; particularly.
Figure 6B:
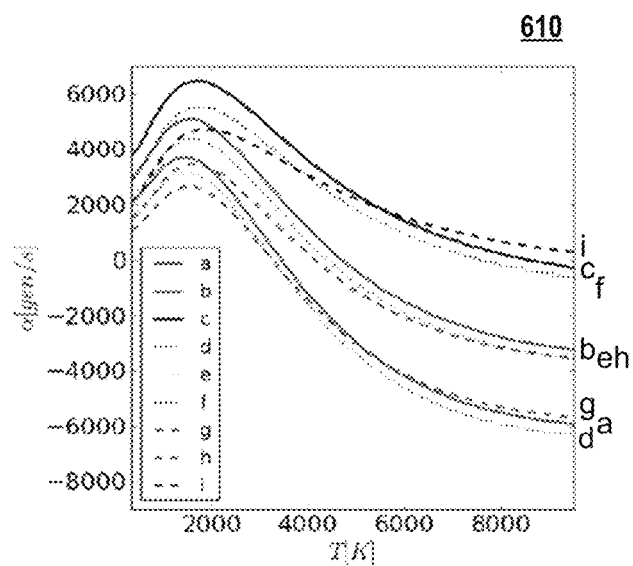

FIGS. 6A and 6B depict an exemplary embodiment of exemplary 639 Monte Carlo neutron transport simulations, as a function of the nanofuel temperature, according to an exemplary embodiment. Particularly, FIG. 6A depicts in graph 600, $k_\infty$(T), namely $k_\infty$, and FIG. 6B in graph 610 depicts α(T), namely α, both as a function of the nanofuel temperature T, and the legend label refers to various exemplary nanofuels, according to an exemplary embodiment, defined in Table I, according to an exemplary embodiment.

FIG. 6A in exemplary graph 600 plots $k_\infty$ as a function of T, for the various exemplary nanofuels identified in Table I above, according to an exemplary embodiment, and shows a large k'(T)<0 domain. In particular, for Fuel c, $\alpha_T$<0 1/K across the entire temperature domain, according to an exemplary embodiment. FIG. 6B in exemplary graph 610 plots $\alpha$ as a function of T, for the various exemplary nanofuels identified in Table I, according to an exemplary embodiment. From a safety perspective, a negative $\alpha_T$ ensures that the nanofuel stops releasing energy once a critical temperature is reached and places an upper limit on the energy produced during combustion, according to an exemplary embodiment.

This important safety feature merits further discussion. In an exemplary nanofuel engine 102, according to an exemplary embodiment, during the Otto cycle combustion process 2-3 of process diagram 200 (see Sec. II), the fission energy production rate is proportional to the neutron population, according to an exemplary embodiment. At the beginning of the combustion process, according to an exemplary embodiment, the nanofuel is supercritical (k>1 and $\alpha$>0 gen/s) and the injection of neutrons starts an exponential growth in the neutron population according to Eq. 9, according to an exemplary embodiment. These neutrons induce fission in the fissile fuel, according to an exemplary embodiment, the moderator absorbs the kinetic energy of the fission fragments, according to an exemplary embodiment (which accounts for 80% of the total energy released during fission), and the nanofuel temperature increases, according to an exemplary embodiment. Now, since $\alpha_T$<0 1/K, the exponential neutron population growth rate is slowing down and eventually, according to an exemplary embodiment, the nanofuel turns subcritical (k<1 and $\alpha$<0 gen/s), according to an exemplary embodiment. At this point, the neutron population exponentially decays and the combustion process reaches an end, according to an exemplary embodiment.

The physical explanation for $\alpha_T$<0 1/K involves the strong resonance neutron absorption cross-section in the passive agent, according to an exemplary embodiment. Due to collisions with the moderator, the neutron velocity distribution function rapidly relaxes toward a Maxwellian velocity distribution characterized by the nanofuel, according to an exemplary embodiment. As the nanofuel temperatures increases, and the neutron velocity distribution function broadens, there are more neutrons with energies near the passive agent resonance absorption cross-section, according to an exemplary embodiment. This creates a neutron sink that significantly increases with the nanofuel temperature, according to an exemplary embodiment.

IV. Exemplary Engine Core Geometry

In this section, we will consider the exemplary nanofuel reciprocating engine core 304 geometry, according to an exemplary embodiment. In particular, assuming the exemplary nanofuel composition is uniform and the engine core 304 geometry is bare (no reflector), we may develop an analytic criticality condition that expresses the engine core critical radius ($R_c$) as a function of the compression ratio, according to an exemplary embodiment. One important safety corollary of this analytic criticality condition is that a nanofuel engine 102 is subcritical when the engine core radius (R) 310 is less than the critical radius (R<$R_c$), according to an exemplary embodiment.

With the exemplary engine piston 302 in the TDC position 302b (see FIG. 3 above), the exemplary nanofuel engine 102 exemplary reciprocating engine core 304 geometry is a right circular cylinder with radius R 310 and height H 312. Note that, similar to the definition of the reactor core in nuclear engineering, the engine core 304 contains the nanofuel. Neutron leakage is proportional to the engine core 304 surface S=$2\pi R(R+H)$ to volume V=$\pi R^2 H$ ratio, i.e., see Eq. 12, $$\frac{S}{V} = \frac{2}{R} + \frac{2}{H}. \tag{12}$$

In order to optimize engine performance, we minimize this quantity by: considering a unit engine core 304 volume V=$\pi R^2 H$=1, letting H=xR, and looking for solutions where the derivative vanishes. Performing these steps, according to an exemplary embodiment: R=$(\pi x)^{-1/3}$, f(x)=S/V= $2\pi^{1/3} x^{-2/3}(1+x)$, f'(x)=$\frac{2}{3}\pi^{1/3}(x-2)x^{-5/3}$, and a solution is x=2. Thus, H=2R minimizes the neutron leakage from the engine core 304 and defines the optimal nanofuel volume V=$2\pi R^3$.

Now let us consider a cylindrical engine core 304 that contains a homogeneous nanofuel mixture and is surrounded by a vacuum, according to an exemplary embodiment. From one-speed diffusion theory, we can write the general criticality condition as Eq. 13:

$$B_m^2 = B_g^2, \tag{13}$$

where $B_m^2$ is the material buckling (nanofuel properties) and $B_g^2$ is the geometric buckling (engine core 304 geometry), according to an exemplary embodiment. The material buckling is determined by the nanofuel properties according to Eq. 14:

$$B_m^2 = \frac{k_\infty - 1}{L^2}, \tag{14}$$

where L=$\sqrt{D/\Sigma_a}$ is the neutron diffusion length (a measure of how far neutrons will travel from their source before they are absorbed), D is the neutron diffusion coefficient, and $\Sigma_a$ is the macroscopic neutron absorption cross-section, according to an exemplary embodiment. The geometric buckling is determined by the engine core 304 geometry according to Eq. 15:

$$B_g^2 = \left(\frac{v_0}{\bar{R}_c}\right)^2 + \left(\frac{\pi}{\bar{H}_c}\right)^2, \tag{15}$$

where $v_0$=2.40483 is the first zero of the Bessel function of the first kind ($J_0(x)$), $\bar{R}_c$ is the extrapolated critical radius, according to an exemplary embodiment, $\bar{H}_c$ is the extrapolated critical height, according to an exemplary embodiment. In what follows, we will use the extrapolated distance (d) for a vacuum boundary condition, i.e., Eq. 16, $$d=0.7104\lambda_{tr}=2.131D, \tag{16}$$

where $\lambda_{tr}$=3D is the neutron transport mean free path, according to an exemplary embodiment.

After substituting Eqs. 14 and 15 into the general criticality condition given by Eq. 13, using the optimal engine core 304 geometry (H=2R), and solving for the extrapolated critical radius, we find, Eq. 17.

$$\widetilde{R}_c = \sqrt{\frac{L^2}{k_\infty - 1}\left(v_0^2 + \frac{\pi^2}{4}\right)}. \quad (17)$$

The critical radius is given by $R_c = \widetilde{R}_c - d$ and the critical mass is given by $M_c = \rho V = \rho 2\pi R_c^3$. For the various exemplary nanofuels identified in Table I above, several values of the critical radius and critical mass are given in Table II below, according to an exemplary embodiment. These nanofuel properties were calculated using the Monte Carlo neutron transport method described in Sec. III and correspond to an exemplary thermal energy group. In particular, for Fuel c, according to an exemplary embodiment, we find: $R_c$=45.94 cm, $M_c$=12.18 kg, and $M_c(^{239}PuF_6)$=5.481 kg.

TABLE II sets forth a table of critical engine core 304 characteristics for the exemplary nanofuels identified in Table I, according to an exemplary embodiment.

TABLE II

| label | L [cm] | D [cm] | $\Sigma_a$ [1/m] | $\widetilde{R}_c$ [cm] | $R_c$ [cm] | $M_c$ [kg] |
|---|---|---|---|---|---|---|
| a | 13.14 | 1.186 | 0.6869 | 59.53 | 57.00 | 23.27 |
| b | 13.14 | 1.180 | 0.6834 | 53.06 | 50.54 | 16.22 |
| c | 13.14 | 1.174 | 0.6800 | 48.44 | 45.94 | 12.18 |
| d | 12.66 | 1.006 | 0.6277 | 57.21 | 55.07 | 20.99 |
| e | 12.66 | 1.002 | 0.6252 | 50.92 | 48.78 | 14.59 |
| f | 12.67 | 0.9988 | 0.6222 | 46.83 | 44.70 | 11.22 |
| g | 12.39 | 0.8724 | 0.5683 | 55.31 | 53.45 | 19.19 |
| h | 12.40 | 0.8707 | 0.5663 | 50.73 | 48.83 | 14.63 |
| i | 12.41 | 0.8683 | 0.5638 | 45.57 | 43.72 | 10.50 |

In designing a nanofuel reciprocating engine 102, it is more useful to consider $R_c$ as a function of r. We begin by returning to the ideal Otto cycle (see FIG. 2) with the engine piston 302 in the BDC position 302*a* (see FIG. 3), according to an exemplary embodiment. Next, we let $H_c=H_1/r$ (accounting for the change in engine core 304 volume) and $L=L_1/r$ (since the neutron diffusion length is proportional to the nanofuel density), according to an exemplary embodiment. Now, during the compression process 1-2 of process diagram 200, r increases (from a value of r=1 in state 1 of process diagram 200) as the engine piston 302 moves toward the TDC position 302*b* (see FIG. 3), according to an exemplary embodiment. After plugging these new expressions into the general criticality condition given by Eq. 13 and solving for the critical radius, we find Eq. 18:

$$R_c = \frac{v_0}{r}\left\{\frac{k_\infty - 1}{L_1^2} - \frac{\pi^2}{(H_1 + 2dr)^2}\right\}^{-1/2} - d. \quad (18)$$

This expression shows that $R_c \sim 1/r$. In particular, for exemplary Fuel c and $H_1$=918.9 cm, according to an exemplary embodiment, we expand Eq. 18 in r to find Eq. 19:

$$R_c[cm] \cong \frac{496.4}{r} - 3.848 - O(r^2). \quad (19)$$

The corresponding initial critical mass is $M_c$=1,537 kg.

This large critical radius (enormous critical mass) is easy to understand using a simple column density argument and is the primary reason why gaseous nuclear technology has not been heavily explored, according to an exemplary embodiment. The column density in spherical geometry is $\rho R_s$, according to an exemplary embodiment, where $R_s$ is the spherical radius. In order to maintain a critical spherical assembly, any change in $\rho$ must be accompanied by a change in $R_s$ in such a way that $\rho R_s$ remains constant. For transitions from state a to state b, this column density argument implies the following mass Eq. 20 and volume Eq. 21 scaling:

$$M_b = M_a\left(\frac{\rho_a}{\rho_b}\right)^2, \quad (20)$$

$$V_b = V_a\left(\frac{\rho_a}{\rho_b}\right)^3. \quad (21)$$

Thus, in transitioning from a solid fuel to a gaseous fuel, the density decreases by $10^{-3}$ and the critical mass increases by $10^6$, and the volume increases by $10^9$, according to an exemplary embodiment. Stating more plainly, increasing the size of a commercial nuclear power plant by a factor of $10^9$ (a billion) is not very appealing.

Conversely, in a nanofuel engine 102, referring to FIG. 3, according to an exemplary embodiment, we use this scaling to our advantage. As the engine piston 302 of FIG. 3 moves from state 1 of process diagram 200 (BDC position 302*a*) to state 2 of process diagram 200 (TDC position 302*b*), the nanofuel density increases by a factor of r and the nanofuel critical mass decreases by a factor of $r^2$, according to an exemplary embodiment. In designing an exemplary nanofuel engine 102, according to an exemplary embodiment, we intentionally select the engine core radius 310 to ensure that the critical radius is less than the engine core radius 310 only when the piston 302 is near the TDC position 302*b*. In other words, a nanofuel engine 102 is only supercritical (R>$R_c$), when the piston 302 is near the TDC position 302*b*, according to an exemplary embodiment.

Figure 7:
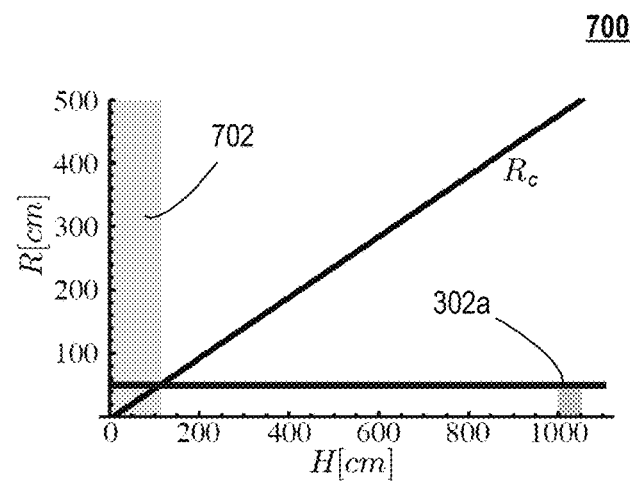
FIG. 7 depicts an exemplary embodiment of an exemplary engine core critical radius $R_c$, according to an exemplary embodiment, for exemplary Fuel c (in Tables I and II), according to an exemplary embodiment, as a function of an exemplary engine core height H, according to an exemplary embodiment.

FIG. 7 depicts an exemplary embodiment of an exemplary graph 700, plotting an exemplary engine core critical radius $R_c$, according to an exemplary embodiment, for exemplary Fuel c (in Tables I and II), according to an exemplary embodiment, as a function of an exemplary engine core height H 312, according to an exemplary embodiment. The engine core 304 has a radius R=50 cm 310 and an initial height $H_1$=1,000 cm 312. FIG. 7 illustrates that a critical assembly is formed when height H=111.6 cm 312, which is near the optimal TDC position 302*b* with height $H_2$=100 cm 312, according to an exemplary embodiment.

The dynamic engine core 304 geometry, according to an exemplary embodiment, may introduce two important exemplary safety features, according to an exemplary embodiment. Now reviewing FIG. 7 and graph 700, one may see first, since the engine is subcritical (R<$R_c$) for a majority of the Otto cycle, according to an exemplary embodiment, any accidental injection of neutrons or the presence of background neutrons has little effect on the nanofuel, according to an exemplary embodiment. The spurious neutron population, according to an exemplary embodiment, will simply exponentially decay in time. Second, the change in engine core 304, according to an exemplary embodiment, is another means of placing an upper limit on the energy produced during combustion, according to an exemplary embodiment. Energy production ceases, according to an exemplary embodiment, once the engine core 304 is too large, according to an exemplary embodiment.

V. Exemplary Operation

Hitherto, according to an exemplary embodiment, we have taken a nuclear engineering approach to nanofuel engine 102 design that has provided an estimate of the overall engine size and discussed the scientific basis of two important safety features, namely the nanofuel negative temperature coefficient of reactivity ($\alpha_T<0$ 1/K) and the engine core geometry condition necessary for energy production ($R>R_c$), according to an exemplary embodiment. Now let us discuss the ideal Otto cycle for an exemplary nanofuel engine 102 and quantify several characteristics of the combustion process, according to an exemplary embodiment.

FIG. 2 illustrates an exemplary process diagram 200 for an exemplary ideal Otto cycle, which will now be discussed with reference to the exemplary piston 302 of diagram 300 of FIG. 3, according to an exemplary embodiment. In state 1 of process diagram 200 (see FIG. 2), the exemplary nanofuel engine 102 piston 302 is located in the bottom dead center (BDC) position 302a (see FIG. 3) and a mass of nanofuel (M) is confined within an engine core 304 of volume $V_1 = \pi R^2 H_1$, according to an exemplary embodiment. During process 1-2 of process diagram 200, according to an exemplary embodiment, the nanofuel is isentropically compressed and a critical assembly is formed when $R=R_c$, where $R_c$ is a strong function of r (see Eq. 18). In state 2 of process diagram 200, according to an exemplary embodiment, the exemplary nanofuel engine 102 piston 302 is located in the TDC position 302b, the exemplary nanofuel engine 102 is supercritical ($R>R_c$), according to an exemplary embodiment, and the nanofuel properties are given by: $\rho_2 = r\rho_1$ (see Eq. 1), $T_2 = r^{\gamma-1}T_1$ (see Eq. 5), and $p_2 = r^\gamma p_1$ (see Eq. 4). During process 2-3 of process diagram 200, according to an exemplary embodiment, a neutron source ignites the nanofuel and energy is released until either the nanofuel is too hot (due to $\alpha_T<0$ 1/K) or the engine core 304 is too large (due to $R<R_c$), according to an exemplary embodiment. The remainder of the ideal Otto cycle is similar to the common IC engine, according to an exemplary embodiment.

Neutrons are introduced into the exemplary nanofuel either through an external source or an internal source, according to an exemplary embodiment. External neutron sources, according to an exemplary embodiment, may include radioactive materials that emit neutrons (e.g., $^{252}$Cf) and fusion neutron sources (e.g., accelerators and Z-pinches), etc.; internal neutron sources also may include radioactive materials that emit neutrons (e.g., fission products and transuranic elements), etc., according to an exemplary embodiment. During nanofuel engine 102 startup, according to an exemplary embodiment, an external fusion neutron source may be an exemplary, or preferred means of injecting neutrons into the system, according to an exemplary embodiment. After a few minutes of operation, according to an exemplary embodiment, fission product delayed neutrons may be the preferred neutron source, according to an exemplary embodiment. Analogous to traditional IC engine operation, the spark-ignition mode of engine operation, according to an exemplary embodiment, may refer to the use of an external neutron source and the compression-ignition mode of engine operation, according to an exemplary embodiment, may refer to the use of an internal neutron source.

There are two main types of fusion neutron sources or generators, according to an exemplary embodiment, that are suitable for use in a nanofuel engine 102, according to an exemplary embodiment. First, accelerator-based neutron generators, according to an exemplary embodiment, are a mature technology and commercial products are readily available. For example, the All-Russia Research Institute of Automatics ING-013 (see the All-Russia Research Institute of Automatics web site http://www.vniia.ru/ for more information) produces $10^8$ neutrons within 0.8 μs, according to an exemplary embodiment. Other technical characteristics of the ING-013 may include, according to an exemplary embodiment: a cylindrical geometry with dimensions R=6.5 cm and H=100 cm; a power consumption of P<500 W; and an operating lifetime of $3.6 \times 10^5$ shots. Another option is the Activation Technology Corporation N550 (see the Activation Technology Corporation web site http://www.atcng-.com/n550.htm for more information), which produces $10^8$ neutrons within 10 μs, according to an exemplary embodiment. Other technical characteristics of the N550 may include, according to an exemplary embodiment: a cylindrical geometry with dimensions R=3.0 cm and H=25.5 cm; and a power consumption of P~10W.

Second, exemplary Z-pinch-based dense plasma focus (DPF) neutron generators, according to an exemplary embodiment may offer a very simple and energy efficient means of performing nuclear fusion, according to an exemplary embodiment. See J. W. MATHER, "Investigation of the high-energy acceleration mode in the coaxial gun," *Phys. Fluids,* 7, 11, S28 (1964); J. W. MATHER, "Formation of a high-density deuterium plasma focus," *Phys. Fluids,* 8, 2, 366 (1965); and J. W. MATHER, "Dense Plasma Focus," in *Methods of Experimental Physics,* volume 9B, p. 187-249, Elsevier, 1971. For example, Michel et al. experimentally demonstrated a neutron yield of $2.8 \times 10^8$ using molecular deuterium ($D_2$) and a driver with energy 1.35 kJ and voltage 20 kV. See L. MICHEL, K. H. SCHONBACH, and H. FISCHER, "Neutron emission from a small 1-kJ plasma focus," *Appl. Phys. Lett.,* 24, 2, 57 (1974). A deuterium-tritium (DT) fuel mixture would increase the neutron yield by a factor of a hundred (100), according to an exemplary embodiment. In addition, Decker et al. experimentally demonstrated that fast (400 ns rise time) high-impedance (60 mΩ) drivers significantly increase the neutron yield to driver energy ratio (Y/kJ). While Z-pinch-based neutron generators, according to an exemplary embodiment, are not as technically mature as accelerator-based neutron generators, they offer an energy efficient and cost effective alternative, according to an exemplary embodiment. See G. DECKER, W. KIES, and G. PROSS, "The first and the final nanoseconds of a fast focus discharge," Phys. Fluids, 26, 2, 571 (1983) and G. DECKER, W. KIES, M. MALZIG, C. VAN CALKER, and G. ZIETHER, "High Performance 300 kV driver speed 2 for MA pinch discharges," *Nucl. Instrum. Meth. A,* 249, 477 (1986).

Now let us numerically determine several quantities pertaining to the ideal Otto cycle combustion process 2-3 of process diagram 200, according to an exemplary embodiment. The ensuing numerical simulations assume azimuthal symmetry and use a self-consistent, time-dependent, two-dimensional (2D), Lagrangian hydrodynamics and Monte Carlo neutron transport model, according to an exemplary embodiment. See W. D. SCHULZ, "Two-Dimensional Lagrangian Hydrodynamic Difference Equations," UCRL-6776, LRL (1963).

The exemplary nanofuel engine 102 simulation initial conditions are obtained by starting in state 1 of process diagram 200 (see FIG. 2) with the following nanofuel properties: $\rho_1=0.002$ g/cm$^3$ and $T_1=350$ K, according to an exemplary embodiment. Then, assuming isentropic compression (r=10) of an ideal gas ($\gamma=1.4$), state 2 of process diagram 200 has the following nanofuel properties: $\rho_2=0.02$ g/cm$^3$ and $T_2=879$ K, according to an exemplary embodiment. In order to reduce neutron leakage when the engine piston 302 is in the TDC position 302b, the engine core 304 is given the optimal dimensions H=2R (see Sec. IV), according to an exemplary embodiment. Further reduction in the neutron leakage is obtained by surrounding the engine core 304 by an exemplary 40 cm thick Be piston 302, piston case 314, and endcap 316, according to an exemplary embodiment. Be is the neutron reflector and the dimension was chosen in App. A below. Collectively, this initial state is referred to as the static optimal engine core geometry, according to an exemplary embodiment. Finally, the combustion process begins with the injection of $10^8$ fusion (14 MeV) neutrons into the system within 1 μs and ends due to the nanofuel negative temperature coefficient of reactivity, according to an exemplary embodiment.

TABLE III sets forth a table listing exemplary static optimal engine core geometry simulations for the exemplary nanofuels identified in Table I and the exemplary critical engine core 304 dimensions presented in Table II.

TABLE III

| label | Q [MJ] | ξ | $p_3$ [bar] | $T_3$ [K] | τ [ms] |
|---|---|---|---|---|---|
| a | 247.9 | 5.057 | 1,167 | 2,498 | 80 |
| b | 262.0 | 7.668 | 1,501 | 3,227 | 55 |
| c | 319.2 | 12.44 | 2,051 | 4,412 | 40 |
| d | 234.2 | 4.595 | 1,285 | 2,305 | 120 |
| e | 250.5 | 7.074 | 1,653 | 2,976 | 65 |
| f | 320.2 | 11.75 | 2,281 | 4,118 | 45 |
| g | 216.8 | 4.113 | 1,386 | 2,124 | 170 |
| h | 263.4 | 6.539 | 1,800 | 2,772 | 100 |
| i | 386.4 | 13.39 | 2,817 | 4,365 | 60 |

For the exemplary nanofuels identified in Table I and the exemplary critical engine core dimensions presented in Table II, we calculated: Q the energy released during combustion, ξ the dimensionless energy released during combustion (see Eq. 3), $p_3$ the average nanofuel pressure in state 3 of process diagram 200, $T_3$ the average nanofuel temperature in state 3 of process diagram 200, and τ the duration of the combustion process 2-3 of process diagram 200, according to an exemplary embodiment. Table III presents the results. In particular, for exemplary Fuel c the energy released during combustion is Q=319.2 MJ and the dimensionless equivalent is ξ=12.44, which is well within the range of normal IC engine operating conditions, according to an exemplary embodiment. Also, for exemplary Fuel c the peak pressure is $p_3$=2,051 bar, the peak temperature $T_3$=4,412 K, and the combustion duration is τ=40 ms, according to an exemplary embodiment.

The results in Tables I and III, according to an exemplary embodiment, clearly show that $Q \sim k_\infty$ and $\tau \sim 1/\alpha$. First, returning to FIG. 6A, the energy released is proportional to the temperature where $k_\infty=1$ or the positive area under this curve. Second, since $\alpha \sim \rho \sim r$, the combustion duration can also be controlled by either the initial nanofuel loading density $\rho_1$ or the compression ratio r, according to an exemplary embodiment. Thus, following the construction of an exemplary nanofuel engine 102 there are several controls or knobs, according to an exemplary embodiment, available to regulate performance, including: changing the nanofuel, adjusting the inlet nanofuel properties, and varying r, according to an exemplary embodiment.

VI. Exemplary Performance

Numerous design dimensions affect exemplary nanofuel engine 102 performance, according to an exemplary embodiment. The size, efficiency, operating speed, reliability, durability, and life expectancy may strongly influence the economics, safety, and waste management of a nanofuel engine 102, according to an exemplary embodiment. Rather than attempt to design an optimal engine for a particular application, we illustrate several design principles through the numerical simulation of an exemplary generic 4-stroke nanofuel reciprocating engine operating in both spark-ignition and compression-ignition modes, according to an exemplary embodiment.

The nanofuel engine 102 simulation initial conditions are set by placing the piston 302 in the BDC position 302a (see FIG. 3 and Sec. II), assigning the engine core 302 dimensions R=$H_1$=50 cm, and using an exemplary 40 cm thick Be neutron reflector (e.g., on an exemplary piston 302, piston case 314, and endcap 316) with initial T=800 K, according to an exemplary embodiment. Next, the exemplary nanofuel defined by Fuel c in Table I is loaded into the engine core 304 and given the following properties: $\rho_1$=0.002 g/cm³ and $T_1$=350 K, according to an exemplary embodiment. The piston height H 312 is treated as a moving boundary condition that evolves in time according to $$\frac{H}{H_1} = \frac{1}{r} + \frac{1}{2}\left(1 - \frac{1}{r}\right)[1 + \cos(cps\, 4\pi t)], \quad (22)$$

where cps is the cycles per second for a 4-stroke reciprocating engine, according to an exemplary embodiment.

Figure 8:
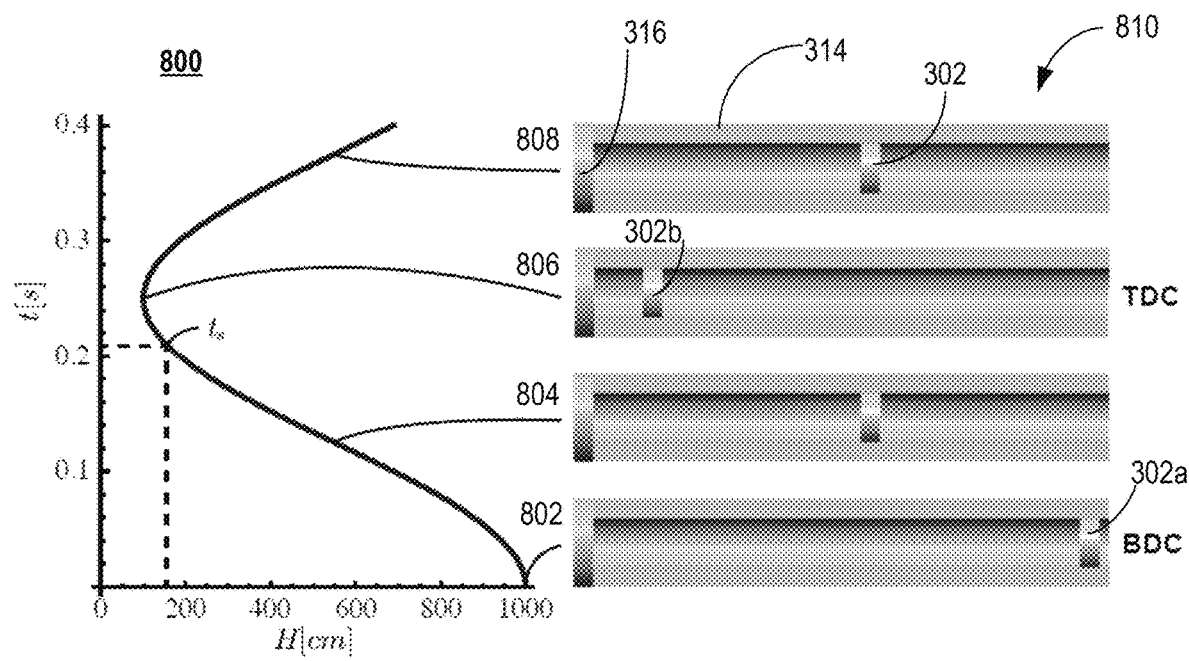
FIG. 8 depicts an exemplary embodiment of an exemplary nanofuel engine simulation geometry, and exemplary piston dynamics, according to an exemplary embodiment; in particular, FIG. 8 plots the variable engine core height with time, illustrating the time evolution of the engine core geometry.

FIG. 8 depicts an exemplary embodiment of an exemplary nanofuel engine 102 simulation geometry, and exemplary piston 302 dynamics, according to an exemplary embodiment. Specifically, FIG. 8, according to an exemplary embodiment, illustrates the exemplary nanofuel engine 102 simulation geometry along with the piston 302 dynamics. Diagram 810 illustrates piston positions from 802-808, including the piston 302 in the BDC position 302a, 802 and in the TDC position 302b, 806. Graph 800 plots the variable engine core height H 312 with time t, illustrating the time evolution of the engine core 304 geometry.

Now let us consider an exemplary nanofuel engine 102 operating in spark-ignition mode, according to an exemplary embodiment. According to Eq. 22, for cps=1 and r=10 the engine piston 302 reaches the TDC position 302b, 806 (H=$H_2$=100 cm) at 250 ms (quarter cycle), according to an exemplary embodiment. The spark time ($t_s$), or the time when the neutron generator is fired and neutrons are injected into the nanofuel, is chosen to ensure that the peak nanofuel pressure is achieved when the piston 302 passes the TDC position 302b. From Table III we expect $t_s$=210 ms, according to an exemplary embodiment. From simulation experience, we take $t_s$=211 ms (H=153.0 cm) and inject $10^8$ fusion (14 MeV) neutrons into the system within 1 μs (see FIG. 8), according to an exemplary embodiment. Notice that the neutron reflector has increased the supercritical region 702, highlighted in FIG. 7, where the neutron population exponentially increases, according to an exemplary embodiment.

The spark-ignition dynamic piston nanofuel engine 102 simulation results include: Q=442.0 MJ, ξ=13.36, $p_3$=1,916 bar, and $T_3$=4,523 K, according to an exemplary embodiment. For comparison, the equivalent static optimal engine core 304 geometry simulation results from Sec. V are: Q=450.9 MJ, ξ=13.63, $p_3$=2,163 bar, and $T_3$=4,600 K, according to an exemplary embodiment. The decrease in Q, ξ and other peak nanofuel property values are due to the increase in neutron leakage caused by the engine piston 302 spending more time away from the optimal engine core geometry, according to an exemplary embodiment.

Figure 9A:
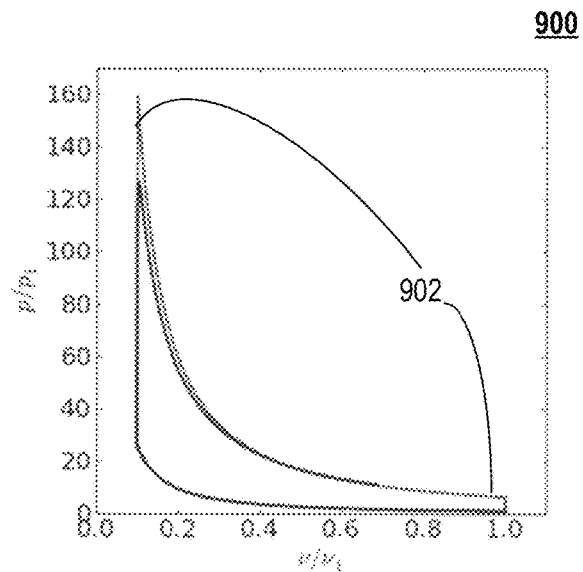
FIGS. 9A and 9B depict an exemplary embodiment of an exemplary numerical simulation of an exemplary 4-stroke nanofuel reciprocating engine operating in an exemplary spark-ignition mode, according to an exemplary embodiment; more specifically, FIG. 9A compares a simulated Otto cycle with an ideal Otto cycle, according to an exemplary embodiment.
Figure 9B:
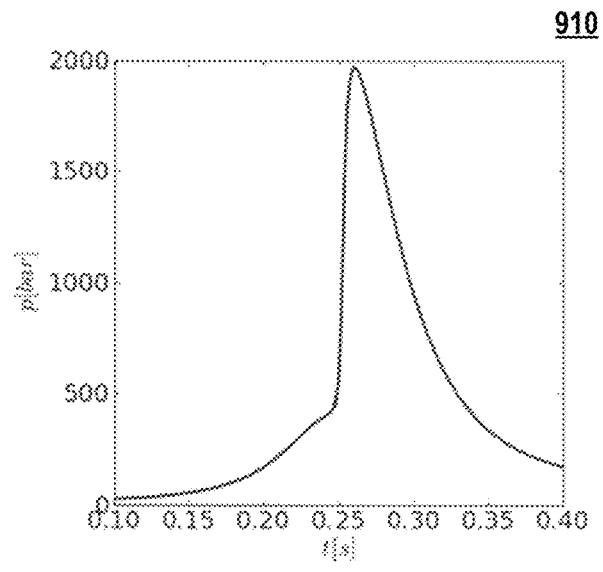

FIGS. 9A and 9B depict an exemplary embodiment of an exemplary numerical simulation of an exemplary 4-stroke nanofuel reciprocating engine operating in an exemplary spark-ignition mode, according to an exemplary embodiment. Specifically, FIG. 9A in diagram 900 compares a simulated Otto cycle with an ideal Otto cycle 902, according to an exemplary embodiment. FIG. 9B in graph 910 illustrates an average nanofuel pressure p [bar] in the engine core 304 as a function of time, according to an exemplary embodiment.

FIG. 9A in diagram 900 compares the simulated Otto cycle with the ideal Otto cycle (r=10, $\xi$=13.36, and $\gamma$=1.4), according to an exemplary embodiment. In particular, the simulated nanofuel engine 102 efficiency is $\eta$=55.48% and the ideal nanofuel engine 102 efficiency is $\eta$=60.19%, according to an exemplary embodiment. This excellent efficiency is attributed to the small combustion duration relative to the engine operating speed, according to an exemplary embodiment. Unlike the combustion dynamics of common fuel-air mixtures, which sets a practical limit on the efficiency of large IC engines, the combustion process in a nanofuel engine 102, according to an exemplary embodiment, is more spatially uniform. From the simulated Otto cycle, interesting performance metrics include: the net work per cycle W=245.2 MJ, the engine power (at cps=1) P=245.2 MW ($3.288 \times 10^5$ hp), and (assuming a 98% alternator efficiency) the electricity output 240.3 $MW_e$, according to an exemplary embodiment. Since the engine power is proportional to the operating speed, at cps=4 the electricity output of this simulated nanofuel engine 102, according to an exemplary embodiment, is roughly 1 $GW_e$!

Figure 10A:
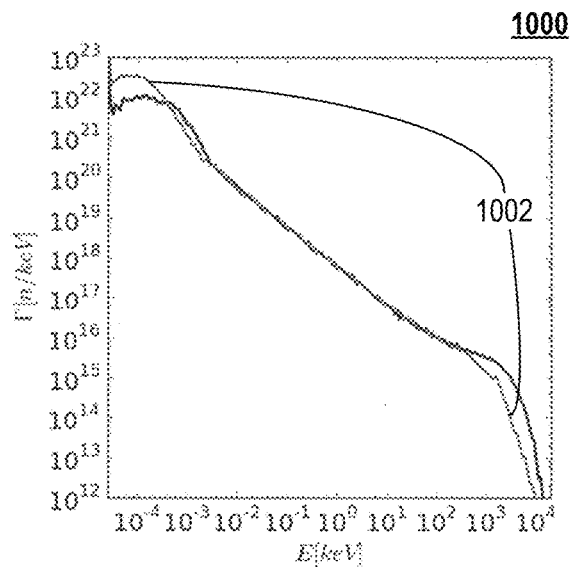
FIGS. 10A and 10B depict an exemplary embodiment of an exemplary numerical simulation of an exemplary 4-stroke nanofuel reciprocating engine operating in an exemplary spark-ignition mode, according to an exemplary embodiment; specifically.
Figure 10B:
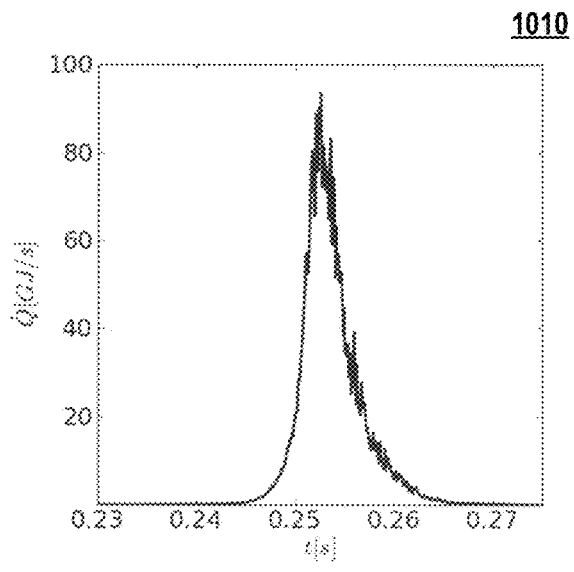

FIGS. 10A and 10B depict an exemplary embodiment of an exemplary numerical simulation of an exemplary 4-stroke nanofuel reciprocating engine operating in an exemplary spark-ignition mode, according to an exemplary embodiment. Particularly, FIG. 10A in graph 1000 illustrates an exemplary time-integrated one-sided neutron flux F [n/keV] leaving an exemplary engine core 304 and entering 1002 an exemplary engine core 304 as a function of neutron energy E [keV], according to an exemplary embodiment. FIG. 10B in graph 1010 illustrates the energy production rate Q [GEs] in the nanofuel in the engine core 304 as a function of time, according to an exemplary embodiment.

FIG. 10A displays in graph 1000 the time-integrated one-sided neutron flux (F) across the engine core 304 boundary plotted as a function of neutron energy (E), according to an exemplary embodiment. FIG. 10A contains a wealth of information. First, the excess MeV neutron flux leaving the engine core 304 indicates that the fast neutrons created during fission rapidly escape the nanofuel. This is another reason why it may be useful or important to use a suitable neutron reflector for the piston 302, piston case 314, and/or endcap 316, according to an exemplary embodiment. Second, the excess thermal neutron flux entering 1002 the engine core 304 indicates that the thermal neutrons are absorbed in the nanofuel, according to an exemplary embodiment. Third, the excess neutron flux leaving the engine core 304 at energies slightly above 1 eV indicates that these neutrons are marginally thin and traverse the engine core 304 without interaction, according to an exemplary embodiment. Finally, the nonleakage probability can be estimated by integrating the neutron fluxes over energy and taking the ratio of total neutrons entering the core to the total number leaving the core, according to an exemplary embodiment. Performing this calculation we find $P_{NL}$=0.8933, according to an exemplary embodiment. For criticality this implies that nanofuels must have $k_\infty$>1.11, while for breeding this implies that nanofuels must have $k_\infty$>2.239, according to an exemplary embodiment.

FIG. 10B displays in graph 1001 the energy production rate ($\dot{Q}$) as a function of time, according to an exemplary embodiment. This curve can be approximated by a square wave with height $\dot{Q}$~55 GJ/s and duration 8 ms, thereby releasing Q~440 MJ, according to an exemplary embodiment. Another estimate of the total energy released during combustion can be found from the number of fissions per cycle and the energy released per fission, according to an exemplary embodiment. The number of fissions per cycle in the simulation from $^{239}$Pu is $N_f$=1.414$\times 10^{19}$ (from $^{240}$Pu is $N_f$=7.562$\times 10^{15}$) and the effective energy released per fission is 198.5 MeV/f (J. J. DUDERSTADT and L. J. HAMILTON, *Nuclear Reactor Analysis*, John Wiley & Sons, New York (1976)), thereby releasing Q~449.7 MJ. Both of these estimates are close to the simulated energy release of Q=442.0 MJ, according to an exemplary embodiment.

Now let us consider fuel utilization, according to an exemplary embodiment. There are $N_0$=1.206$\times 10^{25}$ molecules of $^{239}$PuF$_6$ in the initial nanofuel loading, according to an exemplary embodiment. Thus, only a small fraction of the fissile fuel, according to an exemplary embodiment, is depleted per cycle (f=$N_f$/$N_0$=1.172$\times 10^{-6}$) and the initial loading is sufficient for copious cycles (8.529$\times 10^5$ assuming complete fissile fuel utilization), according to an exemplary embodiment. The small fraction of fissile fuel used per cycle explains why a nanofuel engine 102, according to an exemplary embodiment, and a common fossil fuel IC engine have similar performance metrics. While the nanofuel, according to an exemplary embodiment, has approximately $10^6$ times the energy content of an equivalent fossil fuel mass, only $10^{-6}$ of this energy is released per cycle.

In order to have high fuel utilization, an exemplary nanofuel engine 102 operates with an exemplary fuel cycle 104 (see FIG. 1) that continuously recycles the nanofuel, according to an exemplary embodiment. For example, if we assume the initial fuel cycle contains 60 cycles, or engine core nanofuel loadings, of nanofuel and the engine operates at cps=1, then the recycling time is 1 min. Further assuming, according to an exemplary embodiment, that a nanofuel engine 102 achieves 90% burnup before nanofuel reloading is necessary, which implies a recycling time of 6 s, the operating duration at full power (cps=1) is 533 days, according to an exemplary embodiment. Since the fissile fuel mass for 1 cycle is M($^{239}$PuF$_6$)=7.079 kg, a full 60 cycle loading requires M($^{239}$PuF$_6$)=424.7 kg (936.4 lbs), according to an exemplary embodiment. Compared to a commercial pressurized-water reactor (PWR), a nanofuel engine 102, according to an exemplary embodiment, has 210 times less fuel mass and poses much less risk to the environment and the public in the event of an accident.

Maintaining the structural integrity of the piston case 314 sets a limit on the peak nanofuel properties, according to an exemplary embodiment, and hence the maximum energy released per cycle. It is undesirable to allow portions of the piston 302, piston case 314, or endcap 316 to melt or undergo plastic deformation, according to an exemplary embodiment. Since the incorporation of modest engine cooling systems can significantly reduce the piston case 314 temperature, the peak pressure sets the limit on the amount of energy released, according to an exemplary embodiment. In App. B below, the theory of elasticity is used to calculate the deformation of the piston case 314 due to the nanofuel pressure. Using these results, for a peak nanofuel pressure of $p_3$=1, 916 bar, the hoop stress at the inner surface of the piston case 314 is $\sigma_{\theta\theta}$=3,624 bar, which is above the yield strength of Be $\sigma_y$(800K)=2,114 bar, according to an exemplary embodiment. Lowering the hoop stress to 90% Be yield strength requires an applied pressure on the outer surface of the piston case 314 of $p_b$=595.9 bar, according to an exemplary embodiment. From Eq. 58 (see App. B below), the deflection at the inner surface of the piston case 314 without an external applied pressure is u=686.2 µm, and the deflection at the inner surface of the piston case 314 with an external applied pressure is u=365.9 µm, according to an exemplary embodiment.

Now let us consider a nanofuel engine 102, according to an exemplary embodiment, operating in an exemplary compression-ignition mode. The operating lifetime of a nanofuel engine 102 in spark-ignition mode, according to an exemplary embodiment, is limited by the lifetime of the neutron generator, which is on the order of $10^5$ cycles or 1 day of operation at cps=1. Thus, according to an exemplary embodiment, it is important to transition to a compression-ignition mode for extending the operating duration of a nanofuel engine 102, according to an exemplary embodiment.

Delayed neutrons, according to an exemplary embodiment, offer a means of transitioning a nanofuel engine 102 from the spark-ignition mode of operation to the compression-ignition (diesel-like) mode. In particular, there are 0.0061 delayed neutrons from the thermal fission of $^{239}$Pu, according to an exemplary embodiment. See R. J. TEMPLIN, "Reactor Physics Constants," 5800, ANL (1963). Thus, for the previous spark-ignition nanofuel engine 102 simulation, retaining 1% of the exhaust (nanofuel) in the engine core 304, according to an exemplary embodiment, provides an internal background neutron source of $0.01 \times 0.0061 \times 1.414 \times 10^{19} = 8.625 \times 10^{14}$ neutrons emitted within 1 min. Once the internal neutron source is established, the engine speed and compression ratio r can be adjusted to ensure that the peak nanofuel pressure occurs when the piston 302 passes the TDC position 302b, according to an exemplary embodiment.

Figure 11A:
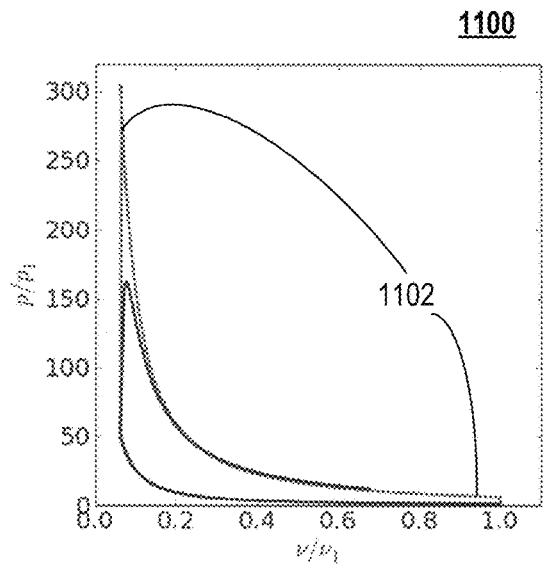
FIGS. 11A and 11B depict an exemplary embodiment of an exemplary numerical simulation of an exemplary 4-stroke nanofuel reciprocating engine operating in an exemplary compression-ignition mode, according to an exemplary embodiment; more specifically, FIG. 11A compares a simulated Otto cycle with an ideal Otto cycle, according to an exemplary embodiment.
Figure 11B:
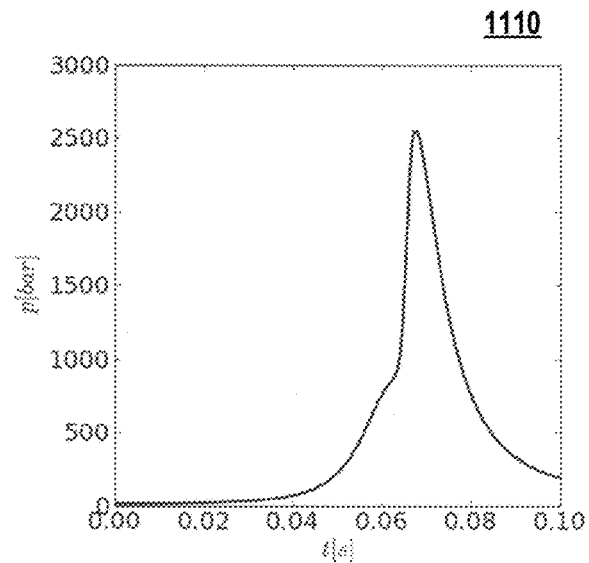

FIGS. 11A and 11B depict an exemplary embodiment of an exemplary numerical simulation of an exemplary 4-stroke nanofuel reciprocating engine operating in an exemplary compression-ignition mode, according to an exemplary embodiment. Specifically, FIG. 11A in diagram 1100 compares a simulated Otto cycle with an ideal Otto cycle 1102, according to an exemplary embodiment. FIG. 11B in graph 1110 illustrates an average nanofuel pressure p [bar] in the engine core 304 as a function of time, according to an exemplary embodiment.

FIGS. 11A and 11B plot the compression-ignition dynamic piston nanofuel engine 102 simulation results for cps=4 and r=16, according to an exemplary embodiment. In particular, the simulation results include: Q=528.7 MJ, $\xi$=15.98, $p_3$=2,549 bar, $T_3$=4,576 K, and $P_{NL}$=0.8929. For a 55% engine efficiency and a 98% alternator efficiency, this nanofuel engine 102, according to an exemplary embodiment, generates 1,140 MW$_e$. While the ideal thermal efficiency increased due to the compression ratio (r=16, $\eta$=67.01%) the simulated efficiency decreased due to the higher operating speed (cps=4), according to an exemplary embodiment.

VII. Exemplary Use of Light Water Reactor (LWR) Spent Nuclear Fuel (SNF)

Charged "with reviewing policies for managing the back end of the nuclear fuel cycle and recommending a new plan," the Blue Ribbon Commission on America's Nuclear Future reported gaping holes in the past and present nuclear fuel cycle strategy. See *Blue Ribbon Commission on America's Nuclear Future Report to the Secretary of Energy*, 2012. One contributing factor to this unfortunate situation is the absence of any revolutionary technological advances in the area of nuclear waste treatment for a nuclear fuel cycle strategy to form around. Toward this end, we propose in an exemplary embodiment, the use of LWR SNF in a nanofuel engine 102, according to an exemplary embodiment of the present invention.

For a typical commercial LWR SNF isotopic composition, we will use an example from the fuel cycle analysis group at the Idaho National Laboratory (INL). See R. M. FERRER, S. BAYS, and M. POPE, "Evaluation of Homogeneous Options: Effects of Minor Actinide Exclusion from Single and Double Tier Recycle in Sodium Fast Reactors," INL/EXT-08-14034, INL (2008) and S. BAYS, H. ZHANG, and M. POPE, "Deep Burn Fuel Cycle Integration: Evaluation of Two-Tier Scenarios," INL/EXT-09-15915, INL (2009). This particular LWR SNF scenario includes: 4.21% initial enrichment, 50 GWd/t (gigawatt-days of thermal output per metric ton of heavy metal) burnup, 5 years of storage, and an additional 2 years of reprocessing and fabrication before reuse, according to an exemplary embodiment. Table IV below presents the specific mass fractions (after renormalization) used in this section, according to an exemplary embodiment.

TABLE IV sets forth a table listing exemplary LWR SNF mass fractions (after renormalization) following: 4.21% enrichment, 50 GWd/t burnup, 5 years of storage, and 2 more years prior to reuse, according to an exemplary embodiment.

TABLE IV

| Isotope | Pu | Np + Pu + Am |
|---|---|---|
| $^{237}$Np | 0.0000 | 0.0679 |
| $^{238}$Pu | 0.0326 | 0.0290 |
| $^{239}$Pu | 0.5556 | 0.4944 |
| $^{240}$Pu | 0.2581 | 0.2297 |
| $^{241}$Pu | 0.0988 | 0.0897 |
| $^{242}$Pu | 0.0549 | 0.0489 |
| $^{241}$Am | 0.0000 | 0.0280 |
| $^{242}$Am | 0.0000 | 0.0002 |
| $^{243}$Am | 0.0000 | 0.0140 |
| $k_\infty$ | 1.420 | 1.365 |
| $\alpha$ [gen/s] | 2,709 | 2,705 |

Let us start by exploring nanofuel properties, according to an exemplary embodiment, and then move to considering the engine core 304 geometry, according to an exemplary embodiment. Following Sec. III and using basic chemistry, the nanofuel formation starts with a solid tetrafluoride mixture of the isotopes given in Table IV (i.e., NpF$_4$, PuF$_4$, and AmF$_4$), according to an exemplary embodiment. This mixture, according to an exemplary embodiment, may include fissile fuel ($^{239}$Pu), passive agent ($^{240}$Pu), and transuranic elements (everything else in Table IV below). Next, the tetrafluoride mixture, according to an exemplary embodiment, is loaded into a fluorination reactor, where NpF$_4$ and PuF$_4$ are converted into hexafluoride molecules, according to an exemplary embodiment. AmF$_4$ does not fluorinate and the presence of solid AmF$_4$ particulates dispersed within the gaseous hexafluoride medium forms a colloidal system, according to an exemplary embodiment. Finally, the resulting aerosol is mixed with H$_2$ (the moderator) until the desired concentration is achieved, according to an exemplary embodiment.

Figure 12A:
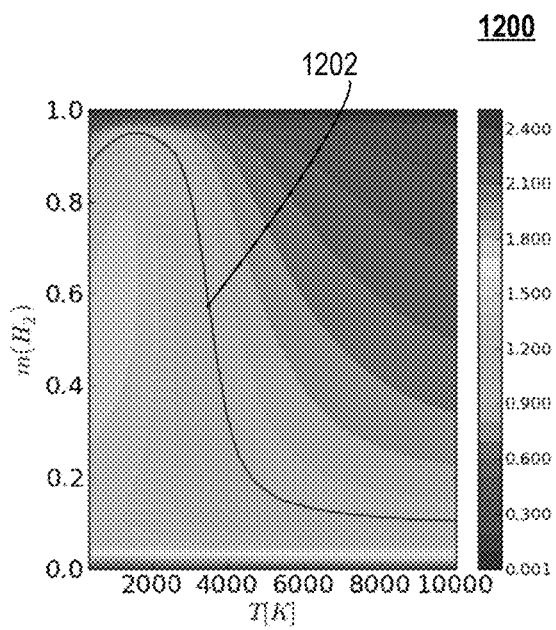
FIGS. 12A and 12B depict an exemplary embodiment of exemplary 7,171 Monte Carlo neutron transport simulations, according to an exemplary embodiment; more specifically.
Figure 12B:
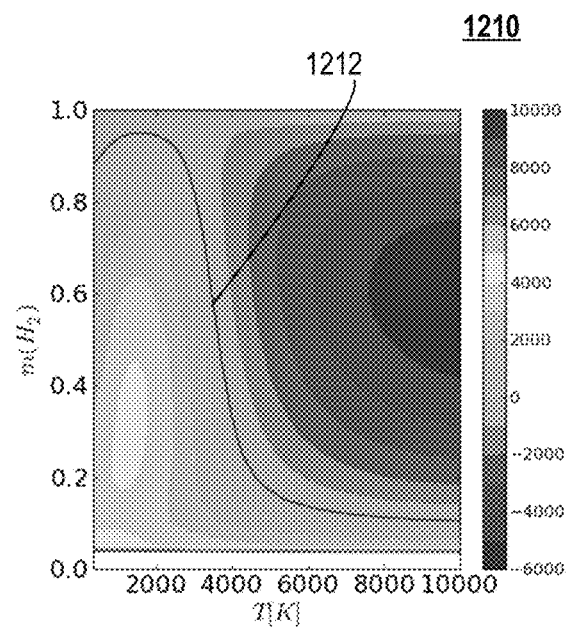

FIGS. 12A and 12B depict an exemplary embodiment of exemplary 7,171 Monte Carlo neutron transport simulations, according to an exemplary embodiment. In particular, FIG. 12A in graph 1200 plots $k_\infty$ as a function of the nanofuel ingredient mass fractions m($H_2$,Pu$F_6$) and temperature (the nanofuel density is $\rho$=0.02 g/cm$^3$), according to an exemplary embodiment. The solid black contour 1202 in FIG. 12A corresponds to $k_\infty$=1, according to an exemplary embodiment. FIG. 12B in graph 1210 plots $\alpha$ [gen/s] as a function of the nanofuel ingredient mass fractions m($H_2$, Pu$F_6$) and temperature (the nanofuel density is $\rho$=0.02 g/cm$^3$), according to an exemplary embodiment. The solid black contour 1212 in FIG. 12B corresponds to $\alpha$=0 gen/s, according to an exemplary embodiment.

For the Pu isotope distribution given in Table IV, FIGS. 12A and 12B display 7,171 Monte Carlo neutron transport simulations depicting $k_\infty$ and $\alpha$, respectively, as a function the nanofuel ingredient mass fractions m($H_2$,Pu$F_6$) and temperature (the nanofuel density is $\rho$=0.02 g/cm$^3$). In the domain spanned by 0.4<m($H_2$)<0.6 and temperatures near ignition (T~$T_2$~879 K), FIGS. 12A and 12B illustrate, according to an exemplary embodiment, a large nanofuel property plateau where $k_\infty$~1.4 and $\alpha$~3,000 gen/s. Furthermore, this moderator mass fraction domain clearly exhibits a negative temperature of reactivity and a criticality transition near T~4,000 K, according to an exemplary embodiment.

Table IV includes the values of $k_\infty$ and $\alpha$ obtained for a 50-50 mass fraction mixture of $H_2$ and the corresponding aerosol at $\rho$=0.02 g/cm$^3$ and T=879 K. For the Pu isotope distribution $k_\infty$=1.420 and $\alpha$=2,709 gen/s; for the Np+Pu+Am isotope distribution $k_\infty$=1.365 and $\alpha$=2,705 gen/s. These values are relatively close to Fuel d in Tables I through III. More importantly, this result highlights the capability of a nanofuel engine 102, according to an exemplary embodiment, to absorb increasing amounts of radioactive material with minimal engine performance degradation.

Figure 13A:
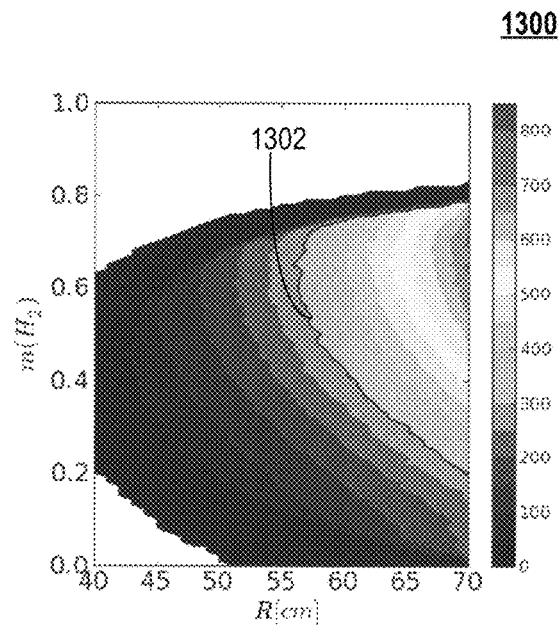
FIGS. 13A and 13B depict an exemplary embodiment of an exemplary 3,131 static optimal engine core geometry simulations, according to an exemplary embodiment; more specifically.
Figure 13B:
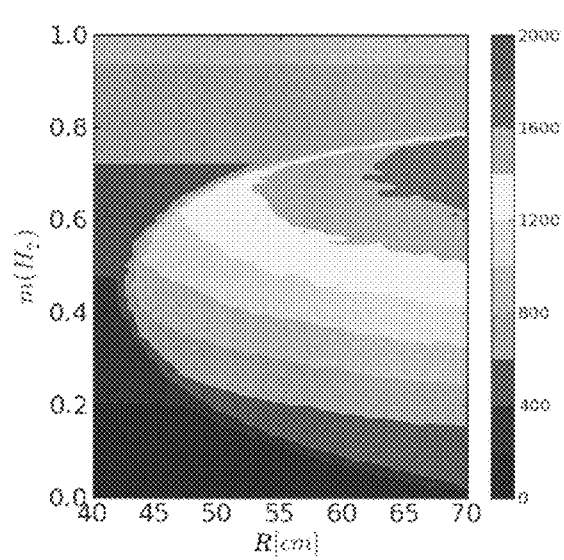

FIGS. 13A and 13B depicts an exemplary embodiment of an exemplary 3,131 static optimal engine core geometry simulations, according to an exemplary embodiment. Particularly, FIG. 13A in graph 1300 plots the energy released during combustion Q [MJ] as a function of the nanofuel ingredient mass fractions m($H_2$,Pu$F_6$) and the engine core radius R 310, according to an exemplary embodiment. The solid black contour 1302 in FIG. 13A corresponds to Q=300 MJ, according to an exemplary embodiment. FIG. 13B in graph 1310 plots the peak nanofuel pressure $p_3$ [bar] as a function of the nanofuel ingredient mass fractions m($H_2$, Pu$F_6$) and the engine core radius R 310, according to an exemplary embodiment.

For the Pu isotope distribution give in Table IV, FIGS. 13A and 13B display 3,131 static optimal engine core 304 geometry simulations depicting the energy released during combustion and the peak nanofuel pressure, respectively, as a function of the nanofuel ingredient mass fractions m($H_2$, Pu$F_6$) and the engine core radius R 310, according to an exemplary embodiment. In particular, the m($H_2$)=0.6, m(Pu$F_6$)=0.4, and R=60.0 cm simulation results include: Q=374.6 MJ, $p_3$=1,448 bar, and $T_3$=2,591 K, according to an exemplary embodiment. The corresponding exemplary nanofuel engine 102 power plant produces approximately 200 MW$_e$ at cps=1 and does not push the engine structural integrity limits, according to an exemplary embodiment.

These results demonstrate the feasibility of using LWR SNF in a nanofuel engine 102, according to an exemplary embodiment. Compared to Fuel c in Tables I through III, a nanofuel engine 102 using LWR SNF, according to an exemplary embodiment, releases less energy in a larger engine core 304. The downside is the increase in engine cost (which is proportional to volume), according to an exemplary embodiment; while the upside, according to an exemplary embodiment, is the decrease in peak pressure (which improves the piston case 314 structural integrity). In addition, according to an exemplary embodiment, trace amounts of highly radioactive nuclear waste can be included in the nanofuel without adversely affecting the engine performance. Such an exemplary nanofuel sees a decrease in the theft attractiveness according to the figures of merit presented in C. G. BATHKE et al., "The Attractiveness of Materials in Advanced Nuclear Fuel Cycles for Various Proliferation and Theft Scenarios," LA-UR-09-02466, LANL (2009). Thus, a nanofuel engine 102, according to an exemplary embodiment, can act as radioactive material burner in an exemplary embodiment, that may produce clean (carbon-free) energy and may significantly reduce geological storage (disposal) requirements for existing commercial LWR SNF, according to an exemplary embodiment.

VIII. Exemplary Discussion

In their classic text, Duderstadt and Hamilton (J. J. DUDERSTADT and L. J. HAMILTON, *Nuclear Reactor Analysis*, John Wiley & Sons, New York (1976)) pointed out that a shift in the commercial energy industry takes several decades due to the long operating lifetimes of existing power machinery and the long lead times required to redirect manufacturing capability. Today, the energy industry is changing to address the unfavorable developments in the areas of energy supply and demand, climate change, and energy security. In this section, we will highlight the revolutionary economic, safety, and waste management advantages of a small modular nanofuel engine 102, according to an exemplary embodiment, and strongly encourage adoption in all energy sectors.

Economics.

Herein we have demonstrated the feasibility of adapting an IC engine to run on a nanofuel that releases nuclear energy, according to an exemplary embodiment. On one hand, diesel-electric engines are easy to operate, offer reliable and flexible power, and are relatively inexpensive; however, diesel fuel is very expensive. On the other hand, commercial nuclear power plants have complex (heavily regulated) operations, fixed power, and an enormous price tag; however, nuclear fuel is very inexpensive. A nanofuel engine 102, according to an exemplary embodiment, connected to an electric generator 106 (a nanofuel-electric engine 100) merges the diesel-electric engine benefits and low all-in capital cost with the long-term value of nuclear fuel, thereby providing an economical means of generating electricity, according to an exemplary embodiment.

Similar to SMRs, factory fabrication and learning further improve the economics of a small modular nanofuel engine 102, according to an exemplary embodiment. In addition, since the overall characteristics of a nanofuel engine 102, according to an exemplary embodiment, are intentionally similar to existing IC engines, there is an opportunity to leverage proven manufacturing techniques and an existing supply chain.

Preliminary small modular nanofuel-electric engine 100 economic analyses show more than an order of magnitude reduction in the electricity generation price, according to an exemplary embodiment. The economic projections conservatively assume a 600 2013$/kW$_e$ overnight capital cost, a 1 year construction time, a 500 MW$_e$ power generation capacity, and operations and maintenance costs similar to existing commercial nuclear power plants. Such a nanofuel-electric engine capacity can be obtained by releasing Q=200 MJ of energy per cycle, operating at cps=5, and having an efficiency $\eta$~50%, according to an exemplary embodiment. Since generation accounts for approximately 38% of the total electricity price, a ten (10)-fold reduction in the generation price translates into a 34.2% reduction in the electricity price, according to an exemplary embodiment. Thus, for New York residents, for example, the average price of electricity would decrease from 15.7 2010¢/kWh to 10.33 2010¢/kWh, according to an exemplary embodiment. See U.S. Energy Information Administration, *Average Retail Price of Electricity to Ultimate Customers by End-Use Sector, by State,* 2011. As a final comment, a hundred (100)-fold reduction in electricity generation price requires addressing the subdominant economic terms, namely the operations and maintenance costs.

Safety.

Herein we have demonstrated an exemplary two nanofuel engine 102 passive safety features, according to an exemplary embodiment, that enable autonomous safe operation. First, nanofuels have a negative temperature coefficient of reactivity, according to an exemplary embodiment. During the Otto cycle combustion process 2-3 of process diagram 200, the energy production rate decreases as the nanofuel temperature increases and the combustion process terminates when the nanofuel is subcritical. Second, a nanofuel reciprocating engine 102 is subcritical when the engine core radius 310 is less than the critical radius, according to an exemplary embodiment. Taken together, a nanofuel engine 102 combustion process 2-3 of process diagram 200 starts when the piston 302 is located near the TDC position 302b and ends when either the nanofuel is too hot or the engine core 304 is too large, according to an exemplary embodiment. There is no need for auxiliary power, external water supplies, or operator intervention to ensure safe operation of a nanofuel engine 102.

Additional safety benefits include a small nanofuel inventory and a small overall plant size, according to an exemplary embodiment. The nanofuel inventory in a nanofuel engine 102, according to an exemplary embodiment, is several hundred times less than in a commercial LWR nuclear power plant, for an equivalent electricity generation capacity and operating duration. This significantly reduces the source requirements in ESP applications. The small plant size, according to an exemplary embodiment, enables exemplary underground siting and fortification from natural disasters (e.g., earthquakes, flooding, tornados, and tsunamis) and sabotage, according to an exemplary embodiment.

Waste Management.

Herein we have demonstrated the effective nanofuel utilization capabilities of a nanofuel engine 102 closed thermodynamic fuel cycle, according to an exemplary embodiment, including the ability to perform with trace amounts of highly radioactive nuclear waste, and the ability to utilize existing commercial LWR SNF. First, the closed thermodynamic fuel cycle permits 100% fissile fuel utilization, according to an exemplary embodiment, (although refueling is necessary, no nanofuel is wasted), and modest breeding, according to an exemplary embodiment. Second, highly radioactive material can be included in a nanofuel engine 102, according to an exemplary embodiment, without adversely affecting the engine performance. Third, we demonstrated the ability of a nanofuel engine 102, according to an exemplary embodiment, to utilize existing commercial LWR SNF, thereby reducing SNF geological storage requirements from 100,000 years to 100 years and potentially eliminating a long-standing challenge for nuclear power.

Market.

A small module nanofuel engine 102, according to an exemplary embodiment, offers an economical, safe, environmentally friendly, reliable, and sustainable means of generating carbon-free energy for all energy sectors. While herein we have emphasized, according to an exemplary embodiment, so-called on the grid electricity generation capabilities, a nanofuel engine 102, according to an exemplary embodiment, has many uses off the grid. For military installations and national laboratories, a nanofuel engine 102 enables isolation from grid vulnerabilities and promotes reaching, according to an exemplary embodiment, U.S. greenhouse gas emission reduction targets, etc. A nanofuel engine 102, according to an exemplary embodiment, also provides an ideal economical solution for: supercomputing and cloud computing facilities (where the biggest obstacle in large scale computing is power); desalination plants and other remote industrial projects; and universities, major hospitals, and large corporations.

In the transportation energy sector, according to an exemplary embodiment, a nanofuel engine 102 offers a revolutionary new power generation source that addresses energy security concerns for numerous countries, according to an exemplary embodiment. For example, in the United States, petroleum accounts for 93% of the energy source in the transportation sector and half of this petroleum is imported. See U.S. Energy Information Administration, *Annual Energy Review* 2011, 2012. A nanofuel engine 102, according to an exemplary embodiment, is ideally suited for use in the shipping industry, including: commercial container ships and oil tankers, where fuel consumption is reported in feet/gallon units; and military ships such as destroyers and frigates, where increased speed and operating range are desirable.

Generation IV Nuclear Power Plants.

Regarding the international nuclear technology wish list, it is interesting to compare and contrast a nanofuel engine 102, according to an exemplary embodiment, with the Generation IV goals for the future generation of nuclear energy systems. See "A technology roadmap for Generation IV nuclear energy systems," GIF-002-00, U.S. DOE Nuclear Energy Research Advisory Committee and the Generation IV International Forum (2002). As outlined by DOE, the R&D goals for Generation IV nuclear energy systems fall into 4 broad categories: sustainability, economic competitiveness, safety and reliability, and proliferation resistance and physical protection. Let us consider the 8 specific goals in turn:

Sustainability-1

Generation IV nuclear energy systems will provide sustainable energy generation that meets clean air objectives and promotes long-term availability of systems and effective fuel utilization for worldwide energy production.

A nanofuel engine 102, according to an exemplary embodiment, utilizes fissile fuel that releases nuclear energy and provides a sustainable, carbon-free, alternative energy source. The nanofuel engine 102 operates in a closed thermodynamic fuel cycle that enables near 100% nanofuel utilization, according to an exemplary embodiment. Sustainability is improved by introducing breeding material and using SNF from existing and future commercial nuclear power plants, according to an exemplary embodiment.

Sustainability-2

Generation IV nuclear energy systems will minimize and manage their nuclear waste and notably reduce the long-term stewardship burden, thereby improving protection for the public health and the environment.

A nanofuel engine 102, according to an exemplary embodiment, operates in a closed thermodynamic fuel cycle that continuously transmutes radioactive nuclear waste and avoids the generation of new nuclear waste requiring long-term geological storage, according to an exemplary embodiment. In addition, a nanofuel engine 102 efficiently burns the SNF from existing and future commercial nuclear power plants, according to an exemplary embodiment.

Economics-1

Generation IV nuclear energy systems will have a clear life cycle cost advantage over other energy sources.

A nanofuel engine 102, according to an exemplary embodiment has long-term profitability due to: (1) an exemplary low nanofuel cost; (2) an exemplary low overnight capital cost, which may result from an exemplary small engine size and/or modular manufacturing (including learning); (3) an exemplary low financing cost, which may be due in part to an exemplary short construction time; and/or (4) exemplary low operations and maintenance costs, which are comparable to existing IC engines, according to an exemplary embodiment.

Economics-2

Generation IV nuclear energy systems will have a level of financial risk comparable to other energy projects.

A nanofuel engine 102, according to an exemplary embodiment, has less financial risk than any other power generation technology due to the small project balance (resulting from the small overnight capital cost and short construction time) and short payback time (resulting from the high profit margin associated with using nanofuel and having low operations and maintenance costs).

Safety and Reliability-1

Generation IV nuclear energy systems operations will excel in safety and reliability.

A nanofuel engine 102, according to an exemplary embodiment, evolves from the IC engine, which is the most reliable and widely used power source in the world. A nanofuel engine 102, according to an exemplary embodiment, has unprecedented safety due to: (1) the nanofuel negative temperature coefficient of reactivity; (2) the geometry constraint where a nanofuel reciprocating engine is only supercritical when the engine core radius 310 is greater than the critical radius; and (3) the ultra small nanofuel inventory, according to an exemplary embodiment.

Safety and Reliability-2

Generation IV nuclear energy systems will have a very low likelihood and degree of reactor core damage.

A nanofuel engine 102, according to an exemplary embodiment, maintains the structural integrity of the material surrounding the engine core 304 (such as the piston 302, piston case 314, and endcap 316) by limiting the peak nanofuel pressure during combustion through natural safety limits (such as the nanofuel negative temperature coefficient of reactivity and the dynamic engine core criticality).

Safety and Reliability-3

Generation IV nuclear energy systems will eliminate the need for offsite emergency response.

A nanofuel engine 102, according to an exemplary embodiment, does not require auxiliary power, external water supplies, or operator intervention to shutdown in an emergency.

Proliferation Resistance and Physical Protection-1

Generation IV nuclear energy systems will increase the assurance that they are a very unattractive and the least desirable route for diversion or theft of weapons-usable materials, and provide increased physical protection against acts of terrorism.

A nanofuel engine 102, according to an exemplary embodiment, has a small plant size that enables underground siting and fortification from natural disasters and sabotage. In addition, the nanofuel itself, according to an exemplary embodiment, is in a highly undesirable state for weapons use.

APPENDIX A: EXEMPLARY NEUTRON REFLECTOR

The main purpose of a neutron reflector, according to an exemplary embodiment, is to reduce the neutron leakage from the engine core 304. In order to facilitate the selection of a suitable nanofuel engine 102 neutron reflector, according to an exemplary embodiment, we analytically determine (and numerically verify) the probability that a fission neutron is thermalized in the reflector and returned to the engine core 304. Herein, we follow the work of Bell, in G. I. BELL, "Calculations of the critical mass of $UF_6$ as a gaseous core, with reflectors of $D_2O$, Be and C," LA-1874, LANL (1955), and incorporate information from the following references: J. J. DUDERSTADT and L. J. HAMILTON, *Nuclear Reactor Analysis*, John Wiley & Sons, New York (1976) and R. V. MEGHREBLIAN and D. K. HOLMES, *Reactor Analysis*, McGraw-Hill Book Company, New York (1960).

To begin, let us consider a nanofuel bracketed by 2 semi-infinite reflectors in slab geometry, according to an exemplary embodiment. In the following analysis we: (1) assume the fast and epithermal neutrons escape the fuel and enter the reflector; (2) employ Fermi age theory to describe the neutron deceleration to thermal energies in the reflector; and (3) use a one-speed diffusion model to calculate the subsequent migration of thermal neutrons in the reflector, according to an exemplary embodiment.

From Fermi age theory, the slowing down density S for a plane source of 1 fission neutron per second in an infinite non-absorbing medium is $$S(x, \tau_F) = \frac{1}{\sqrt{4\pi\tau_F}} \exp\left\{\frac{-x^2}{4\tau_F}\right\}, \tag{23}$$

where x is the distance from the fuel-reflector interface and $\tau_F$ is the Fermi age, according to an exemplary embodiment. The slowing down density at the age to thermal is the source of thermal neutrons, according to an exemplary embodiment. Next, the transport of thermal neutrons is governed by the one-speed one-dimensional neutron diffusion equation:

$$\frac{d^2\phi}{dx^2} - \frac{1}{L^2}\phi = \frac{-S}{D}, \tag{24}$$

where $\phi$ is the neutron flux and the remaining quantities are defined in Sec. IV.

Now, we solve Eq. 23 using the Green function method or kernel method, according to an exemplary embodiment. First, the appropriate kernel function is $$\phi(x) = \frac{1}{2\kappa D} \int_{-\infty}^{\infty} S(z) e^{-\kappa|x-z|} dz, \tag{25}$$

where $\kappa = 1/L$. Second, after inserting the source function (Eq. 23) into the kernel function (Eq. 25) and integrating, we obtain $$\phi(x) = Ae^{-\kappa x} + \frac{e^{\tau_F \kappa^2}}{4\kappa D}\{2\cosh(\kappa x) + e^{-\kappa x}\Phi(\beta_-) - e^{\kappa x}\Phi(\beta_+)\}, \tag{26}$$

where $$\beta_\pm = \frac{x}{2\sqrt{\tau_F}} \pm \kappa\sqrt{\tau_F}, \tag{27}$$

and $\Phi$ is the error function $$\Phi(z) = \frac{2}{\sqrt{\pi}} \int_0^z e^{-t^2} dt. \tag{28}$$

From the boundary condition that $\phi(0)=0$, we obtain $$A = -\frac{e^{\tau_F \kappa^2}}{2\kappa D}\left[1 - \Phi(\sqrt{\tau_F}\,\kappa)\right]. \tag{29}$$

Collecting equations, we find the following expression for the neutron flux, according to an exemplary embodiment:

$$\phi(x) = -\frac{e^{\tau_F \kappa^2}}{2\kappa D}\left[1 - \Phi(\sqrt{\tau_F}\,\kappa)\right]e^{-\kappa x} + \frac{e^{\tau_F \kappa^2}}{4\kappa D}\{2\cosh(\kappa x) + e^{-\kappa x}\Phi(\beta_-) - e^{\kappa x}\Phi(\beta_+)\}. \tag{30}$$

The current into the fuel is found from Fick's law applied to the fuel-reflector interface, according to an exemplary embodiment:

$$D\frac{d\phi}{dx}\bigg|_{x=0} = \frac{1}{2}e^{\tau_F \kappa^2}\left[1 - \Phi(\sqrt{\tau_F}\,\kappa)\right]. \tag{31}$$

Since there are two reflectors, according to an exemplary embodiment, Eq. 31 is half the probability that a fission neutron is thermalized in either reflector and returned to the fuel. Thus, the total probability $P_\infty$ is $$P_\infty(\tau_F, L) = e^{\tau_F \kappa^2}[1 - \Phi(\sqrt{\tau_F}\,\kappa)], \tag{32}$$

which is only a function of the dimensionless parameter $\sqrt{\tau_F}\kappa = \sqrt{\tau_F}/L$. This dimensionless parameter is the ratio of the distance traveled while slowing down to the distance traveled following thermalization and should be much less than 1 for a good reflector, according to an exemplary embodiment.

Next, we consider a nanofuel bracketed by 2 finite thickness reflectors in slab geometry, according to an exemplary embodiment. Assuming the slowing down density S has no slope at the fuel-reflector interface (x=0) and vanishes at the external reflector boundary (x=Δ), Bell (see G. I. BELL, "Calculations of the critical mass of UF$_6$ as a gaseous core, with reflectors of D$_2$O, Be and C," LA-1874, LANL (1955)) found the following solution to the age equation:

$$S(x, \tau_F, \Delta) = \frac{1}{\sqrt{4\pi\tau_F}}\left[\exp\left\{\frac{-x^2}{4\tau_F}\right\} - \frac{\exp\left\{\frac{-(x-2\Delta)^2}{4\tau_F}\right\} + \exp\left\{\frac{-(x+2\Delta)^2}{4\tau_F}\right\}}{1 + \exp\left\{\frac{-2\Delta^2}{\tau_F}\right\}}\right] \tag{33}$$

$$= \frac{\exp\left\{\frac{-x^2}{4\tau_F}\right\}}{\sqrt{4\pi\tau_F}}\left[1 - \cosh\left(\frac{\Delta x}{\tau_F}\right)\mathrm{sech}\left(\frac{\Delta^2}{\tau_F}\right)\right].$$

Similar to the semi-infinite reflector case, we insert, according to an exemplary embodiment, the source function (Eq. 33) into the kernel function (Eq. 25), carry out the integration, apply Fick's law, and account for both reflectors. Since there is nothing technically new in these intermediate steps, according to an exemplary embodiment, we merely present the total probability $P_\Delta$ that a fission neutron is thermalized in either reflector of finite thickness Δ and returned to the fuel:

$$P_\Delta(\tau_F, L, \Delta) = \tag{34}$$
$$e^{\tau_F \kappa^2}\{\Phi(\beta_1) - \Phi(\beta_2) + \alpha_-[\alpha_1\Phi(\beta_3) + \alpha_2\Phi(\beta_4)] + \alpha_+[\Phi(\beta_5) - \Phi(\beta_6)]\},$$

where $$\alpha_\pm = \frac{\exp\left\{\frac{2\Delta}{\tau_F}(\Delta \pm \tau_F\kappa)\right\}}{1 - \exp\left\{\frac{2\Delta^2}{\tau_F}\right\}}, \tag{35}$$

$$\alpha_1 = \mathrm{sign}\left(\tau_F - \frac{\Delta}{\kappa}\right), \tag{36}$$

$$\alpha_2 = \mathrm{sign}\left(\frac{\Delta}{\kappa} = 2\tau_F\right), \tag{37}$$

$$\beta_1 = \sqrt{\frac{(\Delta + 2\tau_F\kappa)^2}{4\tau_F}}, \tag{38}$$

$$\beta_2 = \sqrt{\tau_F}\,\kappa, \tag{39}$$

$$\beta_3 = \sqrt{\left(\kappa - \frac{\Delta}{\tau_F}\right)^2 \tau_F}, \tag{40}$$

$$\beta_4 = \sqrt{\frac{(\Delta - 2\tau_F\kappa)^2}{4\tau_F}}, \tag{41}$$

$$\beta_5 = (\Delta + \tau_F\kappa)\frac{1}{\sqrt{\tau_F}}, \tag{42}$$

$$\beta_6 = \left(\frac{3}{2}\Delta + \tau_F\kappa\right)\frac{1}{\sqrt{\tau_F}}, \tag{43}$$

This result agrees with the asymptotic limit given by Bell. See G. I. BELL, "Calculations of the critical mass of UF$_6$ as a gaseous core, with reflectors of D$_2$O, Be and C," LA-1874, LANL (1955).

Figure 14A:
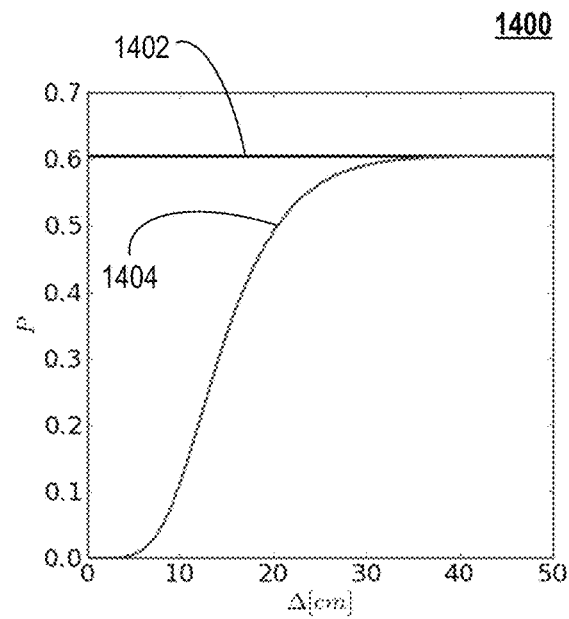
FIG. 14A depicts an exemplary embodiment of an exemplary plot P of the total probability that a fission neutron is thermalized and returned to the nanofuel for a semi-infinite and finite Beryllium (Be) reflector, using $\tau_F$=97.2 $cm^2$ and L=18.9 cm (thermal), according to an exemplary embodiment.

FIG. 14A depicts an exemplary graph 1400 plotting an exemplary embodiment of an exemplary plot P of the total probability that a fission neutron is thermalized and returned to the nanofuel for a semi-infinite 1402 (Eq. 32) and finite 1404 (Eq. 34) Beryllium (Be) reflector, using $\tau_F$=97.2 cm$^2$ and L=18.9 cm (thermal), according to an exemplary embodiment. See R. J. TEMPLIN, "Reactor Physics Constants," 5800, ANL (1963). This figure shows that the probabilities converge when Δ~40 cm, which implies there is no further reduction in neutron leakage for thicker reflectors, according to an exemplary embodiment.

Figure 14B:
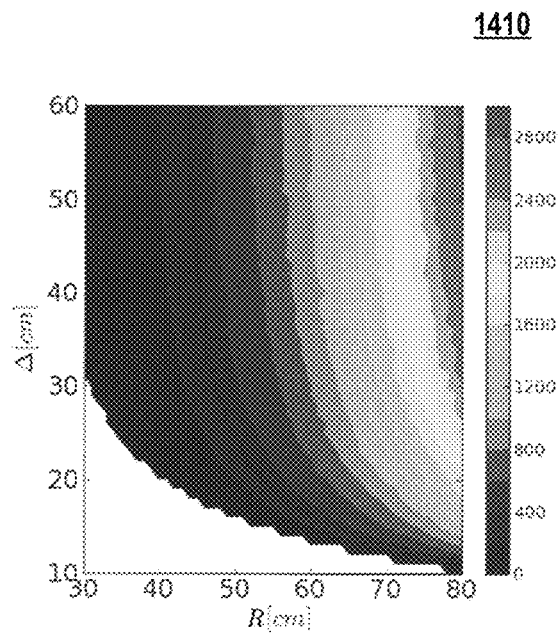
FIG. 14B depicts an exemplary embodiment of exemplary 2,601 static optimal engine core geometry simulations depicting the energy released during combustion Q [MJ] as a function of the engine core radius and the Be reflector thickness, according to an exemplary embodiment.

FIG. 14B depicts an exemplary graph 1410 plotting an exemplary embodiment of exemplary 2,601 static optimal engine core geometry simulations (as defined in Sec. V) depicting the energy released during combustion Q, process 2-3 of process diagram 200, as a function of the engine core radius 310 and the Be reflector thickness, according to an exemplary embodiment. The engine core 304 is surrounded by a Be reflector with thickness Δ and loaded with the nanofuel defined by Fuel c in Table I, according to an exemplary embodiment. Variations in Δ and R 310, according to an exemplary embodiment, demonstrate that the energy released during combustion changes very little when Δ>40 cm. This is consistent with the convergence of the finite reflector curve 1404 to the semi-infinite reflector curve 1402 in FIG. 14A, according to an exemplary embodiment.

APPENDIX B: EXEMPLARY PISTON CASE STRENGTH

In this section, we use the theory of elasticity, as described in Landau and Lifshitz (see L. D. LANDAU and E. M.

LIFSHITZ, *Theory of Elasticity* (*Course of Theoretical Physics; Vol.* 7), Pergamon Press, Boston, third edition, (1986)), to calculate the deformation of the piston case 314 (neutron reflector) due to the nanofuel pressure, according to an exemplary embodiment. This particular approach is also known as the theory of thick-walled cylinders, according to an exemplary embodiment.

Ignoring the piston 302 and piston endcap 316, we focus on the piston case 314 and use cylindrical polar coordinates, according to an exemplary embodiment. Since the deformation of the piston case 314 is in the radial direction, the displacement vector (u) is radial and only a function of the radius R, i.e., $u_R$=u(R), according to an exemplary embodiment.

The equation of mechanical equilibrium for a solid body in the absence of body forces is $$2(1-\sigma)\nabla(\nabla \cdot u)-(1-2\sigma)\nabla \times (\nabla \times u)=0, \quad (44)$$

where $\sigma$ is Poisson's ratio, according to an exemplary embodiment. Here, $\nabla \times u = 0$ and Eq. 44 reduces to:

$$\nabla(\nabla \cdot u)=0, \quad (45)$$

Following Landau and Lifshitz (see L. D. LANDAU and E. M. LIFSHITZ, *Theory of Elasticity* (*Course of Theoretical Physics; Vol.* 7), Pergamon Press, Boston, third edition, (1986)), the intermediate solution of Eq. 45 is $$\nabla \cdot u = \frac{1}{R}\frac{d(Ru)}{dR} = 2c_1, \quad (46)$$

and the final solution is $$u = c_1 R + \frac{c_2}{R}, \quad (47)$$

where $c_1$ and $c_2$ are constants determined by the boundary conditions at the inner and outer surface of the piston case 314, according to an exemplary embodiment.

The nonzero components of the strain tensor, according to an exemplary embodiment, are:

$$u_{RR} = \frac{\partial u_R}{\partial R} = c_1 - \frac{c_2}{R^2}, \quad (48)$$

$$u_{\theta\theta} = \frac{u_R}{R} = c_1 + \frac{c_2}{R^2}. \quad (49)$$

The radial stress, according to an exemplary embodiment, is given by $$\sigma_{RR} = \frac{E}{(1+\sigma)(1-2\sigma)}\{(1-\sigma)u_{RR} + \sigma u_{\theta\theta}\}, \quad (50)$$

where E is Young's modulus. After inserting Eqs. 48 and 49 into Eq. 50, we obtain $$\sigma_{RR} = \frac{E}{(1+\sigma)(1-2\sigma)}c_1 - \frac{E}{(1+\sigma)}\frac{c_2}{R^2}. \quad (51)$$

The unknown constants $c_1$ and $c_2$ are found by assigning the pressure acting on the inner ($R=R_a$) and outer ($R=R_b$) surface of the piston case 314, i.e., $\sigma_{RR}(R_a)=-p_a$ and $\sigma_{RR}(R_b)=-p_b$, respectively, according to an exemplary embodiment. The result is:

$$c_1 = \frac{(1+\sigma)(1-2\sigma)}{E}\frac{p_a R_a^2 - p_b R_b^2}{R_b^2 - R_a^2}, \quad (52)$$

$$c_2 = \frac{(1+\sigma)}{E}\frac{(p_a - p_b)R_a^2 R_b^2}{R_b^2 - R_a^2}. \quad (53)$$

The nonzero components of the stress tensor are:

$$\sigma_{RR} = \frac{p_a R_a^2 - p_b R_b^2}{R_b^2 - R_a^2} - \frac{(p_a - p_b)R_a^2 R_b^2}{R_b^2 - R_a^2}\frac{1}{R^2}, \quad (54)$$

$$\sigma_{\theta\theta} = \frac{p_a R_a^2 - p_b R_b^2}{R_b^2 - R_a^2} - \frac{(p_a - p_b)R_a^2 R_b^2}{R_b^2 - R_a^2}\frac{1}{R^2}, \quad (55)$$

$$\sigma_{zz} = 2\sigma\frac{p_a R_a^2 - p_b R_b^2}{R_b^2 - R_a^2}. \quad (56)$$

In particular, Eq. 55 is known as the hoop stress and has a value at the piston case 314 inner surface of $$\sigma_{\theta\theta}|_{max} = \frac{p_a R_a^2 + (p_a - 2p_b)R_b^2}{R_b^2 - R_a^2}, \quad (57)$$

which is the limiting (most damaging to the structural integrity) stress for the free piston case ($p_b \ll p_a$), according to an exemplary embodiment. Finally, the radial displacement is given by $$u = \frac{(1+\sigma)(1-2\sigma)}{E}\frac{p_a R_a^2 - p_b R_b^2}{R_b^2 - R_a^2}R + \frac{(1+\sigma)}{E}\frac{(p_a - p_b)R_a^2 R_b^2}{R_b^2 - R_a^2}\frac{1}{R}. \quad (58)$$

For beryllium (Be), the yield stress ($\sigma_y$) and Young's modulus (E) are, according to an exemplary embodiment:

$$\sigma_y[\text{bar}]=5287.3-4.7663T+0.001T^2, \quad (59)$$

$$E[\text{bar}]=3.1352\times10^6-5.6428\times10^2 T, \quad (60)$$

where T is the metal temperature in degrees Kelvin. Be has a melting temperature $T_m$=1,560 K and a Poisson ratio $\sigma$=0.032, according to an exemplary embodiment.

IX. Exemplary Nanofuel Rotary Engine

When it is important for an application to minimize the size and weight of the power generation technology, the Wankel rotary engine offers several advantages over the reciprocating engine, according to an exemplary embodiment. See K. Yamamoto, *Rotary Engine* (Toyo Kogyo Co., Hiroshima, Japan, 1971); K. Yamamoto, *Rotary Engine* (Sankaido Co., Tokyo, Japan, 1981); and K. C. Weston, *Energy Conversion* (PWS Publishing Company, Boston, 1992). These include: (1) increased system power density; (2) reduced engine vibration, since all parts are in continuous unidirectional rotating motion and a rotating mass can be completely balanced by a counterweight; (3) elimination of an intake-exhaust valve mechanism, which allows faster operating speeds and reduces mechanical noise; (4) elimination of a cranking mechanism, which allows more compact and simple engine construction; and (5) decreased torque fluctuation, according to an exemplary embodiment. The main disadvantages of fossil fuel rotary engines, according to an exemplary embodiment, are the reduced fuel utilization and increased emissions owing to inefficiencies in their combustion dynamics.

For a nanofuel engine 102, a rotary engine, according to an exemplary embodiment, has several advantages including, e.g., but not limited to, a substantial economic improvement derived from reducing the engine size and weight, simplifying manufacturing, and decreasing the operations and maintenance costs, etc., according to an exemplary embodiment. Furthermore, the disadvantages of fossil fuel rotary engines associated with combustion inefficiencies are eliminated in a nanofuel rotary engine by the closed thermodynamic fuel cycle, according to an exemplary embodiment. In this section, we present an exemplary rotary engine review, develop an exemplary rotary engine flank cavity that is suitable for nanofuel combustion, and describe an exemplary compact nanofuel rotary engine configuration, according to an exemplary embodiment.

IX.A. Exemplary Rotary Engine Review

The Wankel rotary engine, according to an exemplary embodiment, may also operate in an Otto cycle, according to an exemplary embodiment. Recall that FIG. 2 (in Sec. II) depicts an exemplary embodiment of an exemplary so-called ideal Otto cycle process diagram 200 illustrating exemplary variations in the exemplary dimensionless parameters r (Eq. 1) and $\xi$ (Eq. 3): solid curve, r=10 and $\xi$=10; dashed curve, r=10 and $\xi$=16; and dotted curve, r=6 and $\xi$=10, according to an exemplary embodiment.

Figure 15:
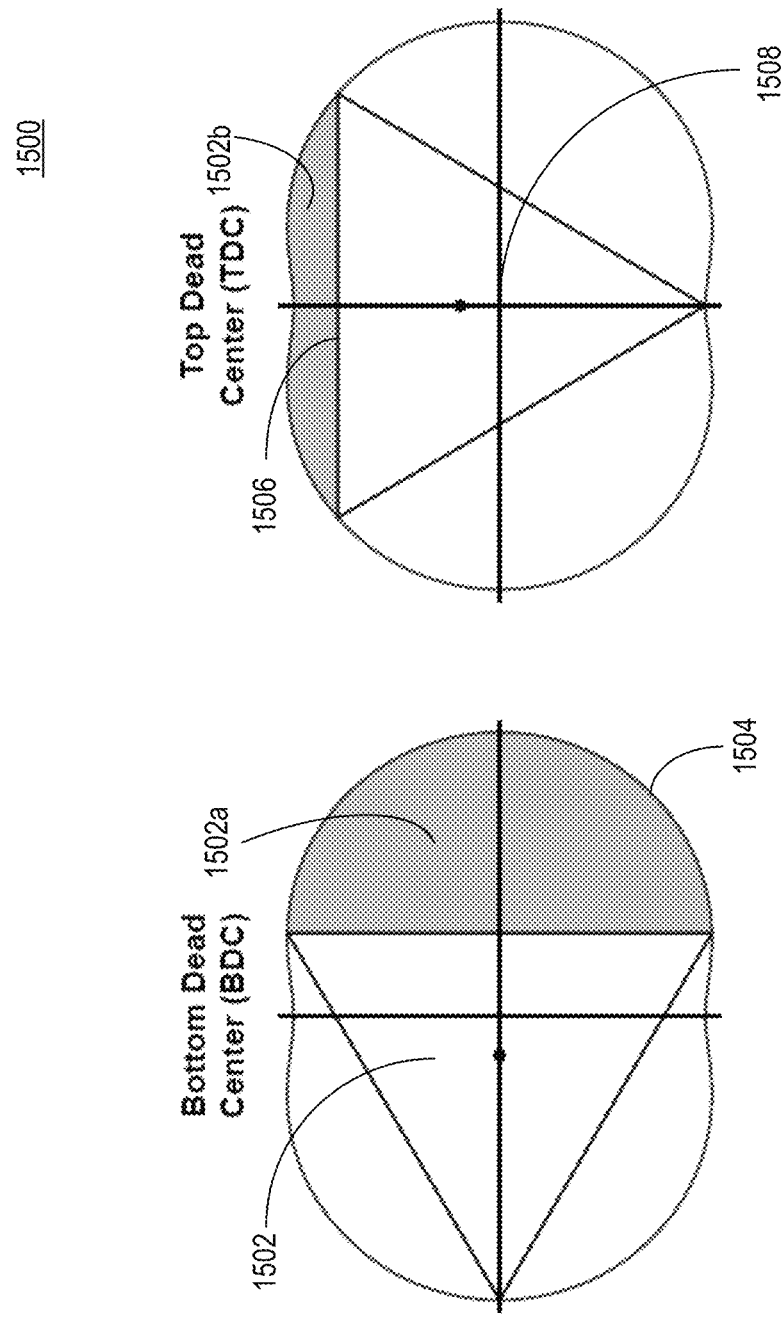
FIG. 15 depicts an exemplary embodiment illustrating exemplary main Wankel rotary internal-combustion (IC) engine fuel volume positions, namely the bottom dead center (BDC) position and the top dead center (TDC) position, according to an exemplary embodiment.

FIG. 15 depicts an exemplary embodiment of an exemplary diagram 1500 illustrating exemplary main Wankel rotary engine internal-combustion (IC) engine fuel volume positions 1502a and 1502b, namely the bottom dead center (BDC) position 1502a (left) and the top dead center (TDC) position 1502b (right), according to an exemplary embodiment. As illustrated, an exemplary rotor 1502 is contained in a rotor housing 1504 and may be coupled to an output shaft 1508, according to an exemplary embodiment. According to an exemplary embodiment, it is beneficial to focus on the counterclockwise rotation of a mass of fuel (M) in a variable volume (V) that is constrained by the rotor housing 1504, one rotor flank 1506, and the side housing (not shown). FIG. 15 highlights two such volumes, namely 1502a and 1502b, according to an exemplary embodiment.

Returning to FIG. 2, the ideal Otto cycle assumes that all processes are internally reversible and the working fluid is an ideal gas with constant specific heats, according to an exemplary embodiment. The cycle starts in state 1 of process diagram 200, according to an exemplary embodiment, when the fuel is located in the bottom dead center (BDC) position 1502a. During process 1-2 of process diagram 200, according to an exemplary embodiment, the rotor 1502 may execute a counterclockwise rotation and may isentropically compress the fuel. In state 2 of process diagram 200, according to an exemplary embodiment, the fuel is located in the TDC position 1502b and the compression ratio (r) is given by $$r = \frac{V_1}{V_2} = \frac{\rho_2}{\rho_1}, \tag{61}$$

where $\rho$=M/V is the mass density of the fuel and subscripts refer to the state of process diagram 200, according to an exemplary embodiment. During process 2-3 of process diagram 200, according to an exemplary embodiment, combustion occurs at constant volume, the system releases energy (Q), and the working fluid pressure increases. It is useful to introduce a dimensionless parameter $\xi$ (see Eq. 3) that describes the energy deposited in the working fluid during process 2-3 of process diagram 200 relative to the initial fuel heat content. In process 3-4 of process diagram 200, according to an exemplary embodiment, the working fluid isentropically expands and generates a direct counterclockwise torque on the output shaft 1508. Finally, in an ideal process 4-1 of process diagram 200, according to an exemplary embodiment, the working fluid is cooled at constant volume and the cycle is complete.

The rotor housing 1504 of a Wankel rotary engine, according to an exemplary embodiment, is a two-lobed epitrochoid given by $$x_1(\theta) = R_r \cos(\theta) + e \cos(3\theta), \tag{62}$$

$$x_2(\theta) = R_r \sin(\theta) + e \sin(3\theta), \tag{63}$$

Where ($x_1$, $x_2$) denotes the rotor housing 1504 curve in Cartesian coordinates, $\theta \in [0, 2\pi)$ is defined from the positive $x_1$-axis in the counterclockwise sense, $R_r$ is the generating radius or the rotor 1502 center-to-tip distance, and e is the eccentricity, according to an exemplary embodiment. See D. H. Nash, Mathematics Magazine 50, 87 (1977). The rotor 1502 tip positions are given by $$x_{1m}(\theta) = R_r \cos\left(\theta + \frac{2m\pi}{3}\right) + e\cos(3\theta), \tag{64}$$

$$x_{2m}(\theta) = R_r \sin\left(\theta + \frac{2m\pi}{3}\right) + e\sin(3\theta), \tag{65}$$

where $m \in [0,1,2]$, i.e., m is an integer selected from a group greater than or equal to zero (0), and less than or equal to two (2), according to an exemplary embodiment.

In the top dead center (TDC) position 1502b, the clearance between the rotor flank 1506 and the minor axis of the rotor housing 1504 sets a limit on the eccentricity ratio (e/$R_r$), according to an exemplary embodiment. This clearance distance ($d_1$), according to an exemplary embodiment, must be positive, i.e., $$d_1 = (R_r - e) - (\tfrac{1}{2}R_r + e) = \tfrac{1}{2}R_r - 2e > 0. \tag{66}$$

Thus, the eccentricity ratio has an upper limit, according to an exemplary embodiment:

$$\frac{e}{R_r} < \frac{1}{4}. \tag{67}$$

Note that e/$R_r$=0 generates no torque and no compression (r=1).

Figure 16:
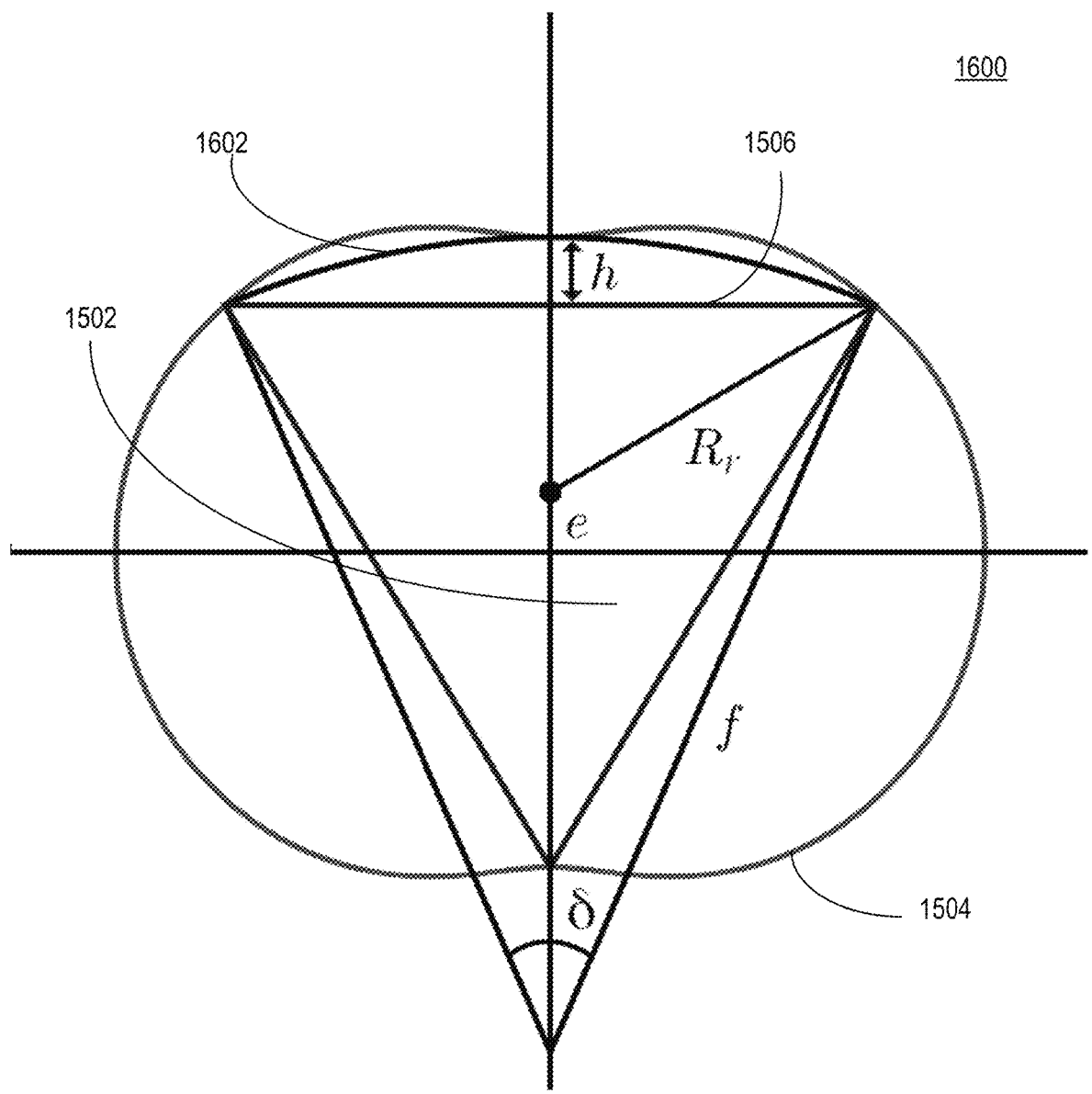
FIG. 16 depicts an exemplary embodiment illustrating an exemplary circular arc flank rounding geometry, according to an exemplary embodiment.

FIG. 16 depicts an exemplary embodiment of an exemplary diagram 1600 illustrating an exemplary circular arc flank 1602 rounding geometry, according to an exemplary embodiment.

Modifying the rotor flank 1506 to reduce the fuel volume in the TDC position 1502b increases both the compression ratio (Eqs. 1 and 61) and the thermal efficiency (Eq. 2), according to an exemplary embodiment. FIG. 16 in diagram 1600 depicts, according to an exemplary embodiment, a circular arc flank 1602, according to an exemplary embodiment, which is a common shape for flank 1506 rounding, and establishes the following geometric relations:

$$\frac{f}{R_r} = \frac{\sqrt{3}}{2}\csc\left(\frac{\delta}{2}\right), \tag{68}$$

$$\frac{h}{R_r} = \frac{\sqrt{3}}{2}\tan\left(\frac{\delta}{4}\right), \tag{69}$$

where f is the circular radius of the circular arc flank 1602, δ is the angle subtended by the circular arc flank 1602, and h is the circular arc flank 1602 maximum height above the straight flank 1506, according to an exemplary embodiment. The circular arc height, according to an exemplary embodiment, must be less than the clearance distance to ensure the rotor flank 1602 does not contact the rotor housing 1504, i.e., $h < d_1$, where $d_1$ is defined in Eq. 66.

The compression ratio, according to an exemplary embodiment, is given by $$r = \frac{V_{max} - V_{seg}}{V_{min} - V_{seg}}, \tag{70}$$

where $V_{max}$ refers to the fuel volume in the BDC position 1502a, $V_{min}$ refers to the fuel volume in the TDC position 1502b, and $V_{seg}$ refers to the additional rotor 1502 volume introduced by flank rounding 1602, according to an exemplary embodiment. These volumes are given by $$\frac{V_{max}}{R_r^2 w} = \pi\left[\left(\frac{e}{R_r}\right)^2 + \frac{1}{3}\right] + \frac{\sqrt{3}}{4}\left[6\left(\frac{e}{R}\right) - 1\right], \tag{71}$$

$$\frac{V_{min}}{R_r^2 w} = \pi\left[\left(\frac{e}{R_r}\right)^2 + \frac{1}{3}\right] - \frac{\sqrt{3}}{4}\left[6\left(\frac{e}{R}\right) + 1\right], \tag{72}$$

$$\frac{V_{seg}}{R_r^2 w} = \frac{3}{8}\frac{\delta - \sin(\delta)}{\sin^2(\delta/2)}, \tag{73}$$

where w is the rotor 1504 width, according to an exemplary embodiment.

IX. B. Exemplary Flank Cavity Design

Rotary engines, according to an exemplary embodiment, may introduce a flank cavity in the rotor 1502 on the rotor flank 1602 to improve the combustion characteristics. In an analogous fashion, we develop a rotor flank cavity that is suitable for nanofuel combustion using our nanofuel reciprocating engine design, according to an exemplary embodiment.

Our approach to nanofuel engine 102 design, according to an exemplary embodiment, closely parallels the orthodox nuclear engineering technique for calculating the effective multiplication factor by separating the problem into an infinite medium multiplication factor, which depends on the nuclear fuel properties, and a nonleakage probability, which depends on the reactor core geometry, according to an exemplary embodiment. An advantage of this approach is that nuclear fuel properties can be studied independent of reactor core geometries, and vice versa, according to an exemplary embodiment. In nanofuel engine 102 design, according to an exemplary embodiment, the same dichotomy exists. Thus, the nanofuel properties established for a reciprocating engine design are valid for a rotary engine. For example, the exemplary embodiments shown in Table I, which illustrate interesting nanofuel compositions and their properties, are valid for a rotary engine design.

Turning to the flank cavity geometry design, according to an exemplary embodiment, we start by considering neutron leakage. In general, neutron leakage, according to an exemplary embodiment, is proportional to the engine core surface to volume ratio and has a minimum value for a sphere. Note that, similar to the definition of the reactor core in nuclear engineering, the engine core contains the nanofuel. Accommodating the elongated shape of rotor flank 1602, according to an exemplary embodiment, we choose to elongate the sphere and explore ellipsoidal flank cavities with minor axis length 2b and major axis length 2a=2×b, where x is constant and x=1 corresponds to a sphere, according to an exemplary embodiment. Now we will perform detailed numerical simulations of the flank cavity and quantify several characteristics of the combustion process 2-3 of process diagram 200, according to an exemplary embodiment.

Figure 17:
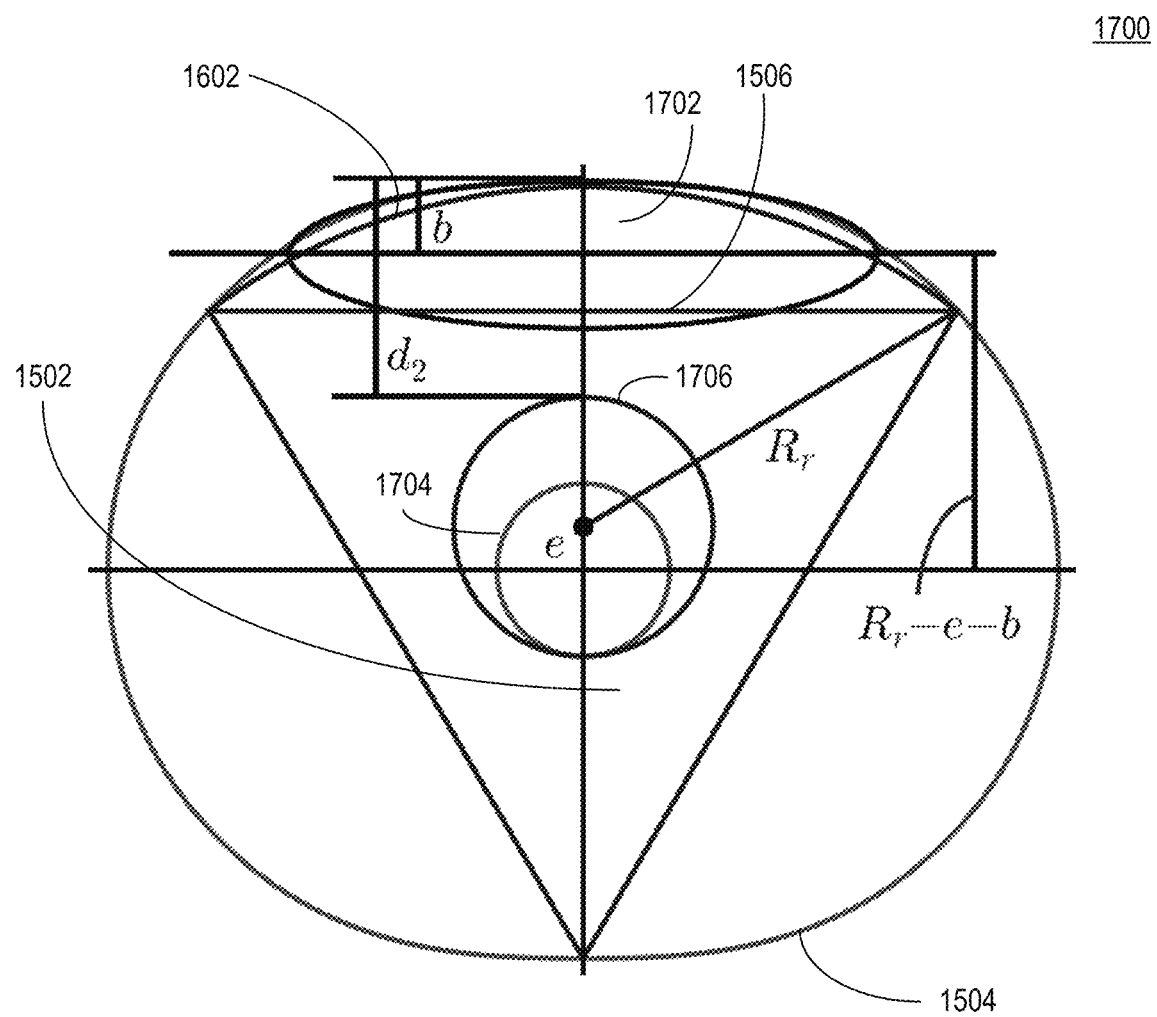
FIG. 17 depicts an exemplary embodiment of an exemplary flank cavity geometry in the TDC position, according to an exemplary embodiment; more specifically.

FIG. 17 depicts an exemplary embodiment of an exemplary flank cavity geometry in the TDC position 1502b, according to an exemplary embodiment. Specifically, FIG. 17 in diagram 1700 illustrates an ellipsoidal flank cavity 1702 with minor axis length 2b and major axis length 2a=2×b, when the rotary engine is in the TDC position 1502b, according to an exemplary embodiment.

First, we select the exemplary nanofuel defined by Fuel c in Table I, which has the following ingredient mass fractions: fissile fuel m($^{239}$PuF$_6$)=0.45, passive agent m($^{240}$PuF$_6$)=0.05, and moderator m(H$_2$)=0.50. Next, the nanofuel rotary engine ellipsoidal flank cavity 1702 simulation initial conditions are obtained by starting in state 1 of process diagram 200, according to an exemplary embodiment, with the following nanofuel properties: $\rho_1$=0.002 g/cm$^3$ and $T_1$=350 K, according to an exemplary embodiment. Now, assuming isotropic compression of an ideal gas (γ=1.4), the nanofuel properties in state 2 of process diagram 200, according to an exemplary embodiment, are given by: by: $\rho_2 = r\rho_1$, $T_2 = r^{\gamma-1}T_1$, and $p_2 = r^{\gamma}p_1$. Note that these vary depending on the compression ratio r. Next, an exemplary 30 cm thick beryllium (Be) reflector, according to an exemplary embodiment, surrounds the ellipsoidal flank cavity 1702 and reduces neutron leakage, according to an exemplary embodiment. Appendix A discusses the relationship between the Be reflector thickness and the neutron leakage from an engine core. The combustion process 2-3 of process diagram 200, according to an exemplary embodiment, may begin with the injection of 10$^8$ fusion (14 MeV) neutrons into the system within 1 μs and may end due to the nanofuel negative temperature coefficient of reactivity (the rotor 1502 is stationary in these simulations, which stems from an approximation where the combustion process is faster than the rotation speed), according to an exemplary embodiment.

FIGS. 18A, 18B, 18C, and 18D (hereafter collectively referred to as FIG. 18), according to an exemplary embodiment, depict various exemplary embodiments of exemplary nanofuel rotary engine ellipsoidal flank cavity 1702 simulations, according to various exemplary embodiments. Specifically, FIG. 18 in diagrams 1800, 1810, 1820, and 1830, plot the exemplary energy released during combustion Q [MJ], process 2-3 of process diagram 200, as a function of the ellipsoidal flank cavity 1702 minor radius b and the major radius multiplier x (where the major radius is given by a=bx), for several compression ratios r. More specifically: in FIG. 18A diagram 1800, r=6; in FIG. 18B diagram 1810, r=8; in FIG. 18C diagram 1820, r=10; and in FIG. 18D diagram 1830, r=12. The contours in diagrams 1800, 1810, 1820, and 1830 start in the lower left hand portion of the plot with Q=100 MJ and increase as one moves up and to the right.

FIG. 18 illustrates the energy released during combustion Q [MJ], process 2-3 of process diagram 200 as a function of the ellipsoidal flank cavity 1702 minor radius b and the major radius multiplier x (a=bx), for several compression ratios (r∈[6,8,10,12]). An ellipsoidal flank cavity 1702 in the flank rotor 1602 offers sufficient performance for use in a nanofuel rotary engine. In particular, for r=12 and x=1 (a spherical flank cavity) we find that Q=272.7 MJ when b=50 cm, while for r=12 and x=5 we find that Q=296.5 MJ when b=32 cm. In comparison, the volume of the elongated cavity increased by 1.311, the surface to volume ratio increased by 1.248, and the energy released only increased by 1.087. However, the reduction in minor radius from 100 cm to 64 cm means a reduction in the overall rotary engine dimensions (and hence cost).

IX.C. Exemplary Compact Configuration

The nanofuel properties and rotor flank cavity geometry, according to an exemplary embodiment, may strongly influence the nanofuel rotary engine performance, according to an exemplary embodiment. Here we explore the overall nanofuel rotary engine size as a function of the ellipsoidal flank cavity 1702 dimensions (b, a=2x), reflector thickness (Δ), and eccentricity ratio (e/$R_r$), according to an exemplary embodiment.

As illustrated in FIG. 17, the ellipsoidal flank cavity 1702 minor radius and a reflector thickness must fit between the rotor housing 1504 minor radius and the output shaft rotor journal 1706, according to an exemplary embodiment. Assuming the diameter of the output shaft 1508 rotor journal 1706 is 6e, this geometric condition, according to an exemplary embodiment, is $$2b + \Delta = d_2 = R_r - 5e. \quad (74)$$

Solving for the rotor 1502 center-to-tip distance we find $$R_r = \frac{2b + \Delta}{1 - 5(e/R_r)} = \frac{2b + \Delta}{1 - 5(1/K)}, \quad (75)$$

where K=$R_r$/e is the trochoid constant, according to an exemplary embodiment. Eq. 75 shows that $R_r$ is inversely proportional to K and the rotary engine size decreases as K increases, according to an exemplary embodiment, which is not obvious from the definition of K. It is also true that $R_r$ is directly proportional to e/$R_r$ and the rotary engine size decreases as e/$R_r$ decreases, according to an exemplary embodiment.

Figure 18A:
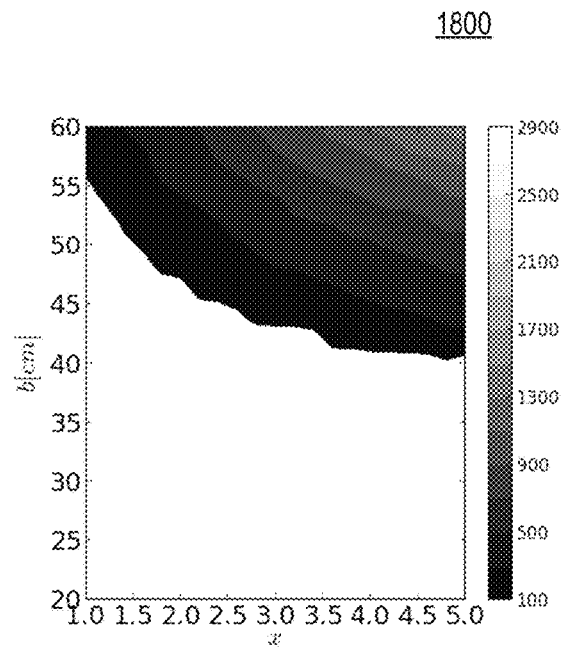
FIGS. 18A, 18B, 18C, and 18D (hereafter collectively referred to as FIG. 18), according to an exemplary embodiment, depict various exemplary embodiments of exemplary nanofuel rotary engine ellipsoidal flank cavity simulations, according to various exemplary embodiments; more specifically.
Figure 18B:
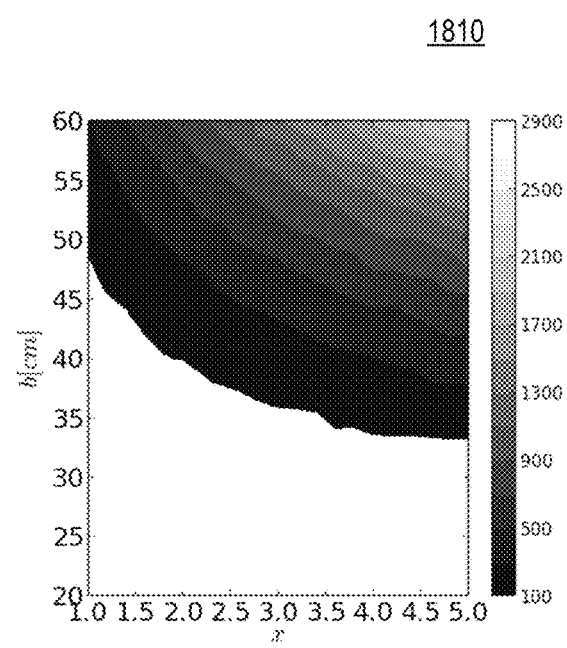
Figure 18C:
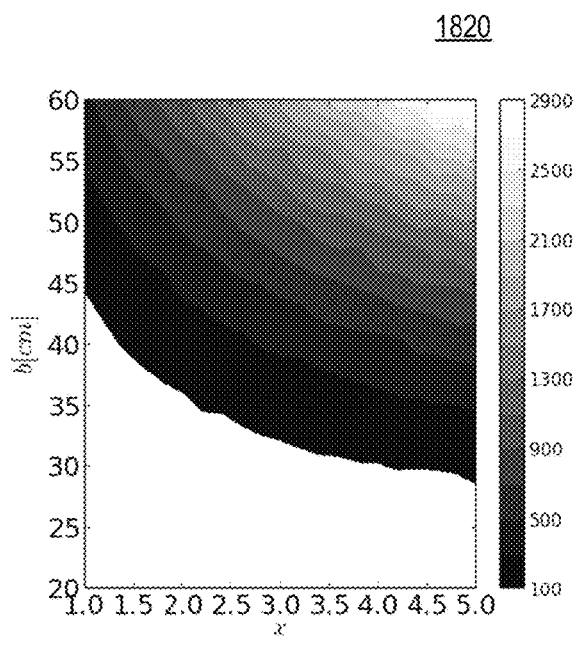
Figure 18D:
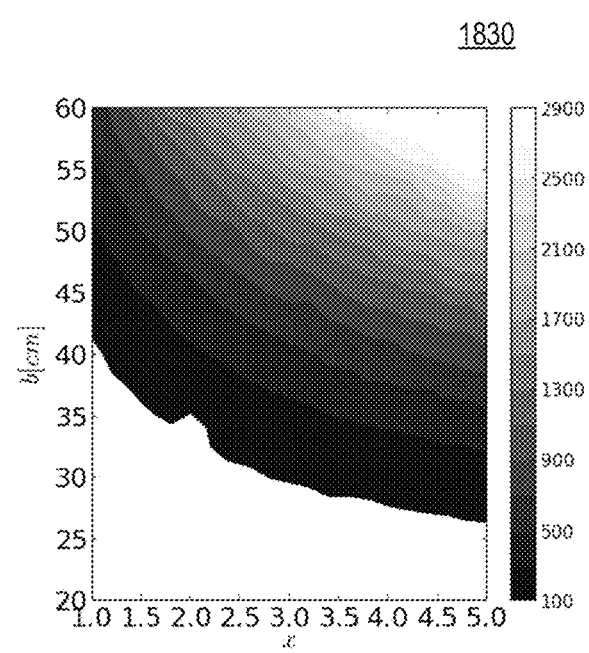

Illustrating Eq. 75, from FIG. 18D we select the Q=219.0 MJ result produced by the ellipsoidal flank cavity 1702 with b=32 cm and x=4, according to an exemplary embodiment. For Δ=30 cm, according to an exemplary embodiment, we obtain $$R_r[cm] = \frac{94}{1 - 5(1/K)}. \quad (76)$$

As K increases from 6 to 10, which is within the normal fossil fuel rotary engine design domain, $R_r$ decreases significantly from 564 cm to 188 cm, according to an exemplary embodiment.

Figure 19:
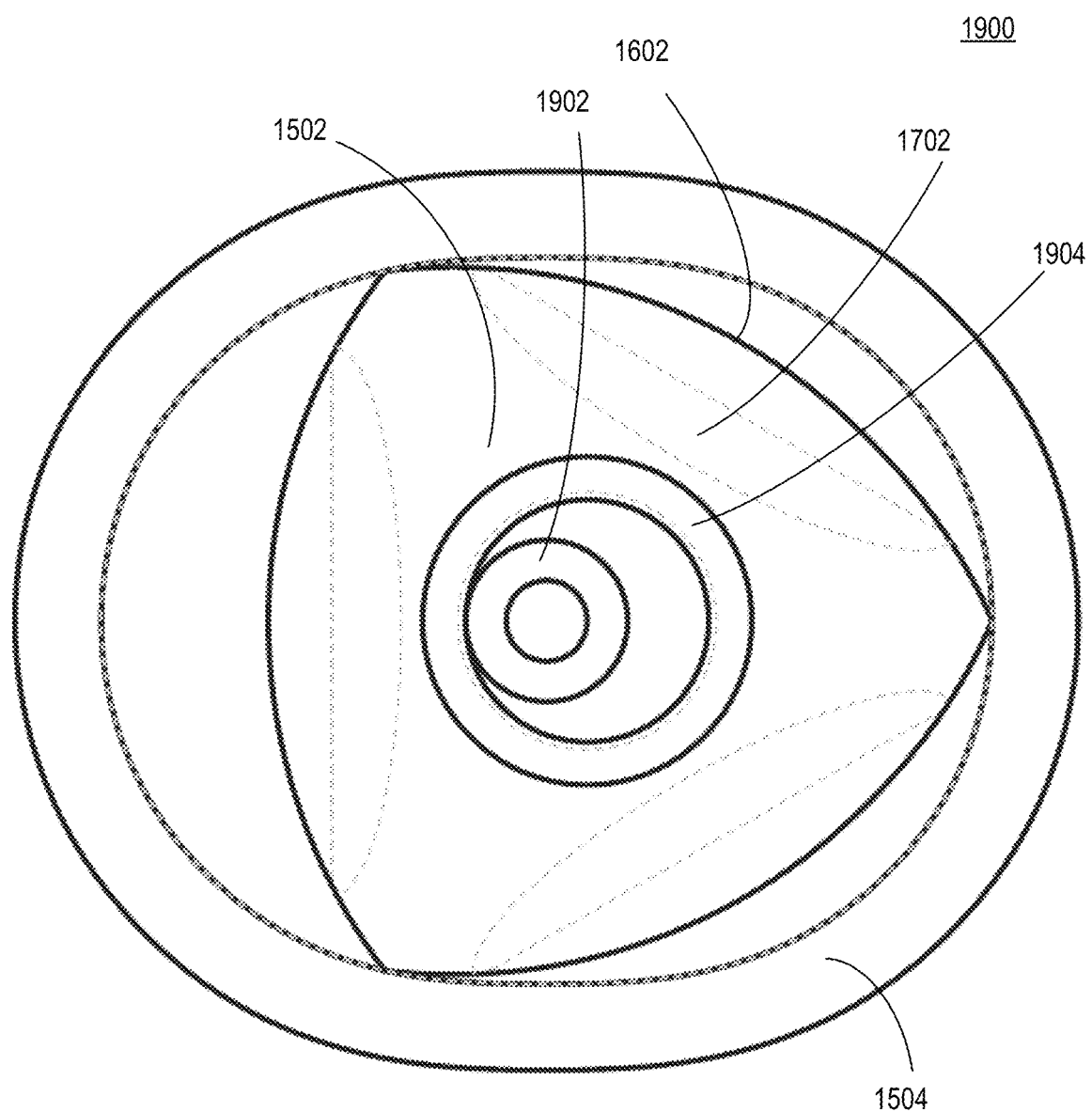
FIG. 19, according to an exemplary embodiment, depicts an exemplary embodiment illustrating an exemplary nanofuel rotary engine geometry, according to an exemplary embodiment.

FIG. 19, according to an exemplary embodiment, depicts an exemplary embodiment of an exemplary diagram 1900 illustrating an exemplary nanofuel rotary engine geometry, according to an exemplary embodiment. Any depicted dimensions are exemplary, but not limiting, according to an exemplary embodiment.

Continuing this illustration, FIG. 19 shows that for K=10 the outer rotor housing 1504 major radius, according to an exemplary embodiment, is approximately 15.5 ft, and the outer rotor housing 1504 minor radius is approximately 12.6 ft, according to an exemplary embodiment. Assuming the rotary engine thermal efficiency is η=55%, the alternator efficiency is 98%, and the operating speed is cps=1 (cycles per second), the electric capacity is 118.0 MW$_e$, according to an exemplary embodiment. At cps=10, or 600 RPM (revolutions per minute), the electric capacity is 1,180 MW$_e$, according to an exemplary embodiment.

This compact configuration enables straightforward construction of a nanofuel rotary engine, according to an exemplary embodiment. For example, the rotor center-to-tip dimension $R_r$=188 cm for K=10 is comparable to a Curtiss-Wright rotary engine with $R_r$=100 cm that was built in the early 1970's, according to an exemplary embodiment. See R. Loyd, Combustion Science and Technology 12, 47 (1976). The nanofuel rotary engine operation retains the benefits of the nanofuel reciprocating engine, notably the nanofuel negative temperature coefficient of reactivity and the criticality dependence on engine core dynamics, according to an exemplary embodiment. Note that the engine core contains the nanofuel, including the flank cavity 1702 as well as the volume between the rotor 1502, rotor housing 1504, and side housing, according to an exemplary embodiment. The nanofuel rotary engine is also capable of using light water reactor (LWR) spent nuclear fuel (SNF), according to an exemplary embodiment. In particular, moderator mass fractions in the range 0.4<m($H_2$)<0.6, mixed with the aerosol formed from the isotope concentrations in Table IV (which are typical of LWR SNF), offer favorable nanofuel properties, namely: $k_\infty$~1.4, α~3,000 gen/s, a negative temperature of reactivity ($α_T$<0 1/K), and a criticality transition near T~4,000 K, according to an exemplary embodiment.

X. Exemplary Nuclear Fuel Cycle for Creating and Using Nanofuel

In this section, we present an exemplary nuclear fuel cycle for creating and using nanofuel that is an extension of the once-through open fuel cycle used in the U.S. to fuel commercial light water reactors (LWRs), according to an exemplary embodiment.

Figure 20:
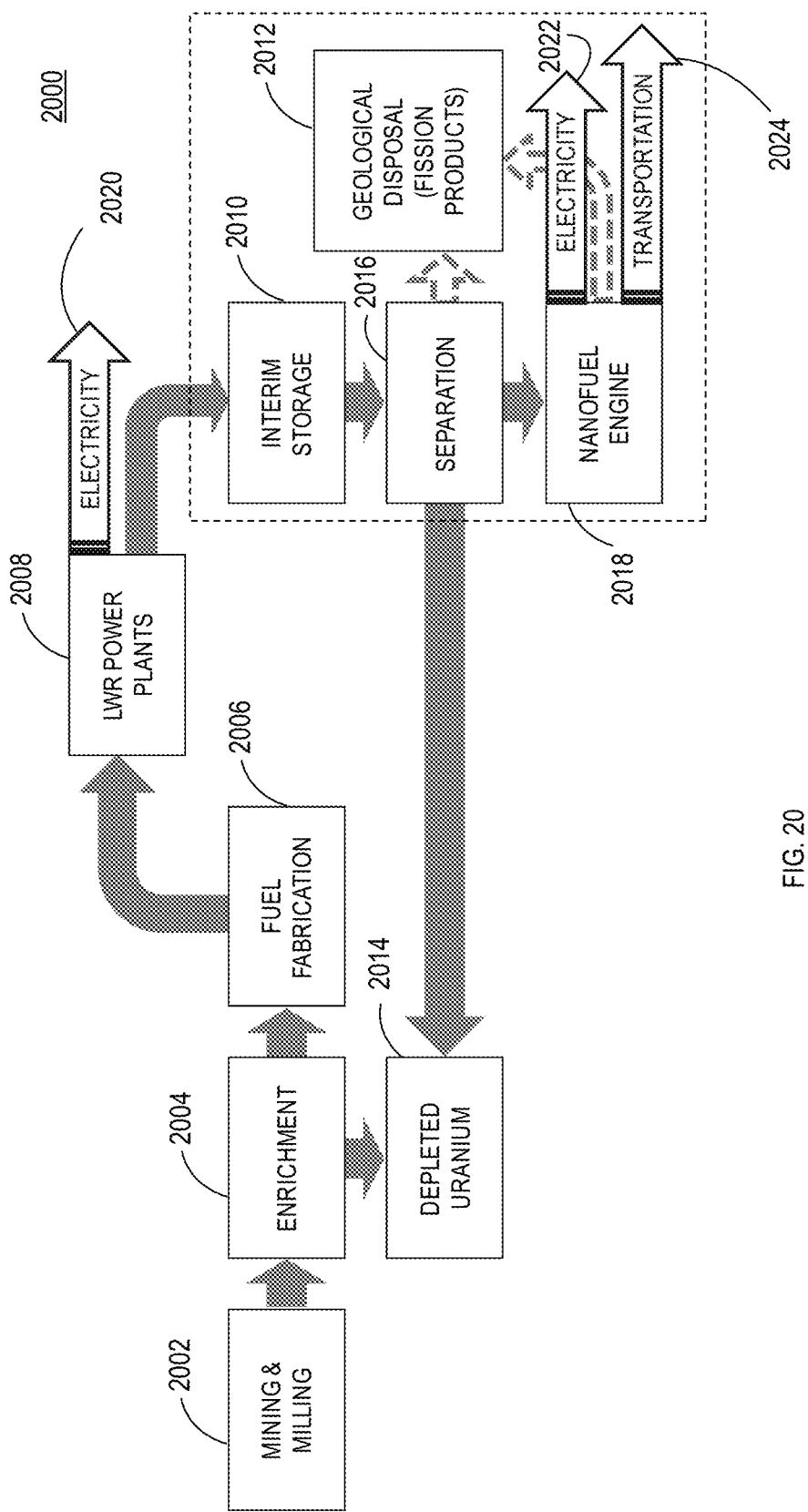
FIG. 20 depicts an exemplary embodiment illustrating of an exemplary nuclear fuel cycle, according to an exemplary embodiment; more specifically.

FIG. 20 depicts an exemplary embodiment of an exemplary diagram 2000 illustrating an exemplary nuclear fuel cycle, according to an exemplary embodiment. According to an exemplary embodiment, an exemplary nanofuel engine 102 may offer a proliferation resistant solution to eliminating high-level waste (HLW) and transuranic (TRU) waste, as defined by the U.S. Atomic Energy Act of 1954 ("Atomic Energy Act of 1954, as Amended," 1954, United States Public Law 83-703), in commercial LWR spent nuclear fuel (SNF), according to an exemplary embodiment.

FIG. 20 depicts an exemplary nuclear fuel cycle 2000 flow diagram, according to an exemplary embodiment, which may include, e.g., but is not limited to, various elements, which may begin with the major steps of the exemplary present once-through open fuel cycle used in the U.S., namely: an exemplary mining and/or milling process 2002; an exemplary enrichment process 2004; an exemplary fuel fabrication process 2006; and/or an exemplary LWR power plant process 2008, according to an exemplary embodiment. In addition, the exemplary nuclear fuel cycle 2000 flow diagram, may include one or more processes for creating nanofuel, which may include, e.g., but is not limited to, the following processes: an exemplary interim storage process 2010; an exemplary separation process 2016; an exemplary nanofuel engine process 2018; and/or an exemplary geological disposal process 2012, according to an exemplary embodiment.

In 2002, according to an exemplary embodiment, the mining and/or milling process 2002 may involve a metal mining operation that may extract uranium (U) ore and/or a milling operation that may extract exemplary uranium oxide from the ore and/or produce yellow cake, which is a form of U traded in commodity markets. Natural U may contain about 0.7% of the fissile nuclide $^{235}$U and the reset may contain mostly $^{238}$U, in an exemplary embodiment. From the exemplary mining and/or milling process 2002, the exemplary nuclear fuel cycle 2000 may continue with an exemplary enrichment process 2004, according to an exemplary embodiment.

In 2004, according to an exemplary embodiment, the exemplary enrichment process 2004 may involve the conversion of exemplary uranium oxide and/or yellow cake to uranium hexafluoride (UF$_6$) and/or may increase the concentration of the fissile nuclide $^{235}$U to somewhere in the range of 3% to 5%, which is appropriate for use in most commercial LWRs. The exemplary process of increasing the concentration of $^{235}$U above the natural level of 0.7% is called enrichment. The exemplary enrichment process 2004 may involve the creation of an exemplary depleted uranium product stream containing mostly pure $^{238}$U (less than 0.3% $^{235}$U). From the exemplary enrichment process 2004, the exemplary nuclear fuel cycle 2000 may continue with an exemplary depleted uranium process 2014 and/or an exemplary fuel fabrication process 2006, according to an exemplary embodiment.

In 2006, according to an exemplary embodiment, the exemplary fuel fabrication process 2006 may involve the conversion of uranium hexafluoride (UF$_6$) into an exemplary fuel element that may be suitable for use in a LWR. From the exemplary fuel fabrication process 2006, the exemplary nuclear fuel cycle 2000 may continue with an exemplary LWR power plant process 2008, according to an exemplary embodiment.

In 2008, according to an exemplary embodiment, the exemplary LWR power plant process 2008 may involve the use of exemplary fuel elements in a LWR for electricity generation 2020 followed by on-site SNF storage. After fuel elements are irradiated in a LWR, the SNF may be stored, e.g., in water pools for several years and then may be moved to long-term dry storage, in an exemplary embodiment. Rather than continue to store LWR SNF on-site, which may pose a risk to the environment and people and may create an increasing economic burden on the U.S. taxpayer, according to an exemplary embodiment, this SNF may be advantageously used in an exemplary nanofuel engine 102 according to the following processes. From the exemplary LWR power plant process 2008, the exemplary nuclear fuel cycle 2000 may continue with an exemplary interim storage process 2010, according to an exemplary embodiment.

In 2010, according to an exemplary embodiment, the exemplary interim storage process 2010 may involve the collection of SNF in an exemplary consolidated storage facility (CSF), as defined by the Blue Ribbon Commission on America's Nuclear Future (see Blue Ribbon Commission on America's Nuclear Future Report to the Secretary of Energy, 2012). The SNF may include, e.g., but is not limited to, LWR SNF. From the interim storage process 2010, the exemplary nuclear fuel cycle 2000 may continue with an exemplary separation process 2016, according to an exemplary embodiment.

In 2016, according to an exemplary embodiment, the exemplary separation process 2016 may involve conversion of SNF into an exemplary three product streams, namely: an exemplary depleted uranium stream for trade in commodity markets; an exemplary low-level radioactive nuclear waste stream, which may include, fission products and may require exemplary short-term environmental isolation; and/or an exemplary nanofuel stream for use in an exemplary nanofuel engine 102, according to an exemplary embodiment, etc. The exemplary separation process 2016 may rely on exemplary electrometallurgical treatment methods and/or exemplary pyrochemical processing (also known as pyroprocessing), according to an exemplary embodiment. From the separation process 2016, the exemplary nuclear fuel cycle 2000 may continue with an exemplary depleted uranium process 2014, an exemplary geological disposal process 2012, and/or an exemplary nanofuel engine process 2018, according to an exemplary embodiment.

In 2014, according to an exemplary embodiment, the exemplary depleted uranium process 2014 may involve producticizing $^{238}$U as a commodity and/or trade in the commodity markets, according to an exemplary embodiment.

In 2012, according to an exemplary embodiment, the exemplary geological disposal process 2012 may involve isolation of fission products from the environment. Since the high-level radioactive nuclear waste may be retained in the nanofuel stream, the remaining low-level radioactive nuclear waste, which may be similar to that generated by most hospitals, may merely require conversion into an exemplary glass and/or ceramic form and may then include subsequent exemplary shallow land burial for approximately a hundred years, according to an exemplary embodiment.

In 2018, according to an exemplary embodiment, the exemplary nanofuel engine process 2018 may involve exemplary use of the exemplary nanofuel in an exemplary nanofuel engine 102 for electricity generation 2022 and/or for transportation 2024, as illustrated, and may, according to an exemplary embodiment, run on exemplary transuranic elements and/or high-level radioactive nuclear waste from SNF, as illustrated. The exemplary waste generated by an exemplary nanofuel engine 102 may be considered low-level radioactive nuclear waste, which may be similar to that generated by most hospitals, which may be sent to an exemplary geological disposal process 2012, according to an exemplary embodiment.

Various further and/or alternative processing may be performed, as is conventionally well known to further process the nuclear fuel in the exemplary nuclear fuel cycle, according to various exemplary embodiments.

Exemplary Local Back End to the Nuclear Fuel Cycle

Figure 21:
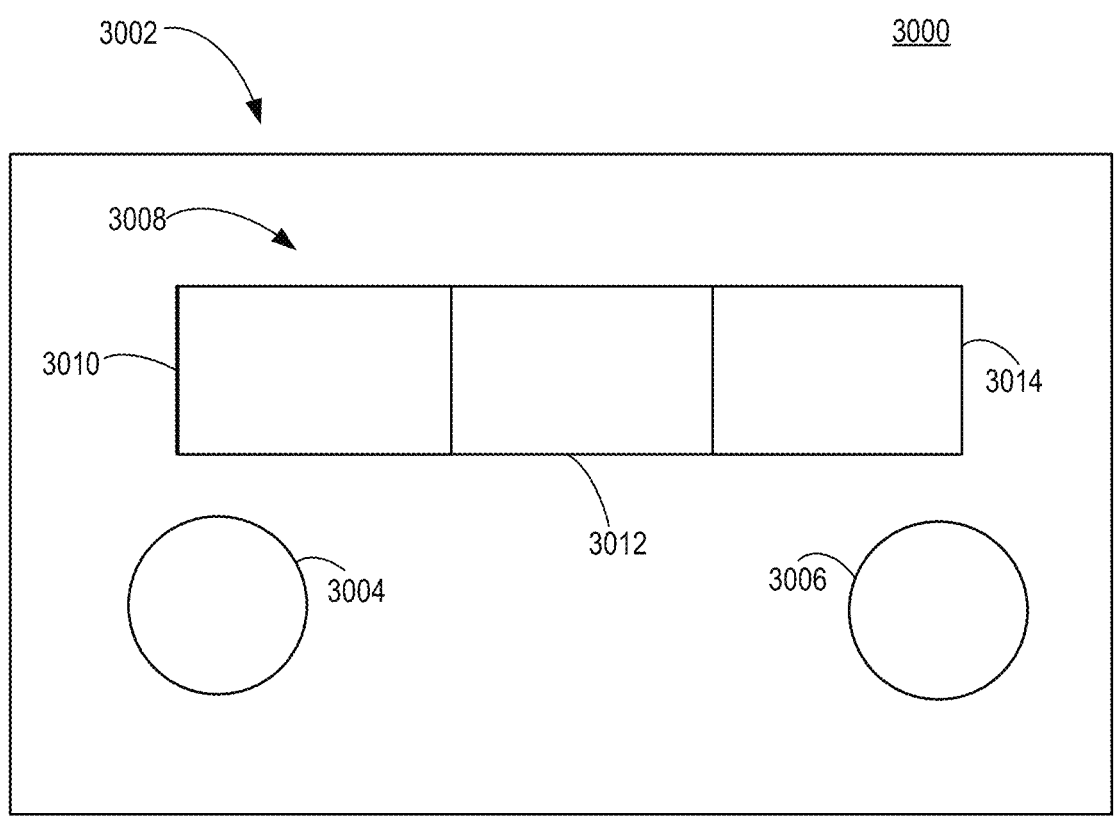
FIG. 21 depicts an exemplary nuclear reactor site diagram containing an exemplary nuclear reactor area, an exemplary nuclear powered internal engine area, and an exemplary onsite spent nuclear fuel refinery, according to an exemplary embodiment. The exemplary onsite spent nuclear fuel refinery may include, in one example embodiment, among other things, an exemplary storage facility, an exemplary reprocessing facility, and an exemplary fuel fabrication facility, according to an exemplary embodiment.

FIG. 21 depicts an exemplary nuclear reactor site diagram 3000 containing, in one example, nonlimiting, embodiment, an exemplary nuclear reactor area 3004, an exemplary nuclear powered internal engine area 3006, and an exemplary onsite spent nuclear fuel refinery 3008. The onsite spent nuclear fuel (SNF) refinery 3008 may include, according to one exemplary embodiment, an exemplary storage facility 3010, an exemplary reprocessing facility 3012, and an exemplary fuel fabrication facility 3014.

The exemplary nuclear reactor site boundary 3002 is an exemplary physical boundary of an example geographic zone including, in one example non-limiting embodiment, an exemplary nuclear reactor (not shown or labeled), the periphery of which is typically externally marked by example fences or other appropriate external security barriers and containment. Within the exemplary nuclear reactor site boundary 3002 there may include, in an exemplary embodiment, an exemplary area 3004 with an exemplary nuclear reactor (not shown or labeled) and other support buildings (not shown or labeled 0, such as, e.g., but not limited to, an exemplary spent nuclear fuel (SNF) water pool and/or an exemplary dry cask storage areas (not shown or labeled). Within the exemplary nuclear reactor site boundary 3002 there may include, in an exemplary embodiment, an exemplary nuclear powered internal engine area 3006.

The exemplary onsite SNF refinery 3008 is within the exemplary nuclear reactor site boundary 3002 and may contain a storage facility 3010, according to an exemplary embodiment. An exemplary storage facility 3010 is intended to safely store and monitor SNF from the exemplary nuclear reactor area 3004 or other n exemplary radioactive material from outside the exemplary nuclear reactor site boundary 3002, such as, e.g., but not limited to from other exemplary nuclear reactor sites, and/or from medical processes, and/or industrial processes, and/or military processes, etc. An example, according to one exemplary embodiment, of an exemplary storage facility 3010 can include, e.g., but not limited to, any independent spent fuel storage installation (ISFSI) as defined by the US Nuclear Regulatory Commission (NRC).

The exemplary onsite SNF refinery 3008 may include, in an exemplary embodiment, an exemplary reprocessing facility 3012. An exemplary reprocessing facility 3012 can separate SNF, and/or other radioactive material, etc., into an exemplary stream of nuclear material that may be recycled into new nuclear fuel (and/or nanofuel, according to one exemplary embodiment) and/or other material streams that may, or may not, have additional uses, etc. An example of an exemplary separation technique is the UREX (URanium EXtraction) process, according to one exemplary embodiment.

The exemplary onsite SNF refinery 3008 may contain a fuel fabrication facility 3014. An exemplary fuel fabrication facility 3014 can take exemplary nuclear material and can create nuclear fuel (and/or nanofuel, according to an exemplary embodiment) for use in an exemplary nuclear reactor. An example of an exemplary fuel fabrication facility 3014 can include, e.g., but not limited to, according to one exemplary embodiment, creating exemplary nuclear fuel for use in a nuclear powered internal engine using chemical processes, such as, e.g., but not limited to, fluorinating an exemplary tetrafluoride transuranic stream from UREX processing and/or mixing the product with molecular hydrogen, according to one exemplary embodiment.

To illustrate the functionality of an exemplary onsite SNF refinery 3008, consider an exemplary nuclear reactor site boundary 3002 that can encompass an exemplary light-water reactor (LWR) in an exemplary area 3004 for the exemplary purpose of, e.g., but not limited to, generating exemplary base load electricity, according to one exemplary embodiment. According to one exemplary embodiment, a common commercial nuclear power plant configuration, can be used, according to one exemplary embodiment. According to one exemplary embodiment, et the exemplary onsite SNF refinery 3008 can reside within the exemplary nuclear reactor site boundary 3002 and can further contain, according to one exemplary embodiment, an exemplary storage facility 3010, an exemplary reprocessing facility 3012, and/or an exemplary fuel fabrication facility 3014, according to one exemplary embodiment. Also, according to one exemplary embodiment, the exemplary nuclear reactor site boundary 3002 can encompass an exemplary nuclear powered rotary internal engine, according to an exemplary embodiment, in an exemplary area 3006 for the exemplary, but nonlimiting purpose of generating peak load electricity, according to one exemplary embodiment.

In this illustration, the exemplary onsite SNF refinery 3008, according to one exemplary embodiment, can create nuclear fuel (such as, e.g., nanofuel according to an exemplary embodiment, etc.) for use in the exemplary nuclear powered rotary internal engine in area 3006, created from exemplary SNF in area 3004, and/or other radioactive material, etc., according to one exemplary embodiment. The exemplary nuclear powered rotary internal engine, according to one exemplary embodiment, in the exemplary area 3006 can produce, e.g., but not limited to, electricity and can, e.g., but not limited to, reduce the long-lived radioactive material from SNF, according to one exemplary embodiment. This can effectively create, according to one exemplary embodiment, an exemplary back end to the exemplary nuclear fuel cycle that can be contained within the exemplary nuclear reactor site boundary 3002, according to one exemplary embodiment, and may be referred to as, e.g., but not limited to, a "local back end" to the exemplary nuclear fuel cycle, according to one exemplary embodiment.

The exemplary front end to the exemplary nuclear fuel cycle can include, e.g., but not limited to, an exemplary series of industrial processes (such as, e.g., but not limited to, mining, milling, enrichment, and/or fuel fabrication, etc.) that can create an exemplary nuclear fuel (and/or nanofuel according to an exemplary embodiment) for use in nuclear reactors, according to one exemplary embodiment. In LWRs, exemplary nuclear fuel is typically used for about 18-36 months, according to one exemplary embodiment, it is then removed and stored in an exemplary water pool and dry cask storage areas, according to one exemplary embodiment, and it is subsequently referred to as SNF, according to one exemplary embodiment.

An exemplary local back end to the exemplary nuclear fuel cycle, according to one exemplary embodiment, may start by moving SNF from exemplary area 3004 to the storage facility 3010. The exemplary storage facility 3010 may include exemplary SNF handling and/or monitoring capabilities, according to one exemplary embodiment, such as, e.g., but not limited to, equipment for performing cask leak testing, which can decrease the potential safety risk to the environment and the public, according to one exemplary embodiment.

In the United States, the exemplary act of moving exemplary SNF from exemplary area 3004 to the exemplary storage facility 3010 and transferring ownership from the current owner abolishs the US Department of Energy (DOE) Contract for Disposal of Spent Nuclear Fuel and/or High-level Radioactive Waste (the "Standard Contract") breach for this instance, according to one exemplary embodiment. According to the Blue Ribbon Commission on America's Nuclear Future, the Federal government's failure to take possession of nuclear waste from the current owners by 2020 is expected to cost US taxpayers in excess of $20.8 billion.

Next, exemplary SNF may be moved from the exemplary storage facility 3010 to the exemplary reprocessing facility 3012, according to one exemplary embodiment. The exemplary reprocessing facility 3012 may reprocess exemplary SNF using the exemplary proliferation resistant UREX+1 a process to separate the exemplary transuranic elements, which are the primary long-term dose rate contributors in nuclear waste, into an exemplary single product stream, according to one exemplary embodiment.

Then the exemplary transuranic elements, which include nuclear material, may be moved from the exemplary reprocessing facility 3012 to the exemplary fuel fabrication facility 3014, according to one exemplary embodiment. The exemplary fuel fabrication facility 3014 may create exemplary nuclear fuel (such as, e.g., but not limited to, exemplary nanofuel, according to one exemplary embodiment) for use in the exemplary nuclear powered rotary internal engine, or other exemplary nuclear powered internal engine, in exemplary area 3006, according to one exemplary embodiment.

Next, the exemplary nuclear fuel for use in the exemplary nuclear powered rotary internal engine, according to one exemplary embodiment, may be moved from the exemplary onsite SNF refinery 3008 to the exemplary nuclear powered rotary internal engine in exemplary area 3006, according to one exemplary embodiment. As will be apparent to those skilled in the art, the exact location within a particular location is illustrated for purposes of description, and should not be considered limiting, unless so claimed. Exemplary Nuclear fuel, according to one exemplary embodiment, can be used in the exemplary nuclear powered rotary internal engine, according to one exemplary embodiment, until the exemplary nuclear fuel is completely consumed, which is about one million cycles per engine core mass M loading, according to one exemplary embodiment. The exemplary nuclear powered rotary internal engine, or exemplary nuclear powered internal engine, will, e.g., but not limited to, produce electricity and reduce the volume and radiotoxicity of the nuclear waste from the exemplary commercial LWR nuclear power plant in exemplary area 3004, according to one exemplary embodiment.

Exemplary byproducts from the exemplary nuclear powered rotary internal engine in exemplary area 3006 can include, e.g., but not limited to, the exemplary radioactive isotopes cesium isotope 137 ($^{137}$Cs) and strontium isotope 90 ($^{90}$Sr), according to one exemplary embodiment. These exemplary byproducts are valuable and may be used in exemplary industrial (e.g., but not limited to, radioisotope thermoelectric generators, according to one exemplary embodiment) and the exemplary health care (e.g., blood irradiators, according to one exemplary embodiment) industries. These exemplary byproducts may be moved to the exemplary storage facility 3010 for exemplary safekeeping before sale, according to one exemplary embodiment.

In this illustration, according to one exemplary embodiment, the two exemplary nuclear power plants can create a load following power generation station, according to one exemplary embodiment. The exemplary LWR power plant can be used in generating base load electricity and, according to one exemplary embodiment, the exemplary nuclear powered rotary internal engine power plant may adjust its electric power production, according to one exemplary embodiment, to match the fluctuation in electricity demand throughout the day, according to one exemplary embodiment. In alternative configurations, an exemplary nuclear powered internal engine may be used to produce energy in other energy sectors, according to one exemplary embodiment, such as, e.g., but not limited to, for transportation, and/or industrial processes, and/or commercial and/or residential use, etc.

Unlike exemplary centralized reprocessing facilities, according to one exemplary embodiment, that are designed to accommodate SNF from dozens of nuclear reactors, the exemplary onsite SNF refinery 3008 throughput requirements can be set by the rate of exemplary nuclear powered rotary internal engine fuel consumption, according to one exemplary embodiment. In other words, the exemplary onsite SNF refinery 3008 may require only approximately 1% of the throughput requirements of an exemplary centralized reprocessing facility, according to one exemplary embodiment. This can enable the advantages of small modular manufacturing methods, according to one exemplary embodiment, such as, e.g., but not limited to, exemplary factory fabrication and exemplary rapid onsite assembly, to be applied to an exemplary SNF refinery, according to one exemplary embodiment. It seems appropriate to introduce the phrase "small modular refinery (SMR)" and refer to such an exemplary onsite SNF refinery 3008 as an exemplary SNF SMR, replacing the more common definition of small modular reactor for SMR, according to one exemplary embodiment.

Returning to a more general exemplary configuration, according to one exemplary embodiment, an exemplary onsite SNF refinery 3008 can be coupled with an exemplary nuclear powered internal engine for, for example, but not limited to, exemplary generating electricity in exemplary area 3006 extending, according to one exemplary embodiment the exemplary lifetime of an exemplary existing nuclear power generating station contained within the exemplary nuclear reactor site boundary 3002, according to one exemplary embodiment. For aging nuclear power generating stations that have a surplus of SNF, this exemplary approach can provide a means to generate revenue through, e.g., but not limited to, the sale of nuclear power beyond the expiration date of the nuclear reactors contained in exemplary area 3004, according to one exemplary embodiment.

For any exemplary new nuclear power generation stations that can intend to use any exemplary external engine type of an exemplary nuclear reactor, exemplary nuclear waste containing long-lived radioactive material will be created, according to one exemplary embodiment. This local back end to the nuclear fuel cycle eliminates the long-lived radioactive material in the nuclear waste and can generate revenue through the sale of clean energy in any energy sector, according to one exemplary embodiment.

Exemplary Nuclear Powered Internal Engine Housing Design Elements

Figure 22:
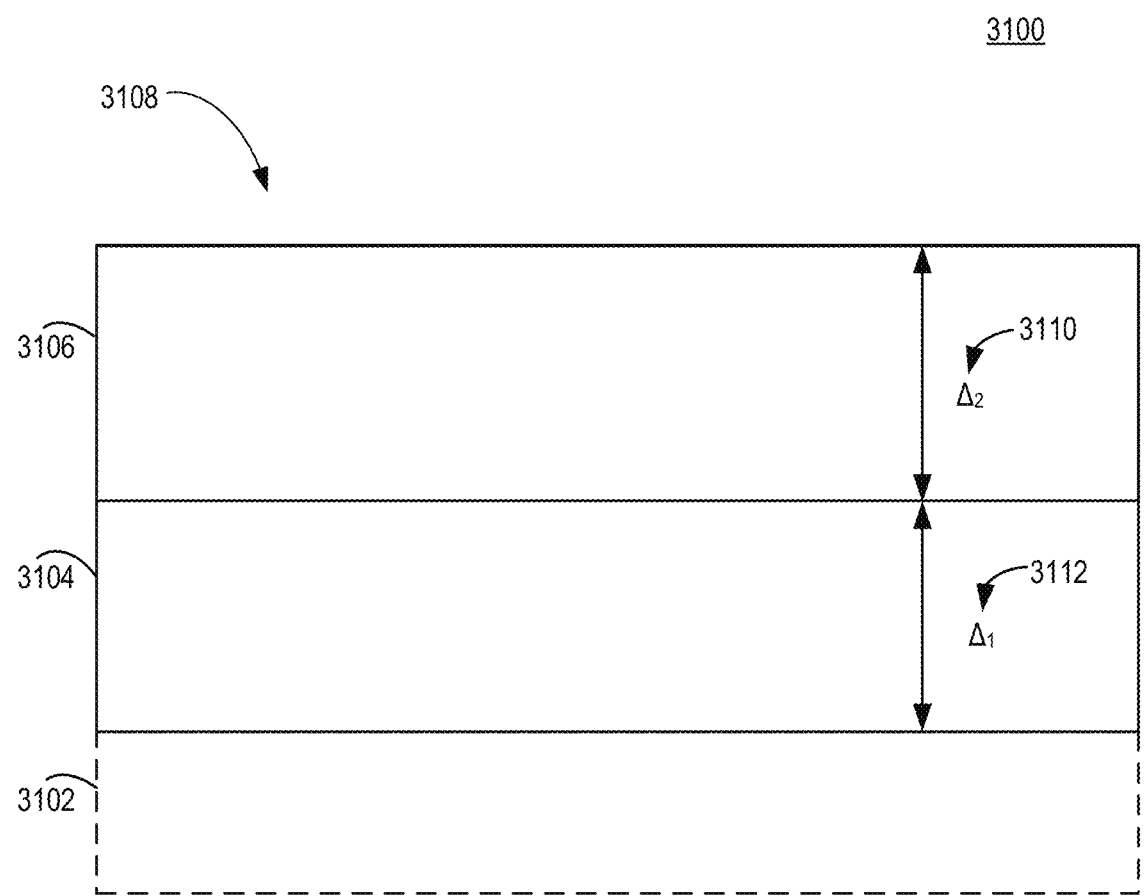
FIG. 22 depicts a nuclear powered internal engine housing constructed using multiple layers, according to an exemplary embodiment.

FIG. 22 depicts an exemplary nuclear powered internal engine housing constructed using multiple layers in diagram 3100, according to one exemplary embodiment.

The exemplary nuclear powered internal engine housing can include the exemplary material surrounding the exemplary engine core 3102, according to one exemplary embodiment. When the exemplary engine is in the top dead center (TDC) position the exemplary housing can act as an exemplary neutron reflector, which can effectively reduce exemplary neutron leakage from the exemplary engine core 3102, and the exemplary nuclear material properties can be important, according to one exemplary embodiment. Pertinent nuclear material properties can include, e.g., but not limited to, the Fermi age, or the age to thermalization, and/or the thermal neutron diffusion length, according to one exemplary embodiment. The housing also acts to mechanically confine the engine core 3102 pressure, and the mechanical material properties are important. Pertinent mechanical material properties include the yield stress and Young modulus.

The exemplary housing, according to one exemplary embodiment, may be constructed in exemplary layers, according to one exemplary embodiment, including an inner layer 3104, which can be adjacent to the exemplary engine core 3102, and one, or more, additional outer layers 3106, according to one exemplary embodiment. The exemplary outer layers 3106, according to one exemplary embodiment, may be the same material as the inner layer 3104, according to one exemplary embodiment. Exemplary possible reasons for, e.g., but not limited to, designing an exemplary multi-layered housing can include, e.g., but not limited to, reducing cost, improving structural integrity, providing manufacturing alternatives, and/or adding functionality, etc.

For reference, consider an exemplary housing including an example 30 cm thick beryllium (Be) layer 3104, and an exemplary vacuum layer 3106, according to one exemplary embodiment. This exemplary housing can provide for an exemplary conservative nuclear powered internal engine performance design by, e.g., but not limited to, allowing neutrons to escape in the exemplary vacuum layer 3106, and/or by providing no additional structural integrity, according to one exemplary embodiment.

Reducing the cost of the exemplary housing (which can include one or more layers of material, collectively 3108) of the exemplary engine, according to one exemplary embodiment, may be obtained by using a less expensive material in one (or more) of the exemplary plurality of layers, according to one exemplary embodiment. As an exemplary alternative housing, according to one exemplary embodiment, since the exemplary graphite price per unit mass is about 700 times less than beryllium (Be), according to one exemplary embodiment, consider an exemplary 20 cm thick (exemplary thickness 3112) $\square_1$ Be layer 3104 and an exemplary 40 cm thick (exemplary thickness 3110) $\square_2$ graphite layer 3106, according to one exemplary embodiment. The exemplary 10 cm reduction in the Be layer 3104, according to one exemplary embodiment, compared to the exemplary reference housing, amounts to an exemplary 10% decrease in the number of exemplary thermal neutrons entering the exemplary engine core 3102 (such as, e.g., but not limited to, from 59.1% to 49.1%) and an exemplary 33% decrease in the exemplary Be layer 3104 material cost, according to one exemplary embodiment. Since an exemplary 40 cm thick $\square_1$ graphite layer 3104 would reflect an exemplary 42.2% of the fission neutrons escaping the exemplary engine core 3102, the exemplary graphite layer 3106 can compensate for the exemplary reduced nuclear performance of the exemplary thinner Be inner layer 3104, according to one exemplary embodiment.

Improving the exemplary structural integrity of the exemplary housing, according to one exemplary embodiment may be obtained by increasing the exemplary mass of the exemplary, one or more, outer layer(s) 3106, according to one exemplary embodiment. As an exemplary alternative housing, consider an exemplary 30 cm thick $\square_1$ Be layer 3104, and an exemplary 2.54 cm thick (exemplary thickness 3110) $\square_2$ lead (Pb) layer 3106, according to one exemplary embodiment. The exemplary Pb layer 3106 can increase the exemplary pressure acting on the exemplary outer surface of the exemplary Be layer 3104, which can reduce the stress at the exemplary inner surface of the exemplary Be layer 3104 and can allow for an exemplary increase in engine core 3102 pressure, according to one exemplary embodiment. Exemplary Pb has the added nuclear benefit of providing excellent radiation protection, according to one exemplary embodiment.

Providing exemplary manufacturing alternatives of the exemplary housing may include, e.g., but not limited to, making smaller parts and/or by varying the tolerances among the exemplary layers, according to one exemplary embodiment. Exemplary part sizes may simply exceed exemplary machine limits or the exemplary material may not be available in the exemplary required size, either of which can require the exemplary fabrication of exemplary smaller parts, according to one exemplary embodiment. Although the exemplary surface finish in the exemplary inner layer 3104 can be high, according to one exemplary embodiment, such requirements, according to one exemplary embodiment are not necessary on the exemplary outer layers 3106, according to one exemplary embodiment. Moving to exemplary lower tolerances can reduce exemplary manufacturing costs, according to one exemplary embodiment.

Adding functionality may be obtained with an exemplary outer layer 3106, according to one exemplary embodiment. For example, using an exemplary acoustic panel, or other exemplary noise controlling material, in the exemplary outer layer 3106 can reduce the exemplary sound of the exemplary nuclear powered internal engine, according to one exemplary embodiment.

Figure 23:
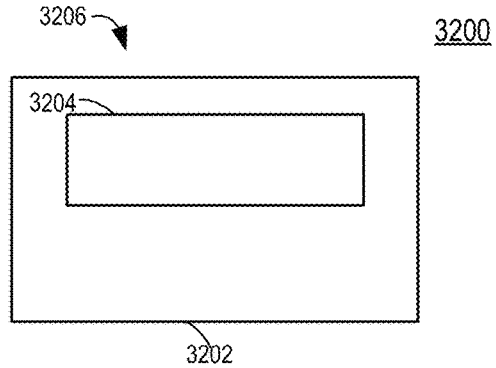
FIG. 23 depicts a nuclear powered internal engine housing containing an internal channel, according to an exemplary embodiment.

FIG. 23 depicts an exemplary nuclear powered internal engine housing layer 3202 containing an exemplary internal channel 3204 in exemplary diagram 3200, according to one exemplary embodiment. In one exemplary embodiment, layer 3202 can be also referred to as part of an engine housing 3206 and can include one, or more than one, layers 3108 as illustrated above.

The exemplary housing may be constructed with an exemplary layer 3202 containing, according to an exemplary embodiment, an exemplary internal channel 3204, according to one exemplary embodiment. The exemplary internal channel 3204 may be introduced in any direction, can be of any exemplary shape or shapes, can be circular, oval, square, rectangular, or other polygonal, regular, and/or irregular cross-section, according to one exemplary embodiment. Exemplary possible reasons for introducing an exemplary internal channel 3204, according to one exemplary embodiment, can include, e.g., but not limited to, reducing cost, providing cooling and/or lubrication, and/or introducing diagnostics and/or other instrumentation, etc., according to one exemplary embodiment.

For an exemplary neutron reflector layer 3202, according to one exemplary embodiment, one, or more, of several exemplary material(s), according to one exemplary embodiments, when introduced into the exemplary internal channel 3204, can be included and used to, e.g., but not limited to, reduce cost and/or improve performance of the exemplary nuclear powered internal engine, according to one exemplary embodiment. Such exemplary materials can include, e.g., but not limited to, exemplary molecular hydrogen ($H_2$), exemplary helium (He), exemplary light water ($H_2O$), exemplary heavy water ($D_2O$), and/or exemplary carbon dioxide ($CO_2$), according to one exemplary embodiment. These exemplary materials, according to one exemplary embodiment can have an exemplary low atomic mass number and serve as an exemplary neutron moderator, according to one exemplary embodiment. They also have an exemplary high specific heat and thermal conductivity and serve as an exemplary coolant for reducing the exemplary temperature of the exemplary layer 3202, according to one exemplary embodiment. For an exemplary Be neutron reflector 3202, reducing the exemplary temperature can increase the yield stress and can allow higher operating pressures, according to one exemplary embodiment.

The exemplary internal channel 3204, according to one exemplary embodiment, may be used for lubrication, according to one exemplary embodiment. In particular, exemplary fluorolube oils can have exemplary favorable nuclear and/or mechanical properties, according to one exemplary embodiment.

The exemplary internal channel 3204 may be used for exemplary diagnostics and/or other instrumentation, according to one exemplary embodiment. The exemplary internal channel 3204, according to one exemplary embodiment, may contain exemplary sensors to provide feedback on exemplary nuclear powered internal engine performance, according to one exemplary embodiment. The exemplary internal channel 3204 may also be used to enable exemplary visual inspections, such as, e.g., but not limited to, by using a scope, and/or cleaning of exemplary engine components, according to one exemplary embodiment.

Figure 24:
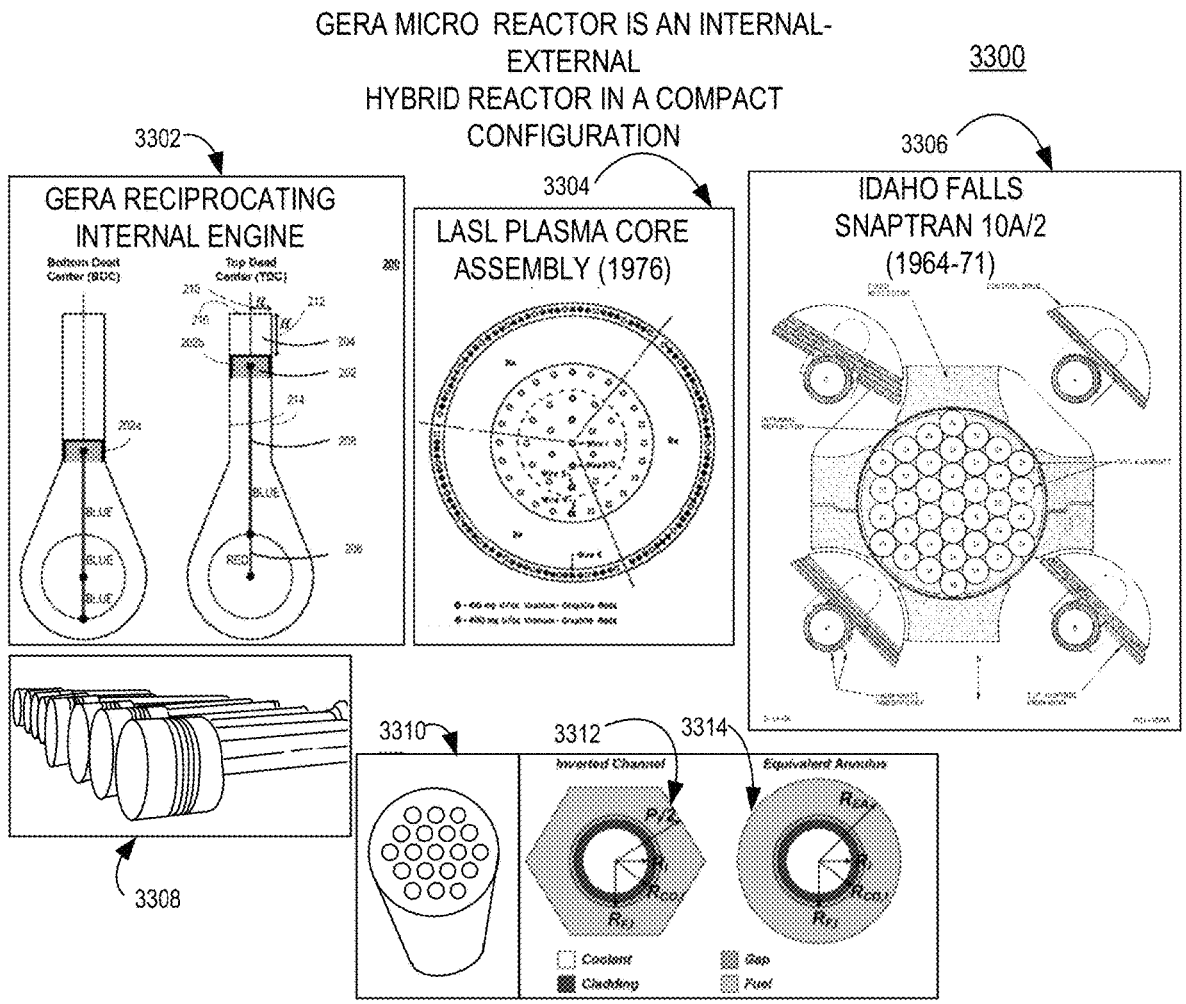
FIG. 24 depicts a GERA Microreactor, which according to an exemplary embodiment, integrates an exemplary reciprocating internal engine design with one or more exemplary cavity reactor designs that use solid fuel, according to an exemplary embodiment.

FIG. 24 depicts a GERA Microreactor, which according to an exemplary embodiment, integrates an exemplary reciprocating internal engine design with one or more exemplary cavity reactor designs that use solid fuel, according to an exemplary embodiment. According to one exemplary embodiment a LASL Plasma Core Assembly can include an exemplary Beryllium (Be) reflector, surrounded by exemplary solid fuel rods, according to an exemplary embodiment. The exemplary solid fuel could be an exemplary rod, or an exemplary inverted design, as shown below the exemplary LASL cross section, according to an exemplary embodiment. There can also include some exemplary fuel rods on the interior, which could be included in the TDC cavity space, according to an exemplary embodiment. Exemplary embodiments can significantly reduce a required size of the exemplary hybrid reactor, as compared to conventional reactors and can increase an exemplary operation lifetime to something like approximately 30 years, or more, according to an exemplary embodiment. For exemplary military applications a hybrid reactor can have special benefits, including, e.g., obtaining a substantial amount of power in an exemplary relatively small transportable box, according to an exemplary embodiment. Exemplary embodiments can include an exemplary cooling system and/or exemplary reactivity control for exemplary solid fuel, according to an exemplary embodiment. Exemplary control drums can include, e.g., but not limited to, exemplary control drums used on exemplary SNAP (Systems for Nuclear, Auxiliary Power) apparatus, according to an exemplary embodiment. According to one exemplary embodiment, an exemplary Russian reactor, commonly referred to as IBR, to those skilled in the relevant art, and can include, according to an exemplary embodiment, exemplary continuously rotating drums that can produce an exemplary burst of energy, which, according to an exemplary embodiment, could be used to supplement dynamic criticality, according to an exemplary embodiment.

Exemplary Embodiment Language

An exemplary nanofuel engine apparatus comprising:
an internal engine configured to
receive a nanofuel that releases nuclear energy; and
receive the nanofuel internal to said internal engine.

The nanofuel engine apparatus, wherein the nanofuel comprises: a moderator, a molecule with dimensions on a nanometer scale, and a molecular mixture.

The nanofuel engine apparatus, wherein said internal engine further comprises: a reflector.

The nanofuel engine apparatus can include, comprising said reflector, wherein said reflector thickness is less than or equal to 60 cm beryllium (Be).

The nanofuel engine apparatus can include, further comprising at least one of:
an alternator; a flywheel; a generator; a propeller; a shaft; or a wheel.

The nanofuel engine apparatus can include, wherein said internal engine is configured to generate heat, and further comprising a system configured to use said heat.

The nanofuel engine apparatus can include, wherein said system adapted to use heat comprises at least one of: a radiation effects simulator; or a medical therapeutic apparatus.

The nanofuel engine apparatus can include, wherein said internal engine further comprises at least one of: an external ignition source; or an internal ignition source.

The nanofuel engine apparatus can include, wherein said internal engine comprises said external ignition source, and wherein said external ignition source comprises at least one of: a fusion neutron source; or a radioactive material that emits neutrons.

The nanofuel engine apparatus can include, wherein said internal engine comprises said external ignition source, and wherein said external ignition source comprises said fusion neutron source, and wherein said fusion neutron source comprises at least one of:
an accelerator-based neutron generator; or a Z-pinch-based neutron generator.

The nanofuel engine apparatus can include, wherein said internal engine comprises said external ignition source, and wherein said external ignition source comprises said radioactive material that emits neutrons, and wherein said radioactive material that emits neutrons comprises: californium isotope 252 (252Cf).

The nanofuel engine apparatus can include, wherein said internal engine comprises said internal ignition source, and wherein said internal ignition source comprises: a radioactive material that emits neutrons.

The nanofuel engine apparatus can include, wherein said internal engine comprises said internal ignition source, and wherein said internal ignition source comprises said radioactive material that emits neutrons, and wherein said radioactive material that emits neutrons comprises at least one of: a transuranic element; or a fission product.

The nanofuel engine apparatus can include, wherein said internal engine comprises at least one of: a reciprocating engine; a reciprocating piston engine; a rotary engine; or a wankel rotary engine.

The nanofuel engine apparatus can include, wherein the nanofuel comprises: a fissile fuel, wherein said fissile fuel comprises: a nuclide that undergoes neutron induced fission; a passive agent, wherein said passive agent comprises: a nuclide comprising a strong resonance neutron absorption cross-section in a low epithermal energy range; and a moderator, wherein said moderator comprises: a low atomic number element.

The nanofuel engine apparatus can include, wherein the nanofuel comprises said fissile fuel, wherein said fissile fuel comprises said nuclide that undergoes neutron induced fission, and wherein said nuclide that undergoes neutron induced fission comprises at least one of: plutonium isotope 239 (239Pu); uranium isotope 235 (235U); or uranium isotope 233 (233U).

The nanofuel engine apparatus can include, wherein the nanofuel comprises said passive agent, wherein said passive agent comprises said nuclide comprising said strong resonance neutron absorption cross-section in said low epithermal energy range, and wherein said nuclide comprising said strong resonance neutron absorption cross-section in said low epithermal energy range comprises: plutonium isotope 240 (240Pu) having said strong resonance neutron absorption cross-section near 1 eV.

The nanofuel engine apparatus can include, wherein the nanofuel comprises said moderator, wherein said moderator comprises: said low atomic number element, wherein said low atomic number element comprises at least one of: any of all elements having an atomic number (Z) less than 11 (Z<11); hydrogen (H); or helium (He).

The nanofuel engine apparatus can include, wherein said fissile fuel comprises at least one of: plutonium isotope 239 hexafluoride (239PuF6); or uranium isotope 235 dioxide (235UO2).

The nanofuel engine apparatus can include, wherein said passive agent comprises:

plutonium isotope 240 hexafluoride (240PuF6).

The nanofuel engine apparatus can include, wherein said moderator comprises at least one of: molecular hydrogen (H2); molecular deuterium (D2); or hydrogen fluoride (HF).

The nanofuel engine apparatus can include, wherein the nanofuel comprises: wherein said fissile fuel comprises: plutonium isotope 239 hexafluoride (239PuF6); wherein said passive agent comprises: plutonium isotope 240 hexafluoride (240PuF6); and wherein said moderator comprises: molecular hydrogen ($H_2$).

The nanofuel engine apparatus can include, wherein the nanofuel further comprises at least one of: a fertile fuel, wherein said fertile fuel comprises: a nuclide that undergoes neutron induced transmutation into a fissile nuclide; a transuranic element, wherein said transuranic element comprise: any of all elements with an atomic number Z greater than 92 (Z>92); or a fission product, wherein said fission product comprises: any of all fission reaction products.

The nanofuel engine apparatus can include, wherein the nanofuel comprises said fertile fuel, wherein said fertile fuel comprises said nuclide that undergoes neutron induced transmutation into said fissile nuclide; and wherein said nuclide comprises at least one of: uranium isotope 238 (238U); or thorium isotope 232 (232Th).

The nanofuel engine apparatus can include, wherein the nanofuel comprises said transuranic element, wherein said transuranic element comprises any of all elements with atomic number Z greater than 92 (Z>92); and wherein said transuranic element comprises: material considered by U.S. Atomic Energy Act of 1954 to be at least one of: high-level waste (HLW); or transuranic (TRU) waste.

The nanofuel engine apparatus can include, wherein the nanofuel further comprises: a fertile fuel, wherein said fertile fuel comprises at least one of: uranium isotope 238 (238U); an uranium isotope 238 hexafluoride (238UF6); uranium isotope 238 dioxide (238UO2); an uranium isotope 238 (238U) as part of a molecule; thorium isotope 232 (232Th); thorium isotope 232 dioxide (232ThO2); or thorium isotope 232 tetrafluoride (232ThF4).

The nanofuel engine apparatus can include, further comprising at least one of: a fuel cycle coupled to said internal combustion engine; a compressor coupled to said internal combustion engine; or a heat exchanger coupled to said internal combustion engine.

The nanofuel engine apparatus can include, further comprising: at least one filter to extract at least one material, said at least one filter coupled to said internal combustion engine.

The nanofuel engine apparatus can include, wherein said internal engine further comprises: a housing comprising a reflector; an intake in said housing of said internal engine; and an exhaust in said housing distanced apart from said intake of said housing of said internal engine.

The nanofuel engine apparatus can include, wherein said internal engine further comprises: at least one rotor; and a housing comprising an epitrochoid shape.

The nanofuel engine apparatus can include, wherein the nanofuel engine apparatus further comprises at least one of: at least one ceramic filter; at least one compressor; at least one filter;

at least one heat exchanger; at least one neutron source; at least one pump; at least one reprocessing plant; at least one separator; or at least one valve.

The nanofuel engine apparatus can include, wherein the nanofuel comprises at least one property comprising at least one of: wherein the nanofuel comprises approximately a million times an energy density of fossil fuels; wherein the nanofuel used in said internal combustion engine of the nanofuel engine apparatus, releases approximately one part in a million of a nanofuel energy content in said internal engine; or wherein the nanofuel used in said internal combustion engine of the nanofuel engine apparatus, releases a substantially equivalent amount of energy per fuel mass as compared to a conventional fossil fuel-based internal engine.

The nanofuel engine apparatus can include, wherein said reflector is at least on a portion of a housing near a top dead center (TDC) position.

The nanofuel engine apparatus can include, wherein said reflector comprises at least one of: beryllium (Be); beryllium oxide (BeO); graphite (C); heavy water (D2O); or water (H2O).

The nanofuel engine apparatus can include, wherein said internal engine comprises: a rotary engine.

The nanofuel engine apparatus can include, wherein said rotary engine comprises: a rotor; a rotor housing; a side housing; a rotor gear; and a stationary gear.

The nanofuel engine apparatus can include, wherein at least a portion of said rotor housing comprises a reflector.

The nanofuel engine apparatus can include, wherein at least a portion of said rotor comprises a reflector.

The nanofuel engine apparatus can include, wherein said rotary engine is adapted to allow partial or full separation of an intake and an exhaust port.

The nanofuel engine apparatus can include, wherein the nanofuel comprises: a fissile fuel, wherein said fissile fuel comprises: a nuclide that undergoes neutron induced fission; a passive agent, wherein said passive agent comprises: a nuclide comprising a strong resonance neutron absorption cross-section in a low epithermal energy range; a moderator, wherein said moderator comprises: a low atomic number element; and a fission product, wherein said fission product comprises: any of all fission reaction products.

The nanofuel engine apparatus can include, wherein the nanofuel further comprises at least one of: a fertile fuel, wherein said fertile fuel comprises: a nuclide that undergoes neutron induced transmutation into a fissile nuclide; or a transuranic element, wherein said transuranic element comprise: any of all elements with an atomic number Z greater than 92 (Z>92).

The nanofuel engine apparatus can include, wherein said internal engine is configured to at least one of: a) operate in a spark ignition mode that uses a neutron source external to the nanofuel to inject neutrons into the nanofuel; or b) operate in a compression ignition mode that creates neutrons in the nanofuel.

The nanofuel engine apparatus can include, wherein said internal engine of said (a) is configured to operate in said spark ignition mode that uses said neutron source external to the nanofuel to inject neutrons into the nanofuel, and said internal engine is further adapted to at least one of: i) use a fusion neutron source; or ii) use a radioactive material that emits neutrons.

The nanofuel engine apparatus can include, wherein said internal engine of said (a) (i) is configured to use said fusion neutron source to operate said internal engine in said spark ignition mode that uses said neutron source external to the nanofuel to inject neutrons into the nanofuel comprises said internal combustion engine adapted to at least one of: use an accelerator-based neutron generator; or use a Z-pinch-based neutron generator.

The nanofuel engine apparatus can include, wherein said internal engine of said (a) (ii) is configured to use said radioactive material that emits neutrons to operate said internal combustion engine in said spark ignition mode that uses said neutron source external to the nanofuel to inject neutrons into the nanofuel comprises said internal combustion engine adapted to: use californium isotope 252 (252Cf).

The nanofuel engine apparatus can include, wherein said internal combustion engine of said (b) is configured to operate in said compression ignition mode that creates neutrons in the nanofuel, is further configured to use a radioactive material that emits neutrons, wherein said internal engine is configured to at least one of: use neutrons emitted from a fission product; or use neutrons emitted from a transuranic element.

The nanofuel engine apparatus can include, wherein said internal engine comprises at least one of: a reciprocating engine geometry; or a rotary engine geometry; wherein said internal engine is adapted to compress the nanofuel; wherein said internal engine contains a mass of the nanofuel internal to said internal engine that is confined in an engine core that changes with compression; and wherein said internal engine comprises a criticality that changes with said engine core.

The nanofuel engine apparatus can include, further comprising: a nanofuel.

The nanofuel engine apparatus can include, further comprising: wherein said criticality comprises: $B_m^2 = B_g^2$, wherein Bm comprises a material buckling of said engine core, and wherein Bg comprises a geometric buckling of said engine core.

The nanofuel engine apparatus can include, further comprising:
wherein said internal engine comprises said rotary engine geometry, and further comprises: a housing comprising a shape comprising at least one of: a substantially oval shape; or an epitrochoid.

The nanofuel engine apparatus can include, further comprising: wherein said internal engine comprises said rotary engine geometry, and further comprises: a housing; and a rotor, wherein at least a portion of said rotor contains a cavity.

The nanofuel engine apparatus can include, wherein said cavity comprises at least one of: an arbitrary shape; a cylindrical shape; an ellipsoidal shape; a rectangular shape; or a spherical shape.

The nanofuel engine apparatus can include, wherein at least one of: said housing, or said rotor, comprises a reflector.

The nanofuel engine apparatus can include, wherein at least a portion of at least one of: said housing, or said rotor, does not comprise a reflector.

The nanofuel engine apparatus can include, further comprising: a reflector.

The nanofuel engine apparatus can include, wherein said reflector is chosen from at least one of: a material, or a dimension, to provide a structural integrity.

The nanofuel engine apparatus can include, further comprising:
a safety feature comprising at least one of: a nanofuel negative temperature coefficient of reactivity; or said criticality that changes with said engine core.

The nanofuel engine apparatus can include, wherein said internal engine comprises said reciprocating engine geometry, wherein said engine core has a cylindrical shape comprising a cylinder radius R and a cylinder height H, and wherein said criticality comprises:

$$\frac{k_\infty - 1}{L^2} = \left(\frac{v_0}{\widetilde{R}_c}\right)^2 + \left(\frac{\pi}{\widetilde{H}_c}\right)^2,$$

wherein L comprises a neutron diffusion length, wherein $k_\infty$ comprises an infinite medium multiplication factor, wherein $v_0$ and $\pi$ comprise known constants, wherein $\widetilde{R}_c$ comprises an extrapolated critical radius of said engine core, and wherein $\widetilde{H}_c$ comprises an extrapolated critical height of said engine core.

The nanofuel engine apparatus can include, wherein said internal engine is further adapted to: release energy until said engine core gets too large,
wherein said engine core gets too large means said reciprocating engine geometry comprises said cylinder radius R less than a critical radius Rc (R<Rc) wherein said critical radius Rc of said engine core for said reciprocating engine geometry comprises:

$$R_c = \frac{v_0}{r}\left\{\frac{k_\infty - 1}{L_1^2} - \frac{\pi^2}{(H_1 + 2dr)^2}\right\}^{-1/2} - d,$$

wherein r is a compression ratio, wherein d is an extrapolation distance, and wherein a subscript one (1) represents an inlet property.

The nanofuel engine apparatus can include, wherein performance of said internal engine is improved by decreasing an engine core surface to volume ratio, wherein said engine core surface to volume ratio is proportional to a neutron leakage.

The nanofuel engine apparatus can include, wherein said internal engine comprises a reciprocating engine geometry, wherein said reciprocating engine geometry has an engine core, wherein said engine core has a cylindrical shape comprising a cylinder radius R and a cylinder height H, wherein when said internal engine is in a top dead center (TDC) position comprises said engine core comprising at least one of about H=2R, or reduces neutron leakage, and wherein a critical radius Rc of said engine core is between 30 cm and 70 cm, wherein said critical radius Rc is inversely proportional to a compression ratio r (Rc~1/r), and wherein the nanofuel engine apparatus is supercritical when said cylinder radius is greater than said critical radius (R>Rc).

The nanofuel engine apparatus can include, wherein to regulate performance, a combustion duration is controlled by at least one of: variation of the nanofuel; variation of an inlet nanofuel state; or variation of a compression ratio r.

The nanofuel engine apparatus can include, further comprising a closed thermodynamic fuel cycle that continuously recycles the nanofuel.

The nanofuel engine apparatus can include, wherein at least one of an engine speed or a compression ratio r, are adjusted to ensure a peak nanofuel pressure occurs when said internal combustion engine is near a top dead center (TDC) position.

The nanofuel engine apparatus can include, wherein for a nanofuel density of ρ=0.02 g/cm3, the nanofuel comprises: an infinite medium neutron multiplication factor (k∞) of about 1.4; a neutron population exponential growth factor (α) of about 3,000 gen/s; a negative temperature coefficient of reactivity ($\alpha_T < 0$ 1/K); and a criticality transition near a nanofuel temperature (T) of about 4,000 K.

The nanofuel engine apparatus can include, wherein the nanofuel comprises a tetrafluoride mixture comprising at least one of: neptunium tetrafluoride ($NpF_4$); plutonium tetrafluoride ($PuF_4$); or americium tetrafluoride ($AmF_4$).

The nanofuel engine apparatus can include, wherein the tetrafluoride mixture is loaded into a fluorination reactor, wherein said fluorination reactor is adapted to convert at least one of the neptunium tetrafluoride ($NpF_4$) or the plutonium tetrafluoride ($PuF_4$) into hexafluoride molecules.

The nanofuel engine apparatus can include, herein particulates of the americium tetrafluoride ($AmF_4$) are dispersed within a gaseous hexafluoride medium of the hexafluoride molecules forming an aerosol.

The nanofuel engine apparatus can include, wherein said aerosol is mixed with a moderator.

The nanofuel engine apparatus can include, wherein the nanofuel comprises light water reactor (LWR) spent nuclear fuel (SNF).

The nanofuel engine apparatus can include, wherein the nanofuel engine apparatus comprises at least one of: acts as a radioactive nuclear waste burner; releases less energy per mass of the nanofuel with said LWR SNF as compared to the nanofuel without said LWR SNF, for the nanofuel with a substantially equivalent composition; or requires a larger volume to release a substantially equivalent amount of energy using the nanofuel with said LWR SNF as compared to the nanofuel without said LWR SNF, for the nanofuel with a substantially equivalent composition.

The nanofuel engine apparatus can include, having a property comprising: a plurality of safety modes comprising: a) wherein when the nanofuel gets too hot, the nanofuel stops producing energy due to a negative temperature coefficient of reactivity; and b) wherein when an engine core gets too large, the nanofuel stops producing energy due to a criticality that changes with said engine core.

An exemplary chemical composition chemical composition comprising: a nanofuel comprising: a fissile fuel comprising: a nuclide that undergoes neutron induced fission; a passive agent comprising: a nuclide with a strong resonance neutron absorption cross-section in a low epithermal energy range; and a moderator comprising: a low atomic number element.

An exemplary chemical composition wherein said fissile fuel comprises at least one of: plutonium isotope 239 (239Pu); uranium isotope 235 (235U); uranium isotope 233 (233U); plutonium isotope 239 hexafluoride (239PuF6); or uranium isotope 235 dioxide (235UO2).

An exemplary chemical composition wherein said passive agent comprises at least one of: plutonium isotope 240 (240Pu); or plutonium isotope 240 hexafluoride (240PuF6).

An exemplary chemical composition said moderator comprises at least one of: any of all elements having an atomic number Z less than 11 (Z<11); hydrogen (H); molecular hydrogen (H2); molecular deuterium (D2); hydrogen fluoride (HF); or helium (He).

An exemplary chemical composition, wherein said nanofuel comprises: wherein said fissile fuel comprises: plutonium isotope 239 hexafluoride (239PuF6); wherein said passive agent comprises: plutonium isotope 240 hexafluoride (240PuF6); and wherein said moderator comprises: molecular hydrogen (H2).

An exemplary chemical composition wherein said nanofuel further comprises at least one of: a fertile fuel comprising: a nuclide that undergoes neutron induced transmutation into a fissile nuclide; a transuranic element comprising: any of all elements with an atomic number Z greater than 92 (Z>92); or a fission product comprising: any of all fission reaction products.

An exemplary chemical composition further comprising said fertile fuel, wherein said fertile fuel comprises at least one of: uranium isotope 238 (238U); uranium isotope 238 hexafluoride (238UF6); uranium isotope 238 dioxide (238UO2); uranium isotope 238 (238U) as part of a molecule; thorium isotope 232 (232Th); thorium isotope 232 dioxide (232ThO2); or thorium isotope 232 tetrafluoride (232ThF4).

An exemplary chemical composition, further comprising said transuranic element, wherein said transuranic element comprises: material considered by U.S. Atomic Energy Act of 1954 to be at least one of: high-level waste (HLW); or transuranic (TRU) waste.

An exemplary chemical composition wherein said nanofuel comprises an infinite medium neutron multiplication factor ($k_\infty$) greater than one ($k_\infty > 1$).

An exemplary chemical composition wherein said nanofuel comprises a neutron population exponential growth factor (α) greater than zero generations per second (gen/s) (α>0 gen/s).

An exemplary chemical composition, wherein said nanofuel comprises a supercritical state, wherein said supercritical state comprises: an infinite medium neutron multiplication factor ($k_\infty$) greater than one ($k_\infty > 1$); and a neutron population exponential growth factor (α) greater than zero generations per second (α>0 gen/s).

An exemplary chemical composition wherein said nanofuel comprises said supercritical state, wherein said $k_\infty$ is greater than or equal to 1.2, and said $k_\infty$ is less than or equal to 1.7, and said alpha (α) is greater than or equal to 1,000 gen/s, and said alpha (α) is less than or equal to 9,000 gen/s.

An exemplary chemical composition wherein a neutron population increases by approximately 10 orders of magnitude in approximately 10 ms, when said a is around 2,000 gen/s.

An exemplary chemical composition wherein said nanofuel comprises a temperature coefficient of reactivity (αT) that is less than zero in units of inverse Kelvin (αT<0 1/K), wherein $$\alpha_T = \frac{\partial}{\partial T}\left(\frac{k-1}{k}\right) = \frac{1}{k^2}\frac{\partial k}{\partial T},$$

wherein k comprises a neutron multiplication factor, and wherein T comprises a nanofuel temperature.

An exemplary chemical composition wherein said moderator absorbs fission fragment kinetic energy, wherein said nanofuel temperature increases due to the absorption of fission fragment kinetic energy in said moderator, wherein a negative temperature coefficient of reactivity (αT<0 1/K) causes a neutron population exponential growth factor (α) to decrease and eventually transition said nanofuel into a subcritical state where α<0 gen/s, and wherein said subcritical state exponentially decreases a neutron population and completes a combustion process.

According to an exemplary embodiment, the method can include, method of obtaining transuranic elements for nanofuel comprising: a) receiving spent nuclear fuel; b) separating the transuranic elements from said spent nuclear fuel, wherein said separating comprises: separating said spent nuclear fuel into at least one stream, wherein said at least one stream comprises the transuranic elements comprising at least one of: any of all elements with an atomic number Z greater than 92 (Z>92); a fissile fuel; a passive agent; a fertile fuel; or a fission product; and c) providing the transuranic elements.

According to an exemplary embodiment, the method can include, wherein said (a) of said receiving said spent nuclear fuel, comprises: receiving commercial light water reactor (LWR) spent nuclear fuel.

According to an exemplary embodiment, the method can include, wherein said (b) of said separating said spent nuclear fuel into at least one stream comprises at least one of: i) separating into a stream of substantially uranium isotope 238 (238U); ii) separating into a stream of substantially fission products; or iii) separating into a stream of the transuranic elements.

According to an exemplary embodiment, the method can include, wherein said (b) (i) of said separating into said stream of substantially uranium isotope 238 (238U), further comprises: productizing said stream of substantially uranium isotope 238 (238U) as a commodity.

According to an exemplary embodiment, the method can include, wherein said (c) of said providing the transuranic elements comprises at least one of: providing the transuranic elements in a solid form; providing the transuranic elements in a liquid form; or providing the transuranic elements in a gaseous form.

According to an exemplary embodiment, the method can include, wherein said providing the transuranic elements in said solid form comprises at least one of: providing the transuranic elements in a substantially tetrafluoride (F4) form; or providing the transuranic elements in a substantially dioxide (O2) form.

According to an exemplary embodiment, the method can include, wherein said (b) of said separating said spent nuclear fuel into at least one stream comprises at least one of: i) separating by at least one process of pyrochemical processing or pyroprocessing; ii) separating by at least one process of electrometallurgical treatment; iii) separating without isotope separation; or iv) separating by a proliferation resistant, environmentally friendly process.

According to an exemplary embodiment, the method can include, wherein said (c) of said providing the transuranic elements comprises: providing the transuranic elements for use in a nanofuel engine.

According to an exemplary embodiment, the method can include, a method of using transuranic elements to create nanofuel, said method comprising: a) receiving the transuranic elements, wherein the transuranic elements comprise at least one of: any of all elements with atomic number Z greater than 92 (Z>92); a fissile fuel; or a passive agent; and wherein the transuranic elements have had substantially most fission products removed therefrom; and b) mixing the transuranic elements with a moderator to obtain nanofuel.

According to an exemplary embodiment, the method can include, further comprising: c) loading the transuranic elements and said moderator in a nanofuel engine.

According to an exemplary embodiment, the method can include, wherein said (a) comprises: loading the transuranic elements in a nanofuel engine.

According to an exemplary embodiment, the method can include, wherein the transuranic elements comprise: at least one stream comprising at least one of: a stream of substantially uranium isotope 238 (238U); a stream of substantially fission products; or a stream of the transuranic elements.

According to an exemplary embodiment, the method can include, wherein said fissile fuel comprises: plutonium isotope 239 hexafluoride (239PuF6).

According to an exemplary embodiment, the method can include, wherein said passive agent comprises: plutonium isotope 240 hexafluoride (240PuF6).

According to an exemplary embodiment, the method can include, wherein said moderator comprises: molecular hydrogen (H2).

According to an exemplary embodiment, the method can include, wherein said (b) comprises: i) converting the transuranic elements into a gas form; and ii) mixing the transuranic elements in said gas form with said moderator to obtain said nanofuel.

According to an exemplary embodiment, the method can include, wherein said converting the transuranic elements into a gaseous form comprises: loading the transuranic elements in a tetrafluoride form into a fluorination reactor; and converting the transuranic elements in said tetrafluoride form to the transuranic elements in a substantially hexafluoride form.

According to an exemplary embodiment, the method can include, wherein said mixing the transuranic elements with said moderator to obtain said nanofuel, comprises: wherein said moderator comprises: any of all elements having an atomic number Z less than 11 (Z<11).

According to an exemplary embodiment, the method can include, wherein said (b) of mixing the transuranic elements with said moderator to obtain said nanofuel comprises: leaving said nanofuel ready for operation in a nanofuel engine.

According to an exemplary embodiment, the method can include, a method of operating a nanofuel engine loaded with nanofuel, comprising at least one of: a) operating the nanofuel engine in a spark ignition mode by injecting neutrons into the nanofuel using a source external to the nanofuel; or b) operating the nanofuel engine in a compression ignition mode by creating neutrons in the nanofuel comprising: i) using a radioactive material that emits neutrons.

According to an exemplary embodiment, the method can include, wherein said (a) of said operating the nanofuel engine in said spark ignition mode by injecting neutrons into the nanofuel using said source external to the nanofuel, comprises at least one of: i) using a fusion neutron source; or ii) using a radioactive material that emits neutrons.

According to an exemplary embodiment, the method can include, wherein said (a) (i) of said using said fusion neutron source in said operating the nanofuel engine in said spark ignition mode by injecting neutrons into the nanofuel using said source external to the nanofuel comprises at least one of: using an accelerator-based neutron generator; or using a Z-pinch-based neutron generator.

According to an exemplary embodiment, the method can include, wherein said (a) (ii) of said using said radioactive material that emits neutrons in said operating the nanofuel engine in said spark ignition mode by injecting neutrons into the nanofuel using said source external to the nanofuel comprises: using californium isotope 252 (252Cf).

According to an exemplary embodiment, the method can include, wherein said (b) (i) of said operating the nanofuel engine in said compression ignition mode by creating neutrons in the nanofuel comprising said using said radioactive material that emits neutrons comprises at least one of: using neutrons emitted from a fission product; or using neutrons emitted from a transuranic element.

According to an exemplary embodiment, a method can include, a method of using nanofuel in a nanofuel engine comprising: a) compressing the nanofuel in the nanofuel engine; and b) igniting the nanofuel using a neutron source, wherein said igniting comprises: triggering a release of nuclear energy from the nanofuel.

According to an exemplary embodiment, the method can include, wherein the nanofuel comprises: a moderator, a molecule with dimensions on a nanometer scale, and a molecular mixture.

According to an exemplary embodiment, the method can include, wherein the nanofuel comprises: a fissile fuel, wherein said fissile fuel comprises: a nuclide that undergoes neutron induced fission; a passive agent, wherein said passive agent comprises: a nuclide comprising a strong resonance neutron absorption cross-section in a low epithermal energy range; and a moderator, wherein said moderator comprises: a low atomic number element.

According to an exemplary embodiment, the method can include, wherein said triggering said release of nuclear energy from the nanofuel further comprises: using the energy released from the nanofuel to generate heat.

According to an exemplary embodiment, the method can include, further comprising: c) capturing said release of nuclear energy from the nanofuel in the nanofuel, wherein the nanofuel is also a working fluid in the nanofuel engine; and d) using the energy in said working fluid to perform work.

According to an exemplary embodiment, the method can include, further comprising: c) receiving the nanofuel in the nanofuel engine.

According to an exemplary embodiment, the method can include, further comprising: c) exhausting the nanofuel from the nanofuel engine.

According to an exemplary embodiment, the method can include, wherein the method comprises an Otto cycle, wherein said Otto cycle is characterized by a set of dimensionless parameters comprising: a compression ratio (r); and a ratio of an energy deposited in the nanofuel to an initial heat content of the nanofuel ($\xi$), wherein $\xi=Q/(M\, c_v T)$, wherein Q is said energy deposited in the nanofuel, wherein M is a mass of the nanofuel in the nanofuel engine, wherein $c_v$ is a constant-volume heat capacity of the nanofuel, and wherein T is a temperature of the nanofuel.

According to an exemplary embodiment, the method can include, wherein said compression ratio r comprises: a ratio of an engine core volume of the nanofuel engine in a bottom dead center (BDC) position to an engine core volume of the nanofuel engine in a top dead center (TDC) position.

According to an exemplary embodiment, the method can include, further comprising: c) controlling said release of nuclear energy from the nanofuel by at least one of: changing the nanofuel; adjusting an inlet nanofuel state; or varying a compression ratio r.

According to an exemplary embodiment, the method can include, wherein said compressing of the nanofuel of said (a), comprises: placing a mass of the nanofuel into an engine core, wherein said engine core changes with said compressing of the nanofuel.

According to an exemplary embodiment, the method can include, wherein said compressing of the nanofuel is accomplished by at least one of: at least one piston, in a reciprocating engine, wherein said reciprocating engine comprises at least one housing; or at least one rotor, in a rotary engine, wherein said rotary engine comprises a at lease one housing.

According to an exemplary embodiment, the method can include, wherein said igniting of said (b), comprises at least one of: igniting via an external neutron source; or igniting via an internal neutron source.

According to an exemplary embodiment, the method can include, wherein said release of nuclear energy, comprises at least one of: i) releasing energy until a nanofuel temperature gets too high and the nanofuel engine transitions into a subcritical state due to a nanofuel negative temperature coefficient of reactivity; or ii) releasing energy until an engine core gets too large and the nanofuel engine transitions into a subcritical state due to a criticality of said engine core.

According to an exemplary embodiment, the method can include, wherein said release of nuclear energy comprises said (i), and wherein said (i) comprises: wherein the nanofuel comprises: a fissile fuel, a passive agent, and a moderator; and wherein the nanofuel comprises a temperature coefficient of reactivity ($\alpha T$) that is less than zero in units of inverse Kelvin ($\alpha T<0$ 1/K), wherein $$\alpha_T = \frac{\partial}{\partial T}\left(\frac{k-1}{k}\right) = \frac{1}{k^2}\frac{\partial}{\partial T},$$

wherein k comprises a neutron multiplication factor, and wherein T comprises a nanofuel temperature.

According to an exemplary embodiment, the method can include, wherein said release of nuclear energy comprises said (ii), and wherein said (ii), comprises: wherein said criticality of said engine core comprises: $B_m^2 = B_g^2$ wherein Bm comprises a material buckling of said engine core, and wherein Bg comprises a geometric buckling of said engine core.

According to an exemplary embodiment, the method can include, wherein said criticality of said engine core further comprises: wherein the nanofuel engine comprises a cylindrical shape reciprocating engine geometry with said engine core comprising a cylinder radius R and a cylinder height H, and wherein said criticality comprises:

$$\frac{k_\infty - 1}{L^2} = \left(\frac{v_0}{\tilde{R}_c}\right)^2 + \left(\frac{\pi}{\tilde{H}_c}\right)^2,$$

wherein L comprises a neutron diffusion length, wherein $k_\infty$ comprises an infinite medium multiplication factor, wherein $v_0$ and $\pi$ comprise known constants, wherein $\tilde{R}_c$ comprises an extrapolated critical radius of said engine core, and wherein $\tilde{H}_c$ comprises an extrapolated critical height of said engine core.

According to an exemplary embodiment, the method can include, wherein said releasing energy until said engine core gets too large, comprises: wherein the nanofuel engine apparatus is supercritical when said cylinder radius R is greater than a critical radius Rc (R>Rc); and wherein said critical radius Rc of said engine core of said criticality for said cylindrical shape reciprocating engine geometry comprises:

$$R_c = \frac{v_0}{r}\left\{\frac{k_\infty - 1}{L_1^2} - \frac{\pi^2}{(H_1 + 2dr)^2}\right\}^{-1/2} - d,$$

wherein r is a compression ratio, wherein d is an extrapolation distance, and wherein a subscript one represents an inlet property.

According to an exemplary embodiment, the method can include, wherein said (ii), comprises: wherein said releasing energy until said engine core gets too large with respect to said criticality, wherein said criticality relates to a reflector of the nanofuel engine, wherein said reflector reduces neutron leakage, and wherein said reflector comprises at least one of: making the nanofuel engine smaller than without said reflector; or slowing down and returning fast neutrons back into the nanofuel by a finite thickness of said reflector.

According to an exemplary embodiment, the method can include, wherein said using the energy in said working fluid to perform work of said (d), comprises at least one of: driving an alternator; driving a generator; driving a propeller; generating heat; turning a shaft; or turning at least one wheel.

According to an exemplary embodiment, the method can include, further comprising: c) cooling the nanofuel with a heat exchanger; and d) returning the nanofuel to the nanofuel engine.

According to an exemplary embodiment, the method can include, wherein the nanofuel engine comprises a rotary engine, and further comprising at least one of: allowing a full separation, or allowing a partial separation, of an intake and an exhaust port.

According to an exemplary embodiment, the method can include, wherein said partial separation of said intake and said exhaust port comprises: regulating an amount of the nanofuel left in the nanofuel engine, and permitting at least one of: using neutrons emitted from a fission product, or affecting energy released.

According to an exemplary embodiment, the method can include, wherein the nanofuel engine comprises a rotary engine, wherein said rotary engine comprises a rotor, wherein said rotor comprises a rotor cavity shape that comprises at least one of: an arbitrary shape; a cylindrical shape; an ellipsoidal shape; a rectangular shape; or a spherical shape; and wherein performance of said rotary engine is improved by decreasing said rotor cavity shape surface to volume ratio.

According to an exemplary embodiment, the method can include, wherein said rotor cavity shape comprises said ellipsoidal shape, wherein said rotary engine dimensions are dependent on said ellipsoidal shape when said rotor is in a top dead center (TDC) position, wherein a geometric condition arises wherein a rotor center-to-tip distance ($R_r$) depends on a minor radius (b) of said ellipsoidal shape and a reflector thickness ($\Delta$) fitting between a rotor housing minor radius and an output shaft rotor journal when said rotor is in said TDC position, $$R_r = \frac{2b + \Delta}{1 - 5(e/R_r)},$$

wherein $e/R_r$, is an eccentricity ratio.

According to an exemplary embodiment, the method can include, wherein said rotary engine comprises a trochoid constant (K), wherein said K is equal to the inverse of said eccentricity ratio ($K=R_r/e$), and wherein as said K increases said $R_r$ decreases and said rotary engine dimensions decrease overall.

According to an exemplary embodiment, the method can include, wherein said trochoid constant K is greater than 5 and less than 11 (5<K<11).

According to an exemplary embodiment, the method can include, further comprising at least one of: a variable cycle speed; or a variable nanofuel engine power.

According to an exemplary embodiment, the method can include, wherein said (c) of said providing the transuranic elements comprises providing the transuranic elements in a plasma form.

According to an exemplary embodiment, the method can include, further comprising: d) receiving nanofuel into a nanofuel internal engine.

According to an exemplary embodiment, the method can include, wherein said nanofuel internal engine comprises at least one engine housing; and at least one reflector.

According to an exemplary embodiment, the method can include, wherein at least one of: said at least one housing, or said at least one reflector, comprises: at least one channel.

According to an exemplary embodiment, the method can include, wherein said at least one channel comprises at least one of: a coolant; a reflector; or a moderator.

According to an exemplary embodiment, the method can include, wherein said nanofuel is received into an engine core of said nanofuel internal engine, and said engine core is bounded by a first layer material.

According to an exemplary embodiment, the method can include, wherein said first layer material has a second layer material to resist movement and to create structure.

According to an exemplary embodiment, the method can include, wherein said first layer material comprises Beryllium and wherein said second layer material comprises cement.

According to an exemplary embodiment, the method can include, a coolant in a channel, a reflector, and a moderator.

According to an exemplary embodiment, the method can include, wherein said nanofuel internal engine and said nanofuel further comprise at least one of: water ($H_2O$); heavy water ($D_2O$); light water ($H_2O$); HF; $CO_2$; helium (He); molecular hydrogen ($H_2$); a reflector; beryllium (Be); lead (Pb); a coolant; a moderator; concrete; graphite; a channel; a vacuum; a first layer material; or a second layer material.

According to an exemplary embodiment, the method can include wherein said nanofuel internal engine is geographically adjacent to any combination of, at least one of: a nuclear reactor; a spent nuclear fuel storage facility; or a fuel fabrication facility.

According to an exemplary embodiment, the method can include, wherein said nanofuel is fabricated from spent nuclear fuel from one or more sources comprising at least one of: stored nuclear waste; light water reactor spent nuclear fuel (LWRSNF); nuclear power plant spent nuclear fuel; spent nuclear waste from at least one of: reactor, commercial, industrial, university, military, or governmental source; industrial nuclear waste; or medical industry nuclear waste.

CONCLUSION

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm and/or process and/or methodology, is here, and generally, is considered to be a self-consistent sequence of acts or operations leading to a desired result. These include physical manipulations of physical quantities. Usually, though not necessarily, these quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein, as well as complex systems incorporating various subsystems. An apparatus may be specially constructed for the desired purposes, or it may comprise a general purpose device selectively activated or reconfigured by a program stored in the device.

Embodiments of the invention may be implemented in one or a combinations of devices that further include control and/or monitoring computer systems comprised of, e.g., but not limited to, computer hardware, firmware, and/or software, etc. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

It is also important to note that any use of the conjunctive "or" is intended to be considered as a logical OR operation, including either of two alternatives, as well as both alternatives, and where more than one alternative is provided including such language as "including at least one of . . . , . . . , or . . . " or "comprising at least one of . . . , . . . , or . . . " is intended to be interpreted as a Markush Group, allowing any permutation, and combination of any of the alternatives, including all of the alternatives. Thus, the use of "or" herein is intended to be interpreted as "and/or" meaning any of, or a combination of, or all of. Thus, the use of "or" is NOT intended to be used herein, in its nontechnical usage as sometimes considered to only cover a mutually exclusive OR, unless specifically noted that the use of "or" in a specific instance is to be interpreted as a mutually exclusive OR.

Please further note, that the use of transitional phrase "comprising" is intended to indicate an open list of elements herein, meaning "including, but not limited to." Use of the transitional phrase "consisting" if used herein, is intended as a closed list of "including only" or "including essentially only."

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. An apparatus comprising:
an internal-external hybrid nuclear reactor comprising:
at least one reciprocating internal engine configured to receive internally a nanofuel comprising:
a molecular mixture,
wherein the molecular mixture comprises:
a plurality of components mixed together, wherein at least one of said plurality of components comprises a molecule, the plurality of components of the molecular mixture comprising:
i) a fissile fuel, wherein the fissile fuel comprises:
a nuclide that undergoes neutron induced fission;
ii) a moderator, wherein the moderator comprises:
an element capable of:
A) thermalizing a neutron population; and
B) absorbing a fission fragment kinetic energy; and
iii) a passive agent, wherein the passive agent comprises:
a nuclide comprising:
a resonance neutron absorption cross-section in an epithermal energy range,
wherein said resonance neutron absorption cross-section of said passive agent, creates a neutron sink that increases with a nanofuel temperature; and
wherein the plurality of components of the molecular mixture provide the nanofuel a nanofuel negative temperature coefficient of reactivity; and
at least one external nuclear reactor integrated with said at least one reciprocating internal engine.

2. The apparatus according to claim 1, wherein said at least one reciprocating internal engine comprises at least one or more of:
- at least one reciprocating piston;
- at least one cylindrical reciprocating piston;
- at least one reciprocating engine comprising a plurality of pistons;
- at least one reciprocating rotary engine;
- at least one reciprocating rotary engine comprising a plurality of pistons;
- at least one rotary engine;
- at least one rotor;
- at least one reciprocating piston rotary engine;
- at least one wankel-type rotary engine; or
- wherein said at least one reciprocating rotary engine comprises the nanofuel placed internally to said at least one reciprocating rotary engine.

3. The apparatus according to claim 1, wherein said external nuclear reactor comprises at least one or more of:
- at least one plasma core assembly;
- at least one reflector;
- at least one Beryllium (Be) reflector;
- at least one reflector surrounded by at least one solid fuel assembly;
- at least one solid fuel assembly;
- at least one solid inverted fuel assembly;
- at least one core assembly;
- at least one channel;
- at least one equivalent annulus;
- at least one coolant;
- at least one cladding;
- at least one gap;
- at least one fuel;
- at least one cavity reactor;
- at least one cavity reactor that is configured to use solid fuel;
- at least one control drum;
- at least one Rover Program control drum; or
- at least one system for nuclear auxiliary power (SNAP) control drum.

4. The apparatus according to claim 1, wherein said internal-external hybrid nuclear reactor comprises at least one or more of:
- wherein said internal-external hybrid nuclear reactor comprises a compact configuration;
- wherein said internal-external hybrid nuclear reactor comprises being configured for military applications;
- wherein said internal-external hybrid nuclear reactor comprises being configured in a small transportable box;
- further comprising at least one cooling system;
- further comprising at least one reactivity control;
- further comprising at least one reactivity control for at least one solid fuel;
- further comprising at least one control drum;
- further comprising at least one Rover Program control drum;
- further comprising at least one system for nuclear auxiliary power (SNAP) control drum;
- further comprising at least one continuously rotating control drum; or
- further comprising at least one continuously rotating drum producing a burst of energy.

5. The apparatus according to claim 1, wherein said at least one reciprocating internal engine is configured to receive the nanofuel in at least one internal chamber.

6. The apparatus according to claim 5, wherein said at least one reciprocating internal engine is configured to receive the nanofuel in said at least one internal chamber, wherein the nanofuel is produced by a method of obtaining transuranic elements comprising:
a) receiving spent nuclear fuel;
b) separating transuranic elements from said spent nuclear fuel, wherein said separating comprises:
  separating said spent nuclear fuel into at least one stream, wherein said at least one stream comprises the transuranic elements comprising at least one or more of:
    any of all elements with an atomic number Z greater than 92 (Z>92);
    a fissile fuel;
    a passive agent;
    a fertile fuel; or
    a fission product.

7. The apparatus according to claim 5, wherein said at least one reciprocating internal engine is configured to operate loaded with the nanofuel, a method comprising at least one or more of:
a) operating said at least one reciprocating internal engine in a spark ignition mode by injecting neutrons into the nanofuel using a source external to the nanofuel; or
b) operating said at least one reciprocating internal engine in a compression ignition mode by creating neutrons in the nanofuel comprising:
  i) using a radioactive material that emits neutrons.

8. The apparatus configured to operate according to the method of claim 7, wherein said (a) of said operating said at least one reciprocating internal engine in said spark ignition mode by injecting neutrons into the nanofuel using said source external to the nanofuel, comprises at least one or more of:
  i) using a fusion neutron source; or
  ii) using a radioactive material that emits neutrons.

9. The apparatus according to claim 1, wherein said reciprocating internal engine is configured to use the nanofuel in said reciprocating internal engine comprising:
a) compressing the nanofuel in said reciprocating internal engine; and
b) igniting the nanofuel using a neutron source, wherein said igniting comprises:
  triggering a release of nuclear energy from the nanofuel.

10. The apparatus according to claim 1, wherein said at least one reciprocating internal engine is configured to receive and use the nanofuel comprising:
a) capturing release of nuclear energy from the nanofuel in said reciprocating internal engine, wherein the nanofuel is also a working fluid in said reciprocating internal engine; and
b) using the energy in said working fluid to perform work.

11. The apparatus according to claim 10 wherein the using the energy in said working fluid to perform work comprises at least one or more of:
- driving an alternator;
- driving a generator;
- driving a propeller;
- generating heat;
- turning a shaft; or
- turning at least one wheel.

12. The apparatus according to claim 1, wherein said at least one reciprocating internal engine comprises:
- at least one engine housing; and
- at least one reflector.

13. The apparatus according to claim 12, wherein at least one, or more of: said at least one housing, or said at least one reflector, comprises:
at least one channel.

14. The apparatus according to claim 13, wherein said at least one channel comprises at least one or more of:
a coolant;
a reflector; or
a moderator.

15. The apparatus according to claim 1, wherein the nanofuel is received into an engine core of said at least one reciprocating internal engine, and said engine core is bounded by a first layer material.

16. The apparatus according to claim 15, wherein said first layer material has a second layer material to resist movement and to create structure.

17. The apparatus according to claim 16, wherein said first layer material comprises Beryllium and wherein said second layer material comprises cement.

18. The apparatus according to claim 1, wherein said internal-external hybrid nuclear reactor comprises at least one of:
physically adjacent, or geographically adjacent to any one or more of:
a nuclear reactor;
a spent nuclear fuel storage facility; or
a fuel fabrication facility.

19. The apparatus according to claim 1, wherein fuel of said internal-external hybrid nuclear reactor comprises fuel fabricated from spent nuclear fuel from one or more sources comprising at least one or more of:
stored nuclear waste;
light-water reactor spent nuclear fuel;
nuclear power plant spent nuclear fuel;
spent nuclear waste from at least one of: reactor, commercial, industrial, university, military, or governmental source;
industrial nuclear waste; or
medical industry nuclear waste.

20. An apparatus comprising:
a hybrid energy source comprising:
an internal nuclear engine configured to receive internally a nanofuel comprising:
a molecular mixture, wherein the molecular mixture comprises:
a plurality of components mixed together, wherein at least one of said plurality of components comprises a molecule, the plurality of components of the molecular mixture comprising:
i) a fissile fuel, wherein the fissile fuel comprises: a nuclide that undergoes neutron induced fission;
ii) a moderator, wherein the moderator comprises: an element capable of:
A) thermalizing a neutron population; and
B) absorbing a fission fragment kinetic energy; and
iii) a passive agent, wherein the passive agent comprises:
a nuclide comprising:
a resonance neutron absorption cross-section in an epithermal energy range,
wherein said resonance neutron absorption cross-section of said passive agent, creates a neutron sink that increases with a nanofuel temperature; and
wherein the plurality of components of the molecular mixture provide the nanofuel a nanofuel negative temperature coefficient of reactivity; and
an external nuclear reactor integrated with and neutronically coupled with said internal nuclear engine.

21. The apparatus according to claim 1, wherein the at least one reciprocating internal engine provides said internal-external hybrid nuclear reactor with a compact configuration and said at least one internal reciprocating engine is neutronically coupled to said at least one external nuclear reactor.

22. The apparatus according to claim 1, comprising a housing comprising a plurality of layers comprising one or more of:
an inner layer adjacent to an engine core of said at least one reciprocating internal engine;
a channel;
at least one outer layer comprising at least one or more of:
a plurality of layers;
a layer chosen from a material selected to reduce cost;
a layer chosen from a material selected to improve structural integrity;
a layer chosen from a material selected to provide manufacturing alternatives;
a layer chosen from a material selected to add additional functionality;
a sound reduction layer;
a noise controlling material;
an acoustic panel;
a vacuum layer;
a Beryllium layer;
a graphite layer;
an internal channel;
a cooling layer;
a cost reduction layer;
a diagnostic layer;
an instrumentation layer;
a neutron reflector layer; or
a material that reflects neutrons.

23. The apparatus according to claim 9, wherein the method of using the apparatus comprises:
a) cooling the nanofuel with a heat exchanger; and
b) returning the nanofuel to the at least one reciprocating internal engine.

* * * * *